US010619994B2

(12) United States Patent
Futami

(10) Patent No.: US 10,619,994 B2
(45) Date of Patent: Apr. 14, 2020

(54) THREE-DIMENSIONAL COORDINATE MEASURING DEVICE

(71) Applicant: Keyence Corporation, Osaka (JP)

(72) Inventor: Takashi Futami, Osaka (JP)

(73) Assignee: Keyence Corporation, Osaka (JP)

( * ) Notice: Subject to any disclaimer, the term of this patent is extended or adjusted under 35 U.S.C. 154(b) by 393 days.

(21) Appl. No.: 15/480,439

(22) Filed: Apr. 6, 2017

(65) Prior Publication Data

US 2017/0314911 A1 Nov. 2, 2017

(30) Foreign Application Priority Data

Apr. 27, 2016 (JP) .................... 2016-089954

(51) Int. Cl.
| | |
|---|---|
| *G01B 11/00* | (2006.01) |
| *G06T 7/73* | (2017.01) |
| *G06T 7/00* | (2017.01) |
| *G06T 7/60* | (2017.01) |

(52) U.S. Cl.
CPC .......... *G01B 11/005* (2013.01); *G06T 7/0004* (2013.01); *G06T 7/60* (2013.01); *G06T 7/73* (2017.01); *G06T 2207/30164* (2013.01); *G06T 2207/30204* (2013.01)

(58) Field of Classification Search
CPC .......... G01B 11/005; G06T 7/73; G06T 7/60; G06T 7/0004; G06T 2207/30204; G06T 2207/30164
See application file for complete search history.

(56) References Cited

U.S. PATENT DOCUMENTS

| | | | |
|---|---|---|---|
| 5,440,392 A | 8/1995 | Pettersen et al. | |
| 5,805,287 A | 9/1998 | Pettersen et al. | |
| 6,166,809 A | 12/2000 | Pettersen et al. | |
| 2002/0189319 A1* | 12/2002 | Abbe .................... | B25J 9/1692 73/1.01 |

(Continued)

FOREIGN PATENT DOCUMENTS

JP 2015-206644 11/2015

OTHER PUBLICATIONS

English Translation of JP2003-114116A (Year: 2003).*
English Translation of JP2010-181195A (Year: 2010).*

*Primary Examiner* — Joseph G Ustaris
*Assistant Examiner* — Jill D Sechser
(74) *Attorney, Agent, or Firm* — Kilyk & Bowersox, P.L.L.C.

(57) ABSTRACT

A three-dimensional coordinate measuring device of the present invention achieves high operability and relaxes limitations on the size of a measurement object. A table which places a measurement object thereon is translatable and/or rotatable around a predetermined axis. A position and an attitude of a probe that is capable of designating a measurement position of a measurement object are identified. A displacement resistance mechanism that generates, when an external force is applied to the table in a displacement direction of the table, a certain resistance force against the external force is provided. A table displacement identifying unit that identifies a displacement amount of the table from an original position is provided. Relative position coordinates of a position designated by the probe are obtained on the basis of the position and the attitude of the probe and the displacement amount of the table.

8 Claims, 47 Drawing Sheets

(56) References Cited

U.S. PATENT DOCUMENTS

| | | | |
|---|---|---|---|
| 2008/0177417 A1* | 7/2008 | Kasuga | G05B 19/41805 |
| | | | 700/213 |
| 2009/0024355 A1* | 1/2009 | Negishi | G01B 3/008 |
| | | | 702/168 |
| 2012/0204435 A1* | 8/2012 | Nakajima | G01B 5/008 |
| | | | 33/503 |
| 2013/0027546 A1* | 1/2013 | Hayashi | G01B 11/24 |
| | | | 348/135 |
| 2014/0007441 A1* | 1/2014 | Pettersson | G01B 5/008 |
| | | | 33/503 |
| 2015/0276377 A1 | 10/2015 | Ikebuchi | |
| 2015/0276389 A1 | 10/2015 | Osaki et al. | |
| 2015/0300808 A1 | 10/2015 | Osaki et al. | |
| 2015/0345932 A1 | 12/2015 | Wakai | |
| 2017/0314910 A1 | 11/2017 | Ikebuchi | |
| 2018/0263710 A1* | 9/2018 | Sakaguchi | A61B 34/70 |

* cited by examiner

THREE-DIMENSIONAL COORDINATE MEASURING DEVICE

CROSS-REFERENCE TO RELATED APPLICATIONS

The present application claims foreign priority based on Japanese Patent Application No. 2016-089954, filed Apr. 27, 2016, the contents of which is incorporated herein by reference.

BACKGROUND OF THE INVENTION

1. Field of the Invention

The present invention relates to a three-dimensional coordinate measuring device.

2. Description of Related Art

There is known a three-dimensional coordinate measuring device which detects three-dimensional coordinates of an outer contour of an object (workpiece). Mechanical three-dimensional coordinate measuring devices such as a portal type three-dimensional coordinate measuring device which has a rigid frame structure and an arm type three-dimensional coordinate measuring device which is provided with a probe on the tip of a multi-articulated arm have become widespread. For example, the portal type three-dimensional coordinate measuring device is manufactured on the basis of a design idea that enables coordinate detection with high accuracy in view of hardware. Thus, the portal type three-dimensional coordinate measuring device is typically installed inside a thermostatic chamber to be used, and expertise is required for the operation of the device.

When the three-dimensional coordinate measuring device is applied to quality control for industrial products, there is a request to measure finished products at a manufacturing site. In order to accept the request, the applicant of the present application has proposed an optical three-dimensional coordinate measuring device in JP 2015-206644 A.

The optical three-dimensional coordinate measuring device of JP 2015-206644 A includes a camera, a probe which is held and operated by an operator with his/her hand for designating a measurement position, and a table on which a workpiece is fixed. The probe is provided with a marker. The optical three-dimensional coordinate measuring device acquires an image by capturing an image of the marker installed in the probe using the camera. Then, coordinates of a measurement point of the workpiece can be obtained by image processing.

According to the optical three-dimensional coordinate measuring device, a predetermined measurement accuracy can be ensured when the relative relationship, that is, the optical relationship between the probe and the camera is fixed only at the instant of timing of capturing an image by the camera. Thus, since the measurement accuracy can be ensured without depending on hardware, the optical three-dimensional coordinate measuring device is manufactured in a small size. Thus, the optical three-dimensional coordinate measuring device can be installed in any place of a manufacturing site where desired products are manufactured.

Further, measurement data (measurement coordinates) can be acquired by calculation including image processing. Thus, it is possible to provide convenience such that even a worker at the manufacturing site can easily operate the optical three-dimensional coordinate measuring device by improving a graphical user interface (GUI).

As described with reference to JP 2015-206644 A, the optical three-dimensional coordinate measuring device may be downsized, and the downsizing provides an advantage in that measurement can be performed in any place of a manufacturing site where desired products are manufactured. Further, as another point of view, when a three-dimensional coordinate measuring device is designed to have a size that is easy to handle for various users, the size of a workpiece to be a measurement object is inevitably limited. For example, in a three-dimensional coordinate measuring device that can be handled by a user in a seated posture, a range within reach of the user is a measurement range. This problem is not limited to an optical three-dimensional coordinate measuring device. In addition, when a portal type three-dimensional coordinate measuring device and an arm type three-dimensional coordinate measuring device are downsized, the downsizing brings the problem of limitations on the size of a measurement object, that is, a workpiece.

Further, as another point of view, in order to provide a three-dimensional coordinate measuring device that is easy to handle for various users, the emergence of a user interface that receives an intuitive operation by an operator and immediately reacts to the operation is desired. For example, the emergence of a mechanism capable of intuitively displacing a workpiece by an operator and a mechanism capable of saving time of fixing the displaced workpiece is desired.

SUMMARY OF THE INVENTION

It is an object of the present invention to provide a three-dimensional coordinate measuring device that has high operability and relaxed limitations on the size of a measurement object.

It is another object of the present invention to provide an optical three-dimensional coordinate measuring device that makes it possible to reduce problems of limitations on the size of a measurement object caused by downsizing of the optical three-dimensional coordinate measuring device.

It is still another object of the present invention to provide an optical three-dimensional coordinate measuring device that easily maintains a constant quality of images captured by a camera.

According to one embodiment of the invention, a three-dimensional coordinate measuring device includes: a table for placing a measurement object thereon, the table being translatable and/or rotatable around a predetermined axis; a probe capable of designating a measurement position of a measurement object on the table; a probe position and attitude identifying unit for identifying a position and an attitude of the probe; a displacement resistance mechanism that generates, when an external force is applied to the table in a displacement direction of the table, a certain resistance force against the external force; a table displacement identifying unit that identifies a displacement amount of the table from an original position; and a relative position coordinate calculation unit that obtains relative position coordinates of a position designated by the probe on the basis of the position and the attitude of the probe detected by the probe position and attitude identifying unit and the displacement amount of the table detected by the table displacement identifying unit.

Effects and other objects of the invention will become apparent from the following detailed description of a preferred embodiment of the invention.

BRIEF DESCRIPTION OF THE DRAWINGS

FIGS. 37(A) and 37(B) are diagrams for describing a state of the lock pin when the operation lever is located at an unlocking position, in which FIG. 37(A) is a plan view of the lock pin and FIG. 37(B) is a sectional view of the lock pin;

FIGS. 38(A) and 38(B) are diagrams for describing a state of the lock pin immediately after the operation lever is positioned at a locking position, in which FIG. 38(A) is a plan view of the lock pin and FIG. 38(B) is a sectional view of the lock pin;

FIGS. 39(A) and 39(B) are diagrams for describing a state in which the operation lever is positioned at the locking position and the table remains fixed by the lock pin, in which FIG. 39(A) is a plan view of the lock pin and FIG. 39 (B) is a sectional view of the lock pin;

FIGS. 47A and 47B are diagrams for describing a step of, when the distance between one end face and the other end face of the workpiece is measured, obtaining a first measurement plane which indicates the one end face, in which FIG. 47A is a diagram illustrating a step of bringing the contactor of the probe into contact with the one end face and FIG. 41B is a diagram for describing bringing the contactor into contact with four points on the one end face;

FIGS. 48A and 48B are diagrams for describing a step of, when the distance between the one end face and the other end face of the workpiece is measured, obtaining a second measurement plane which indicates the other end face, in which FIG. 48A is a diagram illustrating a step of bringing the contactor of the probe into contact with the other end face and FIG. 48B is a diagram for describing bringing the contactor into contact with four points on the other end face;

DETAILED DESCRIPTION OF PREFERRED EMBODIMENT

Embodiment

Hereinbelow, a preferred embodiment of the present invention will be described with reference to the accompanying drawings.

Figure 1:
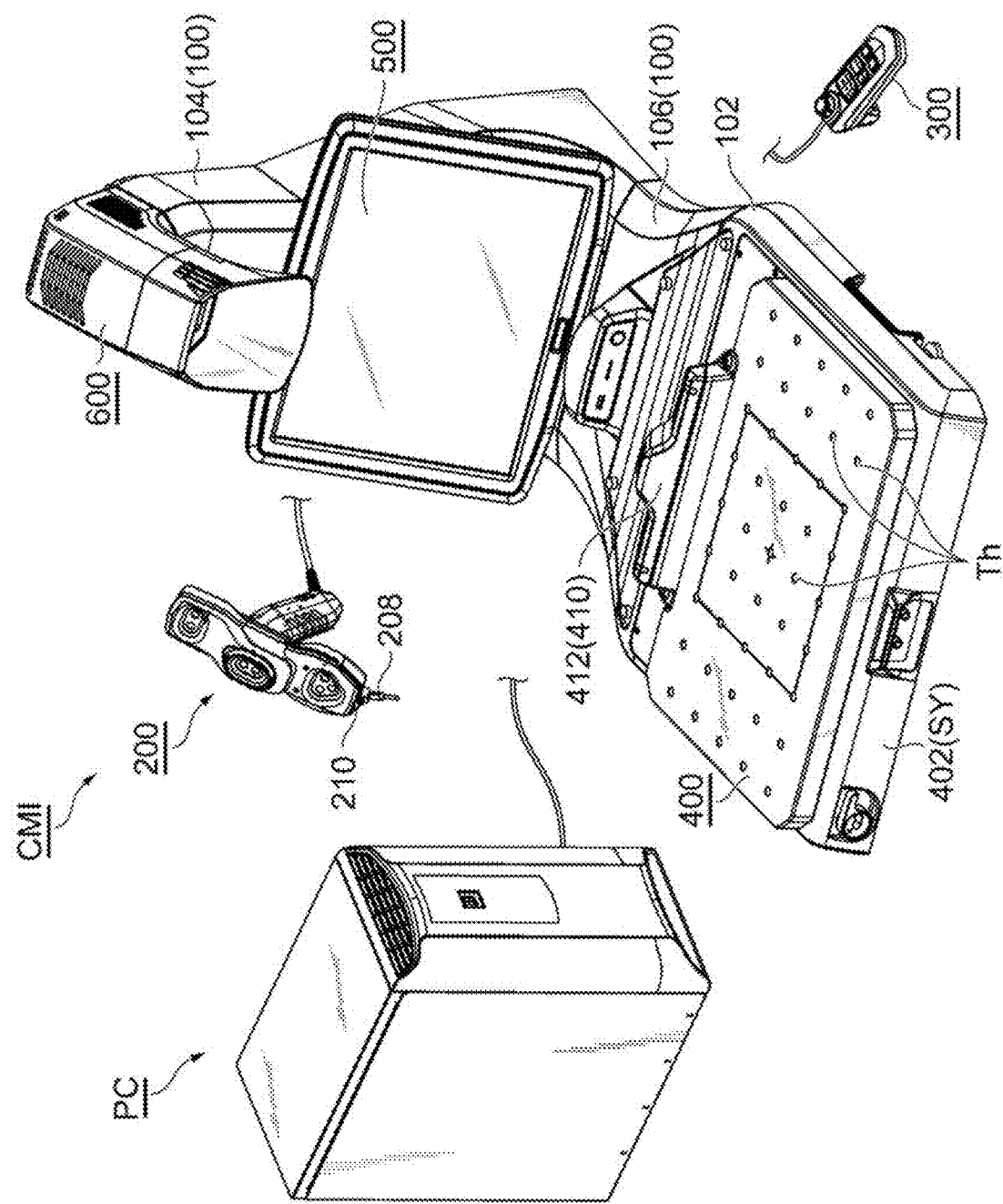
FIG. 1 is a perspective view of a system which includes an optical three-dimensional coordinate measuring device of an embodiment.

Entire Configuration of System:

FIGS. 1 to 17 are diagrams for describing the entire outline of a measuring system. FIG. 1 is a perspective view of the three-dimensional coordinate measuring system which includes an optical three-dimensional coordinate measuring device CMI of an embodiment. The optical three-dimensional coordinate measuring device CMI is designed so as to be operable even by a worker in a manufacturing site. Referring to FIG. 1, the optical three-dimensional coordinate measuring device CMI includes a main body 100, a probe 200, and a main body operation unit 300. The probe 200 and the main body operation unit 300 are connected to the main body 100 by wire or wirelessly. The optical three-dimensional coordinate measuring device CMI is connected to a personal computer PC to be used. A printer may be connected to the personal computer PC so that a measurement result can be printed out.

Figure 2:
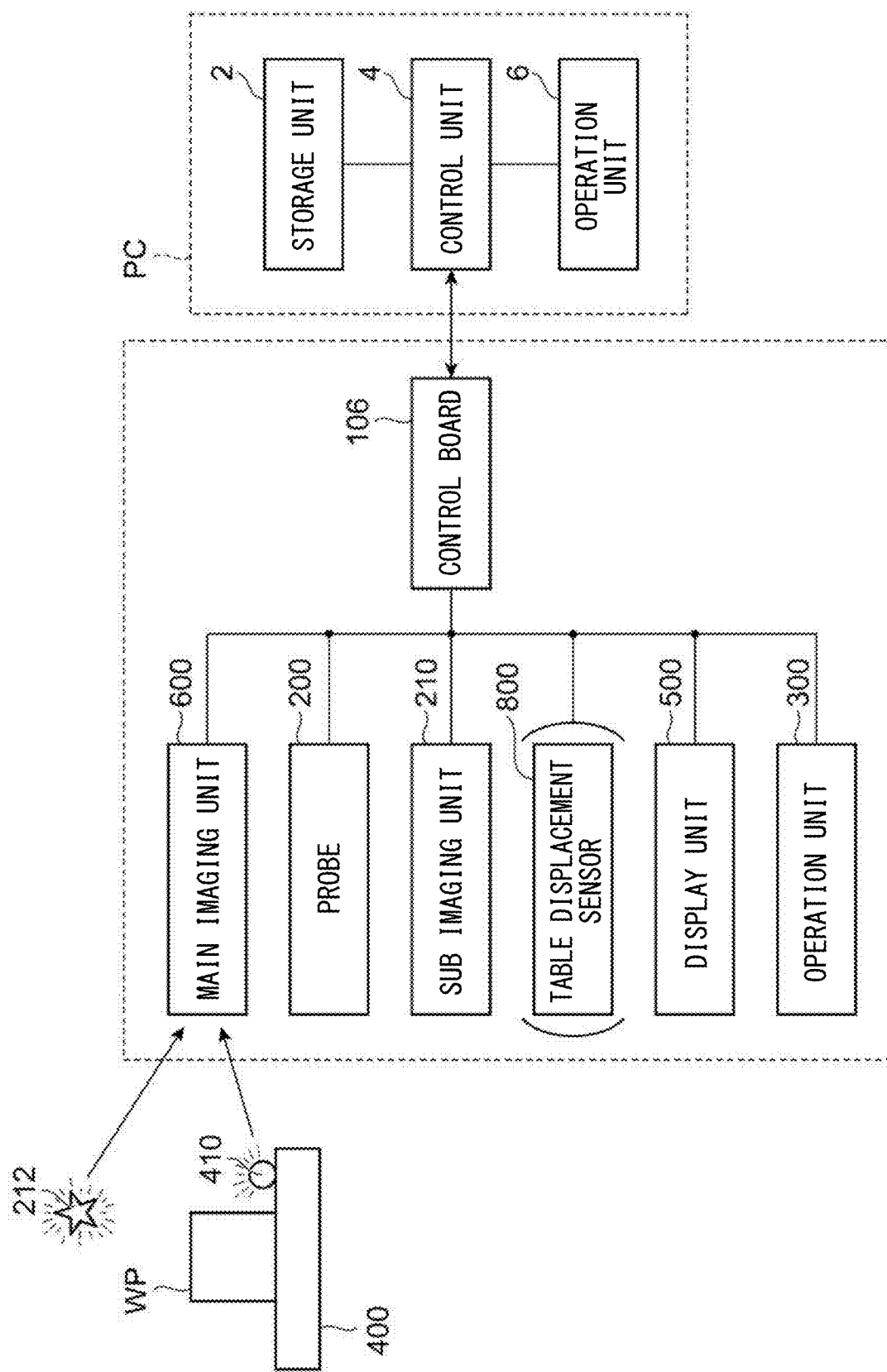
FIG. 2 is a functional block diagram of the three-dimensional coordinate measuring system which includes a personal computer and the optical three-dimensional coordinate measuring device.

FIG. 2 illustrates the entire configuration of the three-dimensional coordinate measuring system which includes the personal computer PC and the optical three-dimensional coordinate measuring device CMI. Referring to FIG. 2, as is well known, the personal computer PC is provided with a storage unit 2, a control unit (CPU) 4, and an operation unit 6 such as a keyboard and a mouse.

Referring back to FIG. 1, the main body 100 includes a horizontal part 102 and a standing part 104 which stands from one end of the horizontal part 102. A rectangular table 400 is displaceably mounted on the other end of the horizontal part 102. Further, a display unit 500 is disposed in a tilted state in a connected part between the horizontal part 102 and the standing part 104. The display unit 500 displays information relating to three-dimensional coordinate measurement of a measurement object.

Although not illustrated in FIG. 1 due to drawing reasons, a control board (106 of FIGS. 2 and 9) is incorporated in the horizontal part 102 at a position near the standing part 104, that is, between the table 400 and the standing part 104. An analog/digital converter (A/D converter) and a first in, first out (FIFO) memory (both not illustrated) are mounted on the control board 106.

Main Imaging Unit (Fixed Camera):

A main imaging unit (fixed camera) 600 is disposed on the upper end of the standing part 104. Although the main imaging unit 600 may be integrated with the standing part 104, the main imaging unit 600 is preferably detachably attached to the standing part 104. The detachable structure of the main imaging unit 600 enables the main imaging unit 600 to be conveyed in a detached state. Thus, it is not necessary to convey the entire optical three-dimensional coordinate measuring device CMI for the calibration of the main imaging unit 600. The main imaging unit 600 is preferably equipped with a memory (not illustrated). Calibration data can be stored in the memory.

Figure 3:
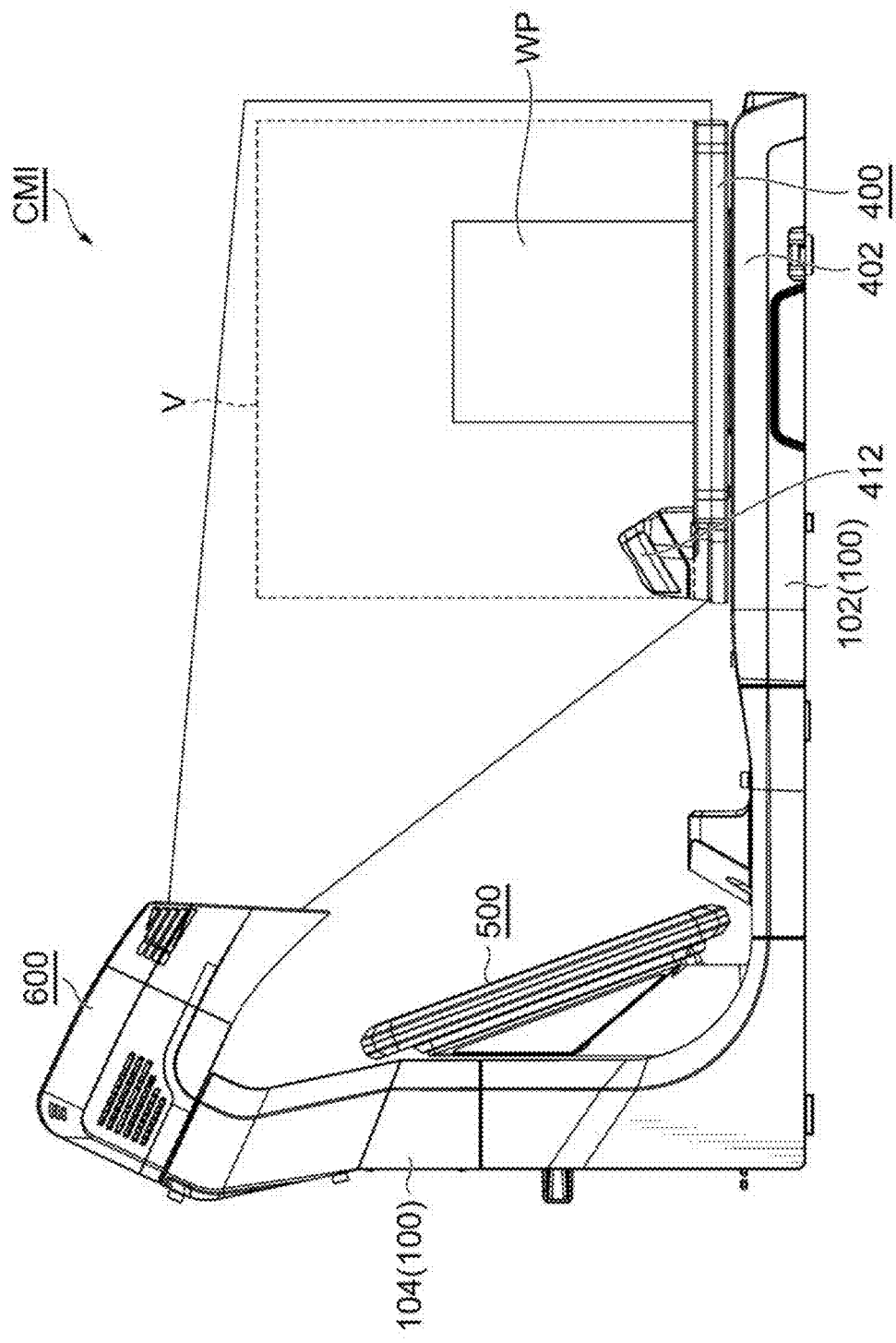
FIG. 3 is a side view of the optical three-dimensional coordinate measuring device of the embodiment.

The main imaging unit 600 is, for example, a charged coupled device (CCD) camera. When a marker (described below) emits infrared rays, an imaging element of the electronic camera is preferably a complementary metal oxide semiconductor (CMOS) image sensor which is capable of detecting infrared rays. The main imaging unit 600 is fixed to the standing part 104 at a fixed attitude so as to capture an image of a predetermined imaging space V (FIG. 3 described below). Specifically, the fixed main imaging unit 600 is positioned in a manner to face the table 400 with an optical axis of the camera tilted downward (FIG. 3).

The display unit 500 desirably includes a flat display, for example, a liquid crystal display panel or an organic EL panel. The display unit 500 displays, for example, an image generated by the personal computer PC, an operating procedure screen, that is, a guidance screen for the optical three-dimensional coordinate measuring device CMI, or a measurement result on the basis of control by the control board 106 (FIG. 2).

Figure 4:
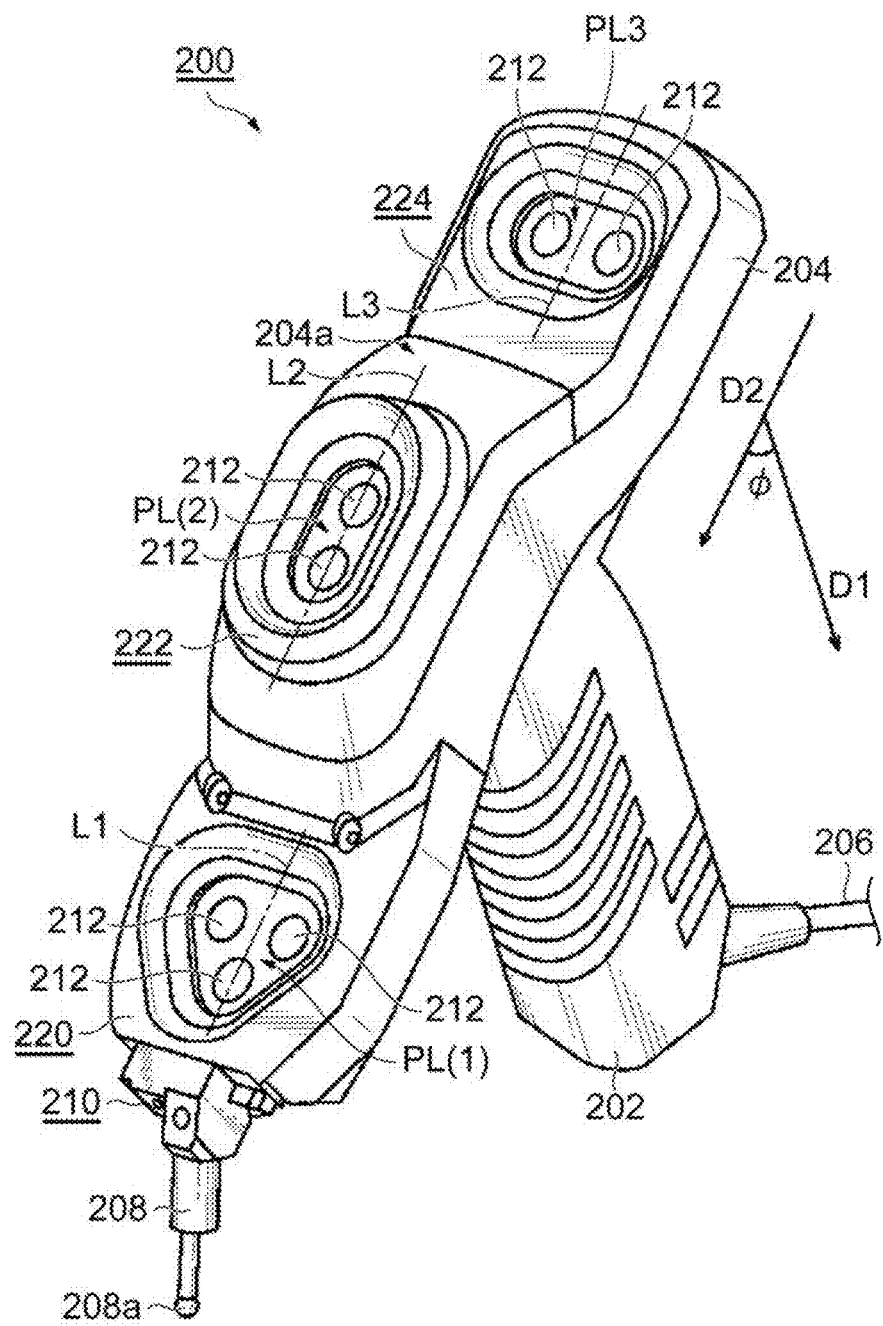
FIG. 4 is a perspective view of a probe which is included in the optical three-dimensional coordinate measuring device of the embodiment.

Probe: Referring to FIG. 4 which illustrates the probe 200 in an enlarged manner, the probe 200 has a generally T outer shape. That is, the probe 200 includes a grip part 202 which is gripped by an operator with his/her hand to operate the probe 200 and a marker installation part 204 which intersects one end of the grip part 202 and linearly extends. The probe 200 has a shape in which one end of the grip part 202 is connected to the central part in the longitudinal direction of the marker installation part 204. More specifically, in the outer shape of the probe 200, the grip part 202 extends in a first direction D1, and the marker installation part 204 extends in a second direction D2 which intersects the first direction D1. When an angle formed by the first direction D1 and the second direction D2 is defined as an angle $\phi$ formed by the grip part 202 and the marker installation part 204, the angle $\phi$ is preferably an acute angle.

Power is supplied to the illustrated probe 200 through a wiring line 206 which is connected to the lower end of the grip part 202. As a modification, a battery may be incorporated in the probe 200. Although not illustrated due to drawing reasons, a memory is incorporated in the probe 200. Calibration data of the probe 200 is stored in the memory.

The probe 200 is a contact type probe and includes a stylus 208 which is attached to one end face of the marker installation part 204. The stylus 208 includes a spherical contactor 208a on the tip thereof. As a modification, the contactor 208a may have a needle shape. Of course, the probe 200 may be a contactless type probe.

Words "front and rear" and "up and down" are used for making description easy to understand. The words "front and rear" and "up and down" are defined by a state of the probe 200 gripped by an operator. The stylus 208 is located at the front end of the marker installation part 204. The marker installation part 204 extends in the front-rear direction. The grip part 202 extends downward from the central part in the longitudinal direction of the marker installation part 204.

A sub imaging unit 210 is installed on the front end face of the marker installation part 204. The sub imaging unit 210 includes, for example, a charged coupled device (CCD) camera, and an optical axis thereof is directed to the front. A resolution of the sub imaging unit 210 may be lower than a resolution of the main imaging unit 600. The sub imaging unit 210 is disposed at a position whose positional relationship with the contactor 208a of the stylus 208 is known. A light reception signal is output from each pixel of the sub imaging unit 210 to the control board 106 (FIG. 2).

The marker installation part 204 includes an upper face 204a. The upper face 204a is located opposite to the grip part 202. When an operator grips the probe 200 and performs a measurement operation, the operator can turn the upper face 204a toward the main imaging unit 600.

A plurality of first markers 212 are disposed at intervals on the upper face 204a of the marker installation part 204. The first marker 212 is referred to as a "probe marker". FIG. 4 illustrates, as an example, a preferred arrangement mode of the plurality of first probe markers 212.

Continuingly referring to FIG. 4, seven probe markers 212 in total are disposed in separate three blocks on the upper face 204a which extends in the front-rear direction. A first block 220 is located at the front end part of the upper face 204a, and three probe markers 212 are disposed in the first block 220. A second block 222 is located at the central part of the upper face 204a, and two probe markers 212 are disposed in the second block 222. A third block 224 is located at the rear end part of the upper face, and two probe markers 212 are disposed in the third block 224.

In regard to a longitudinal direction axis of the marker installation part 204, L1, L2, and L3 in FIG. 4 respectively denote the longitudinal direction axes of the blocks 220, 222, and 224. The three probe markers 212 in the first block 220 are disposed at three vertexes of a regular triangle (although it is arbitrary) and disposed line symmetrically with respect to the longitudinal direction axis L1 of the upper face 204a. The two probe markers 212 in the second block 222 are disposed at an interval on the longitudinal direction axis L2 of the upper face 204a. The two probe markers 212 in the third block 224 are disposed at an interval on a line that is perpendicular to the longitudinal direction axis L3 of the upper face 204a.

A first plane PL (1) which is occupied by the three probe markers 212 in the first block 220, a second plane PL (2) which is occupied by the two probe markers 212 in the second block 222, and a third plane PL (3) which is occupied by the two probe markers 212 in the third block 224 are parallel to each other. There is a first height difference between the first plane PL (1) and the second plane PL (2). Similarly, there is a second height difference between the second plane PL (2) and the third plane PL (3). The first height difference and the second height difference may be equal to each other or difference from each other. In the probe 200 of the embodiment, as clearly understood from the drawing, the second block 222 projects to the outermost side.

As described above, it is possible to improve the detection accuracy for an orientation of the probe 200 (describe below) by disposing the plurality of probe markers 212 at intervals. Further, it is possible to further improve the detection accuracy for the orientation of the probe 200 by providing the height difference between the plurality of probe markers 212. Further, it is possible to further improve the detection accuracy for the orientation of the probe 200 by disposing the plurality of probe markers 212 in each of the plurality of blocks 220, 222, 224 and making the arrangement relationships between the probe markers 212 different from each other between the plurality of blocks 220, 222, 224.

Although the probe marker 212 may be a retroreflective marker, the probe marker 212 is preferably a self-luminous marker. In the embodiment, the probe marker 212 is a self-luminous marker which employs an infrared LED as a light source. Infrared rays having a wavelength of 860 nm are intermittently, preferably, periodically emitted from each of the probe markers 212. Images of infrared rays emitted from the plurality of probe markers 212 are captured by the main imaging unit 600.

Figure 5:
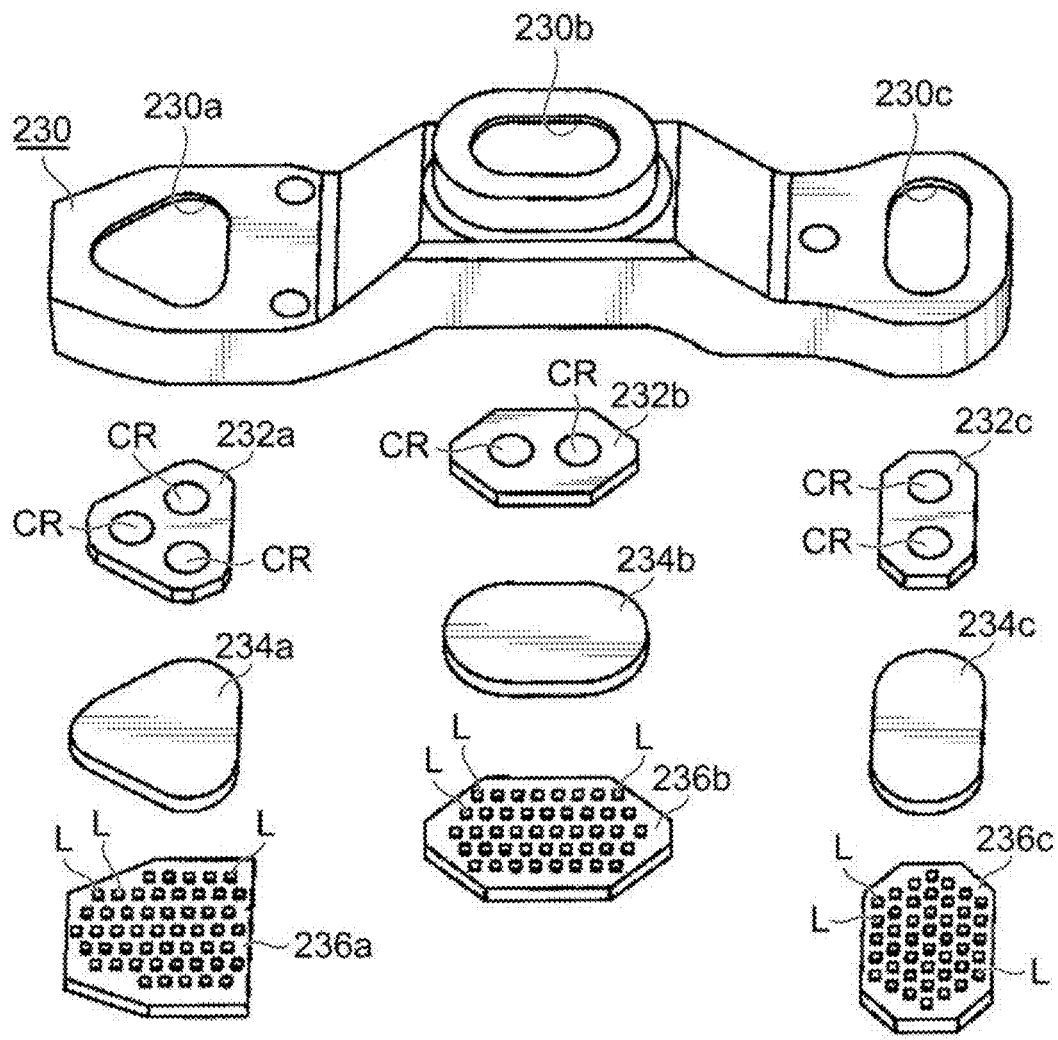
FIG. 5 is an exploded perspective view for describing a holding member which is housed in a case of the probe and an optical element which is housed in the holding member.
Figure 6:
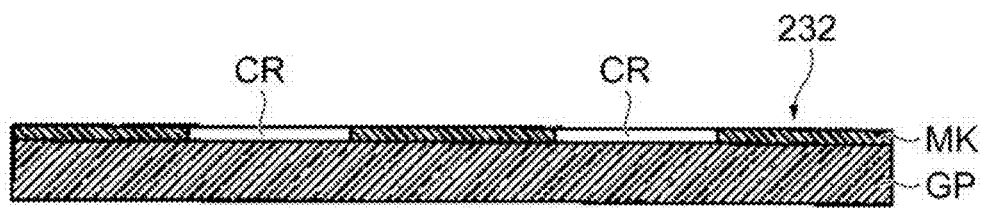
FIG. 6 is a sectional view of a marker member which is a principal element of a probe marker.
Figure 7:
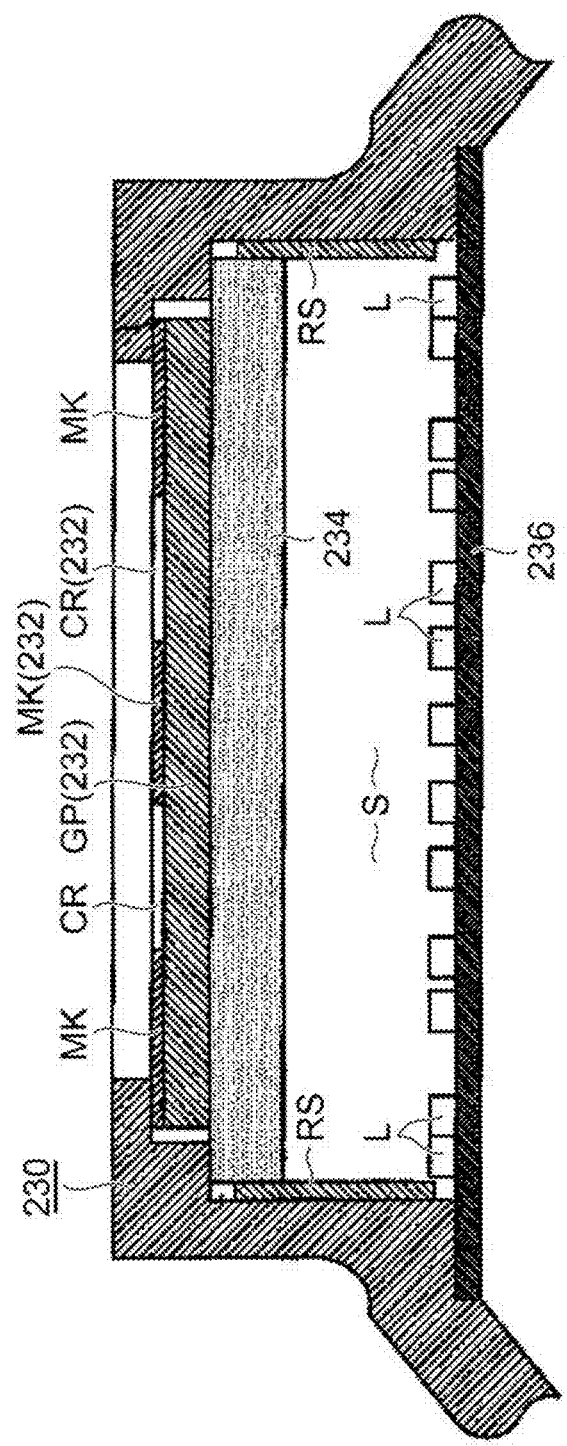
FIG. 7 is a partial sectional view of the holding member in which the optical element is incorporated.

FIGS. 5 to 7 are diagrams for describing the internal structure of the probe 200. The probe 200 includes a holding member 230 in a case which forms an outer contour of the probe 200. The holding member 230 is made of a material having a low hygroscopicity and a small linear expansion coefficient. The linear expansion coefficient of the holding member 230 is preferably $30 \times 10^{-6}$/K or less. For example, glass, ceramic, metal, an alloy, or glass ceramic is used as the material of the holding member 230. In particular, quartz glass which is lightweight and low cost is preferably used. The linear expansion coefficient of quartz glass is $0.5 \times 10^{-6}$/K.

The holding member 230 includes a generally triangular first window 230a which defines the first block 220, a second window 230b which defines the second block 222, and a third window 230c which defines the third block 224.

A first marker member 232a, a second marker member 232b, and a third marker member 232c are located respectively facing the first window 230a, the second window 230b, and the third window 230c. Further, first to third diffuser plates 234a, 234b, 234c are located under the first to third marker members 232a, 232b, 232c. Further, first to third light emitting substrates 236a, 236b, 236c are located under the first to third diffuser plates 234a, 234b, 234c.

The first to third marker members 232a, 232b, 232c basically have the same configuration. Thus, these marker members are collectively referred to as a marker member 232. FIG. 6 is a sectional view of the marker member 232. A circular light transmissive region CR corresponding to the probe marker 212 described above is formed on one face (the upper face of FIG. 6) of the marker member 232.

Referring to FIG. 6, a main material of the marker member 232 is a plate-like member GP which is made of a flat glass plate. The plate-like member GP has a high light transmittance. For example, quartz glass or soda glass is used as the material of the plate-like member GP. In particular, quartz glass having a low hygroscopicity and a small linear expansion coefficient is preferably used as the material of the plate-like member GP. The plate-like member GP is preferably made of the same material as the holding member 230 described above with reference to FIG. 5. Further, a smaller difference between the linear expansion coefficient of the plate-like member GP and the linear expansion coefficient of the holding member 230 (FIG. 5) is preferred because the smaller difference makes temperature correction easy. In this embodiment, both the holding member 230 and the plate-like member GP are made of quartz glass.

The light transmissive region CR is formed by printing a light blocking mask MK on one face of the plate-like member GP in a manner to surround the light transmissive region CR. That is, the light transmissive region CR is defined by the light blocking mask MK. The light blocking mask MK may be formed by sputtering or vapor deposition. A metal material having a high absorptivity (high adhesion) with respect to glass is preferably used as the material of the mask MK. A concrete example of the metal material includes chromium. The mask MK may be formed of a single light blocking film, or formed by laminating a plurality of light blocking films. Although the plurality of light blocking films may be made of the same light blocking material, the plurality of light blocking films are preferably made of different light blocking materials. That is, it is preferred to form the mask MK of a laminated film having a high film strength by laminating a light blocking film of a first metal material which easily adheres to glass and a light blocking film of another metal material thereon. Further, the mask MK may be formed using emulsion ink or another organic ink.

The contour of the light transmissive region CR which transmits infrared rays is not limited to the above circular shape. The light transmissive region CR may have any contour shape. For example, the light transmissive region CR may have an arrow contour. The number of light transmissive regions CR can be reduced by employing a shape having directivity.

Although there has been described an example in which a flat glass plate is employed as the material of the plate-like member GP, the region CR may have a semicircular convex shape. The semicircular convex shape of the region CR enables the accuracy of identifying the position of the marker to be improved.

Continuingly referring to FIG. 6, the above first to third diffuser plates 234a, 234b, 234c basically have the same configuration. Thus, these diffuser plates are collectively referred to as a diffuser plate 234. FIG. 7 is a partial sectional view of the holding member 230. Referring to FIG. 7, the diffuser plate 234 is disposed under the plate-like member GP (the marker member 232). The diffuser plate 234 has a function of diffusing and transmitting light and is made of, for example, a resin material. The diffuser plate 234 preferably has a larger area than the marker member 232 and preferably has a larger area than the first window 230a, the second window 230b, and the third window 230c.

The above first to third light emitting substrates 236a, 236b, 236c basically have the same configurations. Thus, these light emitting substrates are collectively referred to as a light emitting substrate 236. A plurality of light emitting elements L are mounted on the upper face of the light emitting substrate 236. The plurality of light emitting elements L are substantially uniformly arranged on the entire light emitting substrate 236 which is disposed in a manner to overlap the diffuser plate 234. In this embodiment, each of the light emitting elements L is an infrared LED (light emitting diode). As a modification of the light emitting element L, an LED that emits light having another wavelength may be used or a filament may be used.

Continuingly referring to FIG. 7, the light emitting substrate 236 and the diffuser plate 234 are preferably disposed apart from each other. Further, peripheral walls of a space S therebetween preferably include a diffusion reflection sheet RS. The diffusion reflection sheet RS has a function of diffusing and reflecting light. The diffusion reflection sheet RS may adhere to the holding member 230 with an adhesive. As a modification, a mirror sheet may be used instead of the diffusion reflection sheet RS.

Stage Unit: The table 400 will be described in detail with reference to FIGS. 8 to 14. The table 400 is supported by a stage base 402. The stage base 402 constitutes a part of the horizontal part 102 of the main body 100. The stage base 402 may have a structure integrated with the horizontal part 102. However, in this embodiment, the stage base 402 is detachably attached to the rest part of the horizontal part 102.

The table 400 is typically an optical surface plate. A measurement object, that is, workpiece WP is placed on the table 400. In this example, the table 400 has a generally square shape. A plurality of threaded holes Th which are arranged at regular intervals in two directions which are perpendicular to each other are formed on the table 400. Accordingly, the workpiece WP can be fixed to the table 400 with an upper clamp member and a fixing screw.

A magnetic force or adhesion may be employed as a mechanism for fixing the workpiece WP to the table 400. That is, the table 400 may be a magnetic body or adhesiveness is imparted to the upper face of the table 400. For example, an adhesive plate or sheet may be fixed onto the table 400.

The table 400 includes a second marker 410. A structure that incorporates the second marker 410 into the table 400 may be employed. However, preferably, the second marker 410 is included in a single stage marker unit 412, and the stage marker unit 412 is detachably attached to the table 400 as in this embodiment. Hereinbelow, the second marker 410 is referred to as a "stage marker".

Figure 8:
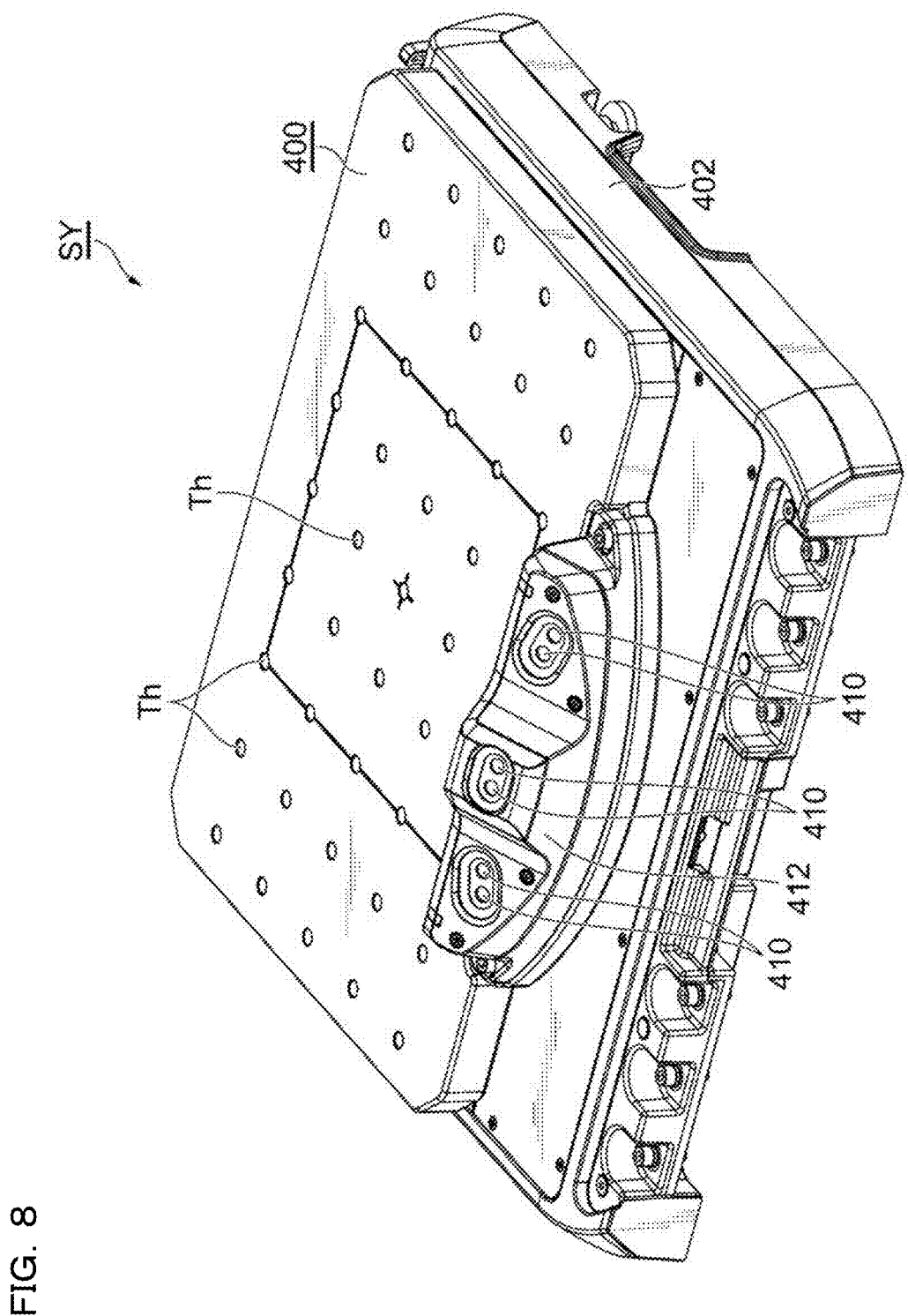
FIG. 8 is a perspective view of a stage unit which is included in the optical three-dimensional coordinate measuring device of the embodiment.
Figure 9:
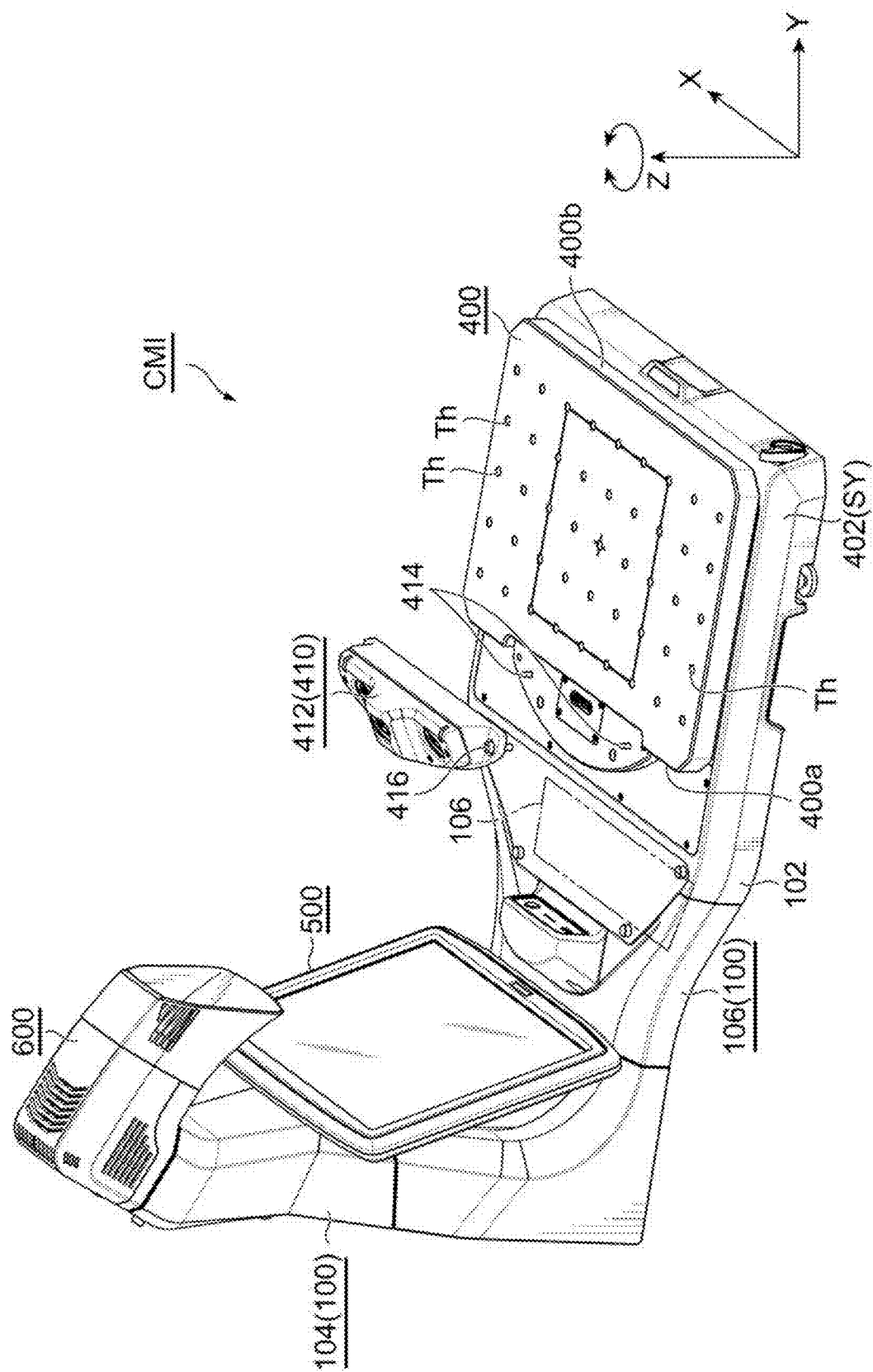
FIG. 9 is a perspective view of the optical three-dimensional coordinate measuring device of the embodiment and illustrates a state in which a displaceable table is located at an original position.

FIG. 8 illustrates a stage unit SY which includes the stage base 402 and the table 400 which is assembled to the stage base 402. The stage base 402 in this state is coupled to the horizontal part 102 of the main body 100. Referring to FIG. 9, the stage marker unit 412 is detachably attached to the table 400. The table 400 includes a plurality of positioning pins 414. The stage marker unit 412 is guided by the plurality of positioning pins 414 so as to be positioned, and fixed at a predetermined position in the table 400 using a fixing screw 416. Power is supplied to the stage marker unit 412 through the main body 100. As a modification, a battery for driving the stage marker unit 412 may be incorporated in the marker unit 412.

Referring to FIG. 9, there may be provided any number of stage marker units 412, and the stage marker unit 412 may be disposed at any position. A plurality of stage marker units 412 may be disposed on the table 400. However, in this embodiment, a single stage marker unit 412 is detachably attached to the table 400. Regarding the arrangement of the single stage marker unit 412, the stage marker unit 412 is most preferably disposed in a part of the rectangular table 400, the part being closest to the main imaging unit 600. The table 400 includes a first side edge 400a which is close to the main imaging unit 600 and a second side edge 400b which is far from the main imaging unit 600. The single stage marker unit 412 is preferably disposed in a central part of the first side edge 400a of the table 400.

The illustrated optical three-dimensional coordinate measuring device CMI is designed in such manner that an operator makes access to the optical three-dimensional coordinate measuring device CMI from a position opposite to the main imaging unit 600. That is, an operator makes access to the optical three-dimensional coordinate measuring device CMI from the side that is opposite to the standing part 104 of the main body 100 and corresponds to the second side edge 400b of the table 400.

Figure 10:
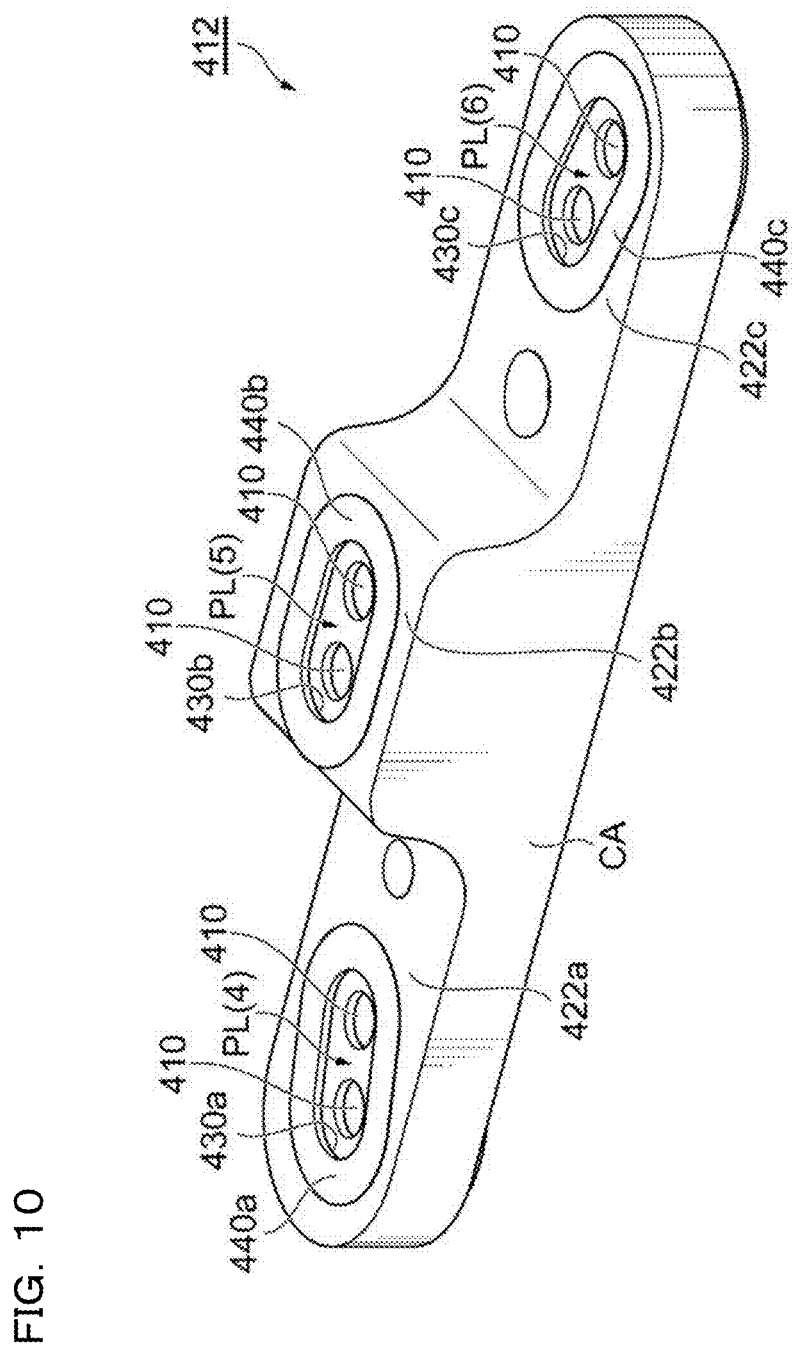
FIG. 10 is a perspective view of a stage marker unit which can be mounted on the stage unit.
Figure 11:
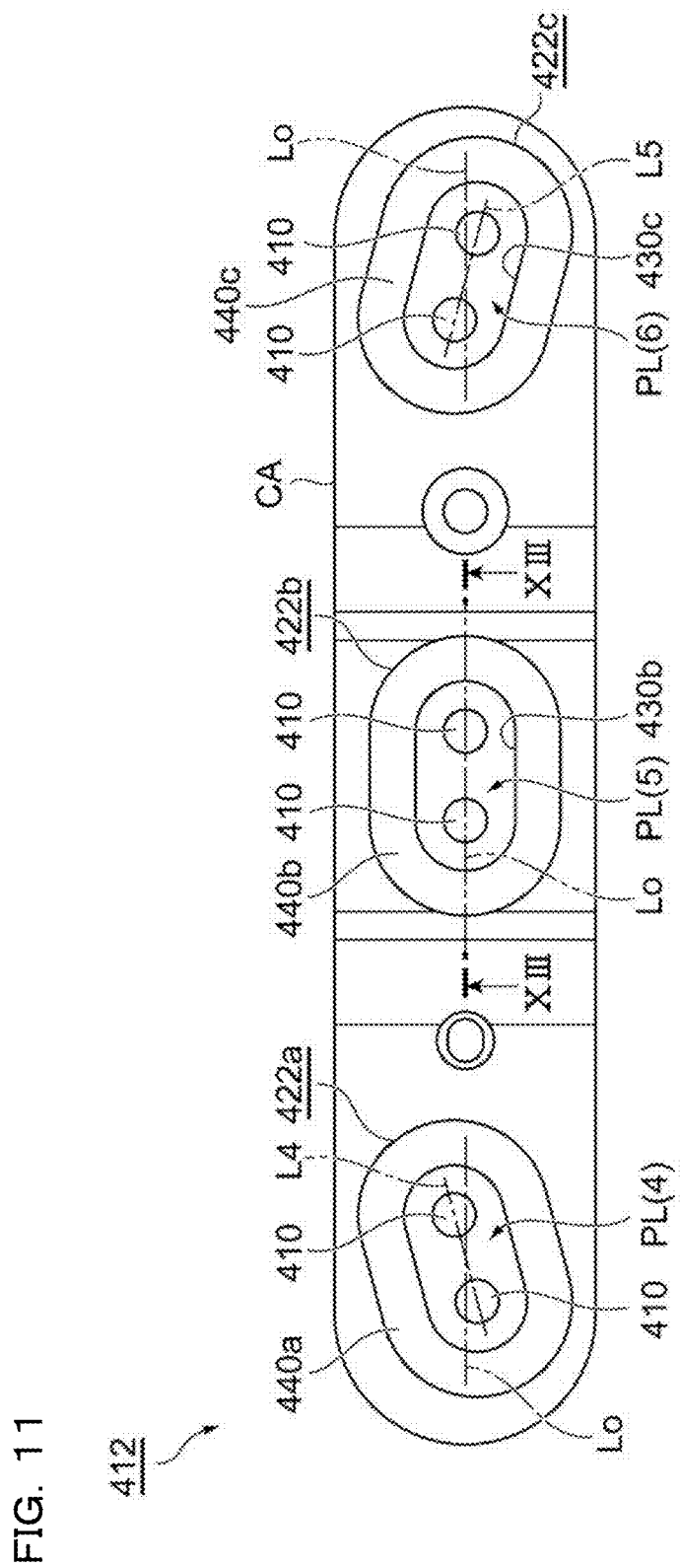
FIG. 11 is a plan view of the stage marker unit.
Figure 12:
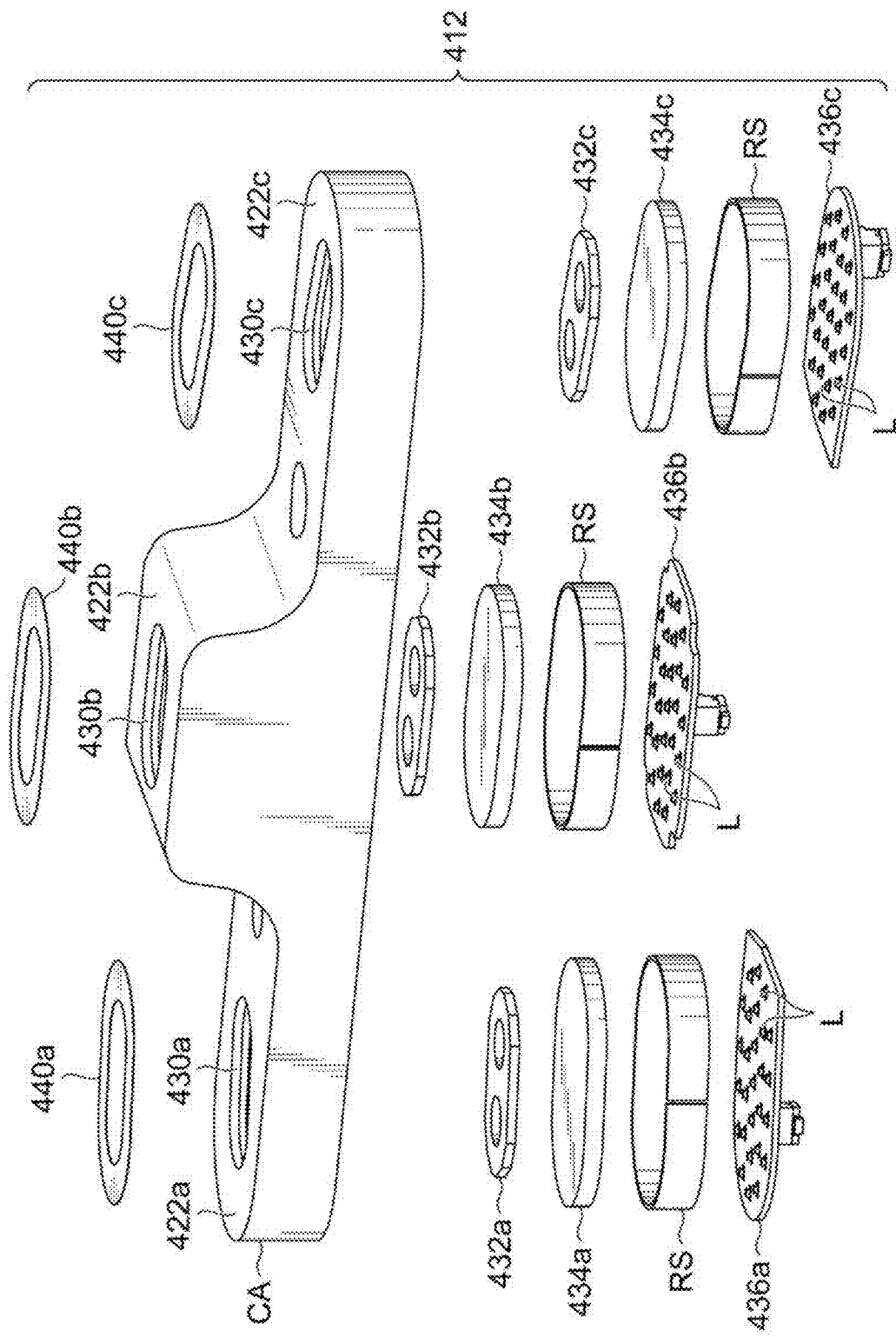
FIG. 12 is an exploded perspective view of the stage marker unit.
Figure 13:
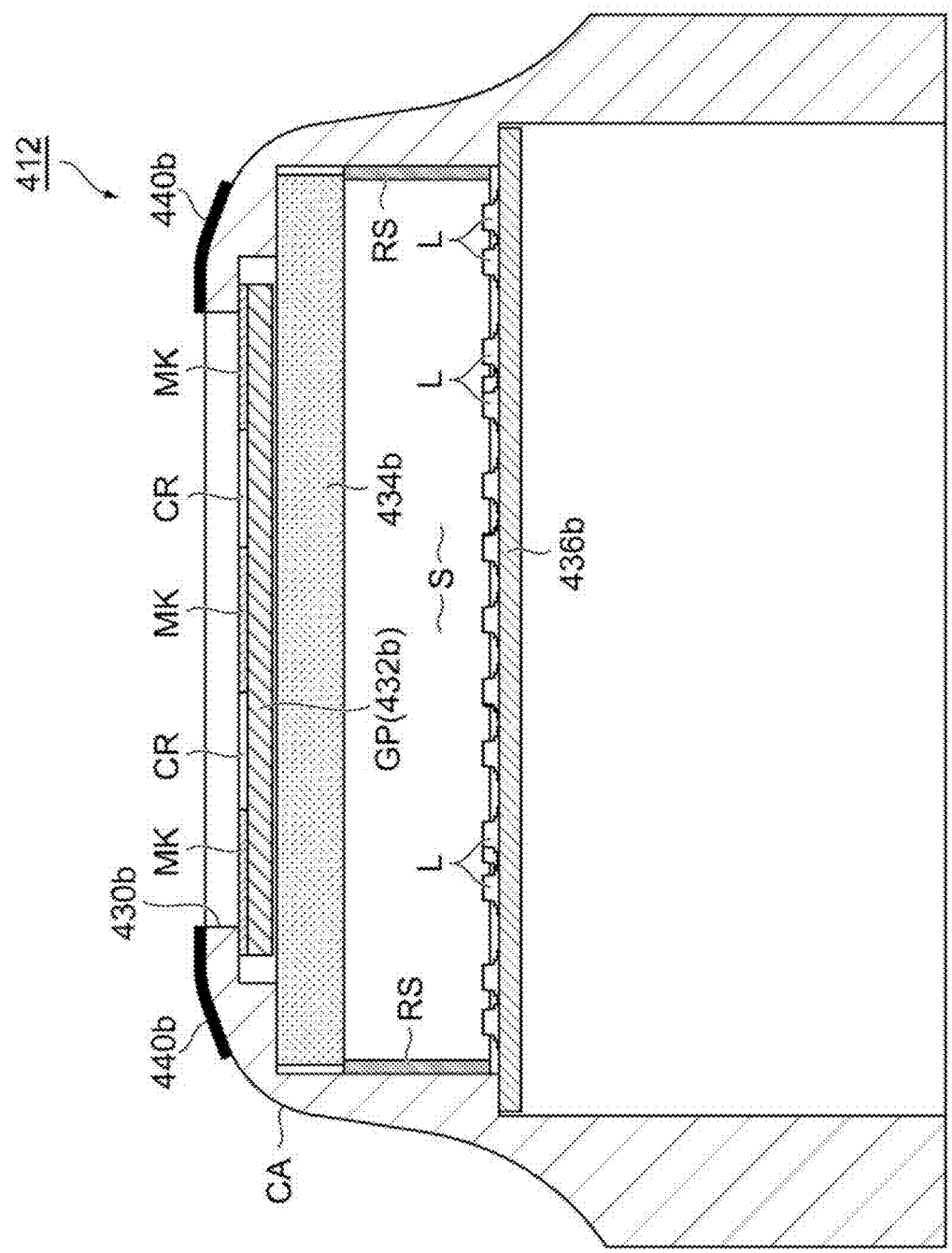
FIG. 13 is a sectional view taken along line XIII-XIII of FIG. 11.

Details of Stage Marker Unit: FIGS. 10 to 13 illustrate the stage marker unit 412. FIG. 10 is a perspective view of the stage marker unit 412. FIG. 11 is a plan view of the stage marker unit 412. FIG. 12 is an exploded perspective view of the stage marker unit 412. FIG. 13 is a sectional view taken along line XIII-XIII of FIG. 11.

Referring to FIG. 11, the stage marker unit 412 has an elongated shape linearly extending and includes a plurality of stage markers 410. A height difference is preferably provided between the plurality of stage markers 410. The stage marker unit 412 includes three blocks 422a, 422b, 422c. The first block 422a is located in one end part of the stage marker unit 412. The second block 422b is located in a central part of the stage marker unit 412. The third block 422c is located in the other end part of the stage marker unit 412. There is preferably a height difference between the first block 422a and the second block 422b and between the third block 422c and the second block 422b.

In the embodiment, the second block 422b which is located in the central part is high, and the first and third blocks 422a, 422c are low. Of course, alternatively, the second block 422b which is located in the central part may be low, and the first and third blocks 422a, 422c may be high. Although the first and third blocks 422a, 422c preferably have the same height, the first and third blocks 422a, 422c may have different heights. A first distance between the first block 422a and the second block 422b is preferably equal to a second distance between the second block 422b and the second block 422c. Accordingly, even when the table 400 is displaced in any direction, the marker detection accuracy can be maintained constant.

Although each of the first to third blocks 422a, 422b, 422c may include a single stage marker 410, each of the first to third blocks 422a, 422b, 422c preferably includes a plurality of stage markers 410. Although, in the embodiment, each of the first to third blocks 422a, 422b, 422c includes two stage markers 410, the first to third blocks 422a, 422b, 422c may include a different number of stage markers 410. For example, each of the first to third blocks 422a, 422b may include two stage markers 410, and the central second block 422b may include three stage markers 410. Further, a plurality of stage markers 410 belonging to each of the blocks 422a, 422b, 422c are preferably separated from each other at the same interval.

Referring to FIG. 11, the two stage markers 410 of the second block 422b are disposed at a first interval on a longitudinal direction axis $L_0$ of the stage marker unit 412. The two stage markers 410 of the first block 422a are disposed at a second interval on an axis $L_4$ which intersects the longitudinal direction axis $L_0$. The two stage markers 410 of the third block 422c are disposed at a third interval on an axis $L_5$ which intersects the longitudinal direction axis $L_3$. In the two adjacent blocks 422a, 422b or 422b, 422c, a first array direction of the stage markers 410 of one block 422a or 422c differs from a second array direction of the stage markers 410 of the other block 422b. Preferably, the first to third intervals are equal to each other. Further, the stage markers 410 are preferably right-left asymmetric in FIG. 11.

As described above, there is preferably a height difference between the first block 422a and the second block 422b and between the third block 422c and the second block 422b. That is, referring to FIG. 11, a first plane PL (4) which is occupied by the two stage markers 410 belonging to the first block 422a, a second plane PL (5) which is occupied by the two stage markers 410 belonging to the second block 422b, and a third plane PL (6) which is occupied by the two stage markers 410 belonging to the third block 422c are parallel to each other. Further, there is a first height difference between the first plane PL (4) and the second plane PL (5). Similarly, there is a second height difference between the second plane PL (5) and the third plane PL (6). The first height difference and the second height difference may be equal to each other or may be different from each other.

Similarly to the probe marker 212 described above, although the stage marker 410 may be a retroreflective marker, the stage marker 410 is preferably a self-luminous marker. In the embodiment, the stage marker 410 is a self-luminous marker which employs an infrared LED as a light source. Infrared rays having a wavelength of 860 nm are periodically emitted from each of the stage markers 410. Each of the stage markers 410 is oriented to the main imaging unit 600 by incorporating the stage marker unit 412 into the table 400. Images of infrared rays emitted from the plurality of stage markers 410 are captured by the main imaging unit 600.

A case CA of the stage marker unit 412 has a common basic design with the holding member 230 (FIG. 5) of the probe 200 described above. The internal structure (FIGS. 5 to 7) of the stage marker unit 412 has a common basic design with the internal structure of the holding member 230 of the probe 200. Thus, the stage marker unit 412 will be described using the same reference signs for elements common with the probe 200.

Referring to FIG. 12, the case CA of the stage marker unit 412 is preferably made of a material having a low hygroscopicity and a small linear expansion coefficient similarly to the holding member 230 (FIG. 5) of the probe 200. Thus, for the case CA of the stage marker unit 412, refer to the above description of the holding member 230. Of course, the material of the case CA may be glass, ceramic, metal, an alloy, or glass ceramic, for example. In the embodiment, quartz glass is used as the material of the case CA of the stage marker unit 412.

The case CA includes an elliptical first window 430a which defines the first block 422a, an elliptical second window 430b which defines the second block 422b, and a third window 430c which defines the third block 422c.

A first marker member 432a, a second marker member 432b, and a third marker member 432c are located respectively facing the first window 430a, the second window 430b, and the third window 430c. Further, first to third diffuser plates 434a, 434b, 434c are located under the first to third marker members 432a, 432b, 432c. Further, first to third light emitting substrates 436a, 436b, 436c are located under the first to third diffuser plates 434a, 434b, 434c.

A circular light transmissive region CR corresponding to the stage marker 410 is formed on one face (the upper face of FIG. 13) of each of the first to third marker members 432a, 432b, 432c. The first to third marker members 432a, 432b, 432c basically have the same configuration. Thus, these marker members are collectively referred to as a marker member 432.

Referring to FIG. 13, the marker member 432 is similar to the marker member 232 (FIG. 6) of the probe 200, and a main material thereof is a plate-like member GP which is made of a flat glass plate. Thus, it should be understood that the marker member 432 of the stage marker 410 has the same configuration as the marker member 232 (FIG. 6) of the probe 200. Specifically, the plate-like member GP has a high light transmittance. In an embodiment in which, for example, quartz glass or soda glass is used as the material of the plate-like member GP, quartz glass having a small linear expansion coefficient and a low hygroscopicity is employed. The plate-like member GP is preferably made of the same material as the case CA. In the embodiment, both the case CA and the plate-like member GP are made of quartz glass.

The light transmissive region CR is formed by printing a light blocking mask MK on one face of the plate-like member GP in a manner to surround the light transmissive region CR. It should be understood that the light blocking mask MK is also the same as the light blocking mask MK of the marker member 232 (FIG. 6) of the probe 200. A metal material having a high absorptivity (high adhesion) with respect to glass is preferably used as the material of the mask MK. A concrete example of the metal material includes chromium. The mask MK may be formed of a single light blocking film, or formed by laminating a plurality of light blocking films. Further, the mask MK may be formed using emulsion ink or another organic ink.

The contour of the light transmissive region CR which transmits infrared rays is not limited to a circular shape. The light transmissive region CR may have any contour shape. For example, the light transmissive region CR may have an arrow contour. The number of light transmissive regions CR can be reduced by employing a shape having directivity.

Although there has been described an example in which a flat glass plate is employed as the material of the plate-like member GP, the region CR may have a semicircular convex shape. The semicircular convex shape of the region CR enables the accuracy of identifying the position of the stage marker 410 to be improved.

Referring to FIGS. 12 and 13, the first to third diffuser plates 434a, 434b, 434c basically have the same configuration. Thus, these diffuser plates are collectively referred to as a diffuser plate 434. The diffuser plate 434 is also similar to the diffuser plate 234 (FIG. 7) of the probe 200. That is, the diffuser plate 434 has a function of diffusing and transmitting light and is made of, for example, a resin material. The diffuser plate 434 preferably has a larger area than the marker member 432 and preferably has a larger area than the first window 430a, the second window 430b, and the third window 430c.

Referring to FIGS. 12 and 13, the above first to third light emitting substrates 436a, 436b, 436c basically have the same configuration. Thus, these light emitting substrates are collectively referred to as a light emitting substrate 436. A plurality of light emitting elements L are mounted on the upper face of the light emitting substrate 436 of the stage marker 410. The plurality of light emitting elements L are substantially uniformly arranged on the entire light emitting substrate 436 which is disposed in a manner to overlap the diffuser plate 434. In this embodiment, each of the light emitting elements L is an infrared light emitting diode (LED). As a modification of the light emitting element L, an LED that emits light having another wavelength may be used or a filament may be used.

FIGS. 10 to 12 illustrate light blocking sheets 440a, 440b, 440c. A light leakage prevention member such as the light blocking sheet 440a, 440b, 440c is preferably provided around each of the windows 430a, 430b, 430c to prevent light from leaking to the outside from the periphery of each of the windows 430a, 430b, 430c.

Figure 14:
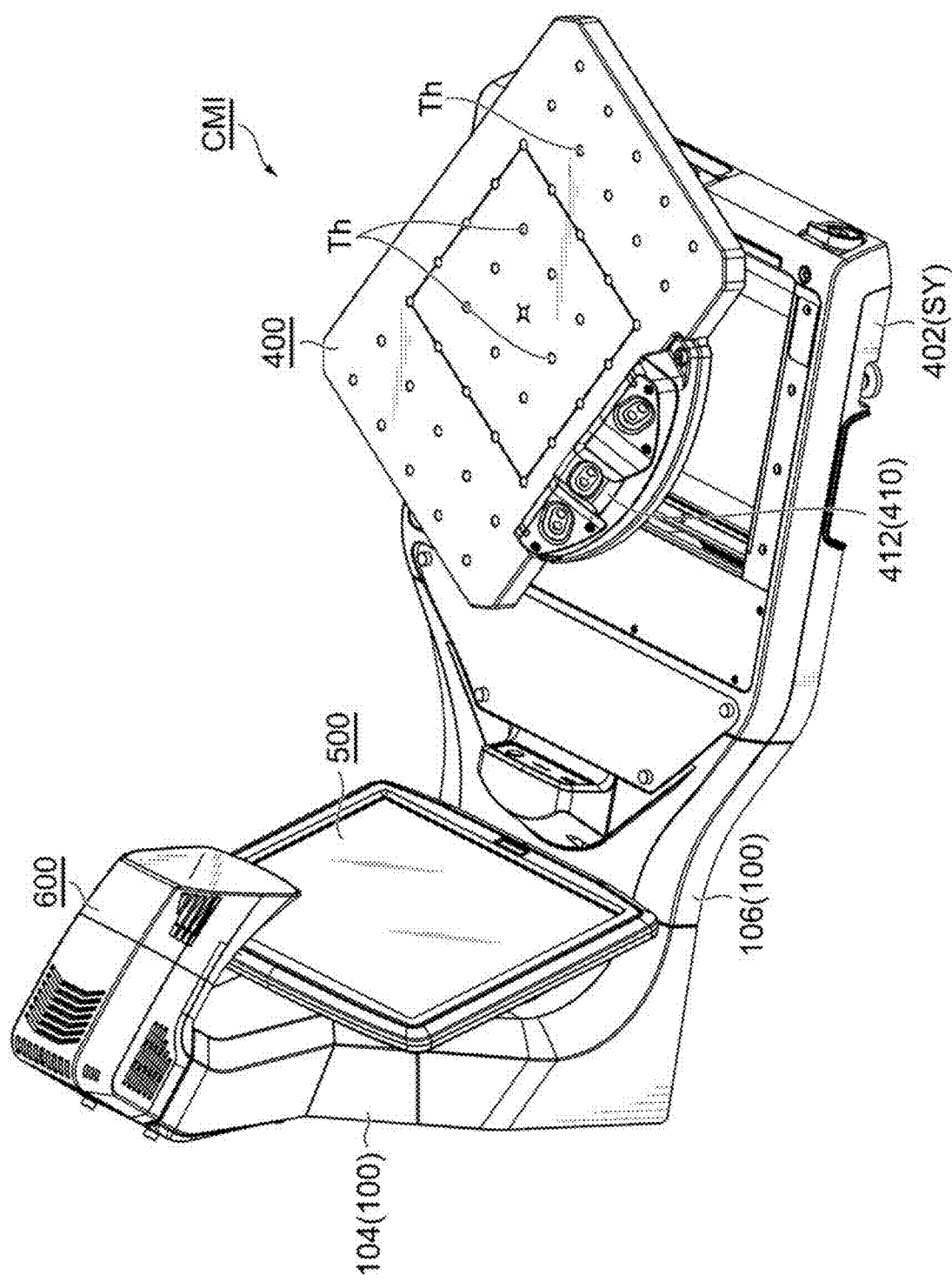
FIG. 14 is a perspective view of the optical three-dimensional coordinate measuring device of the embodiment and illustrates a state in which the displaceable table rotates from the original position.

Displacement of Table: As described above, the table 400 is displaceable. FIGS. 1 and 9 illustrate a state in which the table 400 is fixed at an original position. FIG. 14 illustrates a state in which the table 400 is displaced from the original position (FIG. 9). To make description for the displacement of the table 400 from the original position easy, an X axis, a Y axis, and a Z axis are illustrated in FIG. 9.

As described above, the optical three-dimensional coordinate measuring device CMI is designed in such a manner that an operator makes access to the optical three-dimensional coordinate measuring device CMI from the side that is opposite to the display unit 500 which is leaned against the standing part 104 and faces obliquely upward and corresponds to the second side edge 400b of the table 400. When viewed from an operator, the X axis extends in a direction crossing an imaging space V, that is, the right-left direction, the Y axis extends in a direction vertically cutting the imaging space V, that is, the front-rear direction, and the Z axis extends in the up-down direction.

In the embodiment, the table 400 is translatable in the X-axis direction, that is, the direction crossing the imaging space V. Further, the table 400 is rotatable in the clockwise direction and the counterclockwise direction around the Z axis. The direction of the displacement of the table 400 from the original position is not limited to the X-axis direction and the rotation direction around the Z axis, and may be any direction. For example, the displacement may include a so-called tilt displacement in which, around any side, for example, one side of the rectangular table 400, the other side opposite to the one side displaces up and down.

Further, the table 400 may be displaceable in the Y-axis direction, that is, the front-rear direction. However, the displacement in the front-rear direction (Y-axis direction) may deteriorate the accuracy of reading the stage marker 410. Thus, a plurality of stage marker units 412 are preferably disposed on the table 400 as a complement.

Further, the table 400 may be displaceable in the Z-axis direction, that is, the up-down direction. Alternatively, the main imaging unit 600 may be designed so as to be displaceable in the Z-axis direction.

Operation of System: Referring to FIGS. 1 and 2, light reception signals output from the main imaging unit 600 and the sub imaging unit 210 (FIG. 4) of the probe 200 are sampled at a constant sampling period and converted into digital signals by the A/D converter of the control board 106. The digital signals output from the A/D converter are sequentially stored into the FIFO memory. The digital signals stored in the FIFO memory are sequentially transferred to the personal computer PC as pixel data.

In the embodiment, light emission timings of the probe marker 212 and the stage marker 410 and an imaging timing of the main imaging unit 600 are synchronized with each other. Pixel data stored in a light emission period of the plurality of markers 212, 410 is transferred from the control board 180 to the personal computer PC in the next quenching period of the markers 212.

As described above, the light emission timing of the probe marker 212 is simultaneous with the light emission timing of the stage marker 410. Thus, it is possible to easily distinguish between the probe marker 212 and the stage marker 410. Alternatively, alternate light emission and simultaneous light emission may be combined. That is, positional information of the probe marker 212 and the stage marker 410 may be obtained by alternate light emission, and correct positional information of the probe marker 212 and the stage marker 410 and relative positional information of the probe marker 212 and the stage marker 410 may be obtained by the next simultaneous light emission.

The storage unit 2 of the personal computer PC includes a read only memory (ROM), a random access memory (RAM), and a hard disk. A system program is stored in the storage unit 2. The storage unit 2 is used for storing various data processing and various data such as pixel data given from the optical three-dimensional coordinate measuring device CMI.

The personal computer PC generates image data on the basis of pixel data given from the three-dimensional coordinate measuring device CMI. The image data is an aggregate of a plurality of pieces of pixel data. The personal computer PC calculates a relative position of the contactor 208a of the stylus 208 of the probe 200 on the basis of the generated image data and then calculates absolute coordinates of a measurement point.

The operation unit 300 illustrated in FIGS. 1 and 2 is manually operated by an operator for various settings of the three-dimensional coordinate measuring device CMI and change of display contents of the display unit 500.

Calibration: The main imaging unit 600, the probe 200, and the stage marker unit 412 are conveyed to a calibration facility for calibration. For storing calibration information, memories are mounted on the main imaging unit 600, the probe 200, and the stage marker unit 412.

Calibration information of the main imaging unit 600 is stored in the memory incorporated in the main imaging unit 600. The calibration information of the main imaging unit 600 includes, as characteristics of the main imaging unit 600, an angle of view (viewing angle), the positional relationship between the imaging element and a plurality of lenses, and an aberration of the plurality of lenses. Calibration information of the probe 200 is stored in the memory incorporated in the probe 200. The calibration information of the probe 200 is information for preventing a reduction in the measurement accuracy caused by an individual difference of the probe 200 and includes the relative positional relationship between the plurality of probe markers 212. Calibration information of the stage marker unit 412 is stored in the memory incorporated in the stage marker unit 412. The calibration information of the stage marker unit 412 is information for preventing a reduction in the measurement accuracy caused by an individual difference of the stage marker unit 412 and includes the relative positional relationship between the plurality of stage markers 410.

When the main imaging unit 600 and the stage marker unit 412 are assembled to the three-dimensional coordinate measuring device CMI, calibration information items of the main imaging unit 600, the probe 200, and the stage marker unit 412 are supplied to the control board 106 and further supplied to the personal computer PC. The personal computer PC performs coordinate measurement of a measurement point of the workpiece WP on the basis of these calibration information items.

Figure 15:
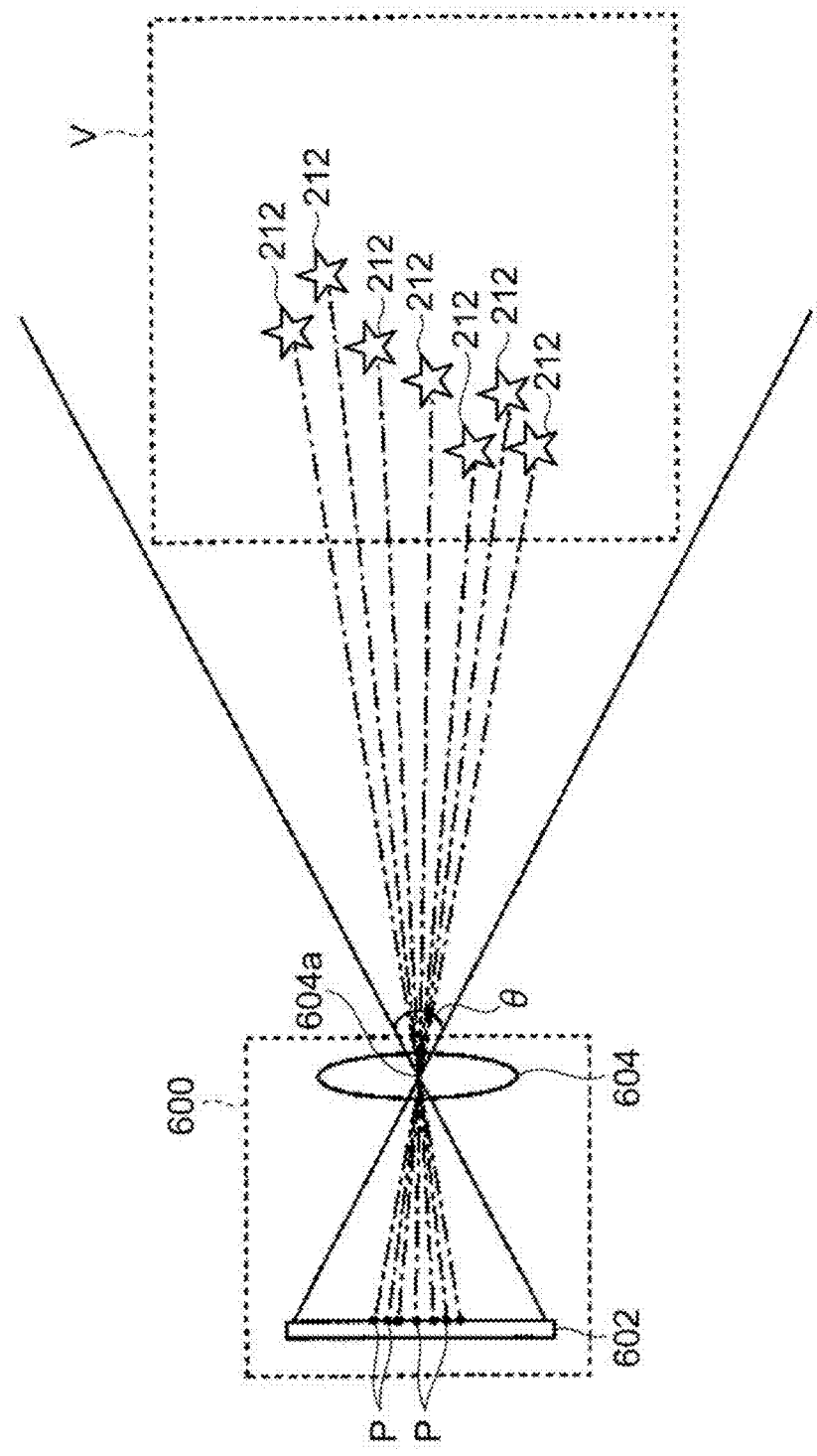
FIG. 15 is a diagram for describing detection by a main imaging unit which is mounted on the optical three-dimensional coordinate measuring device of the embodiment.

Detection by Main Imaging Unit: FIG. 15 is a diagram for describing detection by the main imaging unit. The main imaging unit 600 detects infrared rays emitted from the plurality of probe markers 212 of the probe 200 and the plurality of stage markers 410 of the stage marker unit 412. The principle of identifying the positions of the probe markers 212 and the stage markers 410 will be described with reference to FIG. 15. FIG. 15 illustrates the relationship between the main imaging unit 600 and the probe markers 212. The same applies to the relationship between the main imaging unit 600 and the stage markers 410.

Referring to FIG. 15, a description will be made using an optically simplified model which has a function similar to a pinhole camera model in order to facilitate understanding. FIG. 15 illustrates an imaging element substrate 602 which is included in the main imaging unit 600. FIG. 15 illustrates one of the plurality of lenses included in the main imaging unit 600, specifically, a lens 604. Light is guided to an imaging element (the imaging element substrate 602) through a principal point 604a of the lens 604.

The main imaging unit 600 has a certain angle of view (viewing angle) θ. The imaging space V is included within the range of the angle of view θ of the main imaging unit 600. When each of the plurality of probe markers 212 is located within the imaging space V, infrared rays emitted from the probe markers 212 enter the imaging element (the imaging element substrate 602) through the principal point 604a of the lens 604.

A direction from the principal point 604a of the lens 604 toward each of the probe markers 212 is identified on the basis of a light reception position P on the imaging element substrate 602. In the example of FIG. 15, as indicated by a dot-dash line, each probe marker 212 is located on each straight line passing through each light reception position P and the principal point 604a of the lens 604. As described above, the relative positional relationship between the plurality of probe markers 212 is given as the calibration information of the probe 200 from the probe 200 to the control unit 220.

A position of the center of each probe marker 212 is uniquely determined on the basis of the direction from the principal point 604a of the lens 604 toward each probe marker 212 and the positional relationship between the plurality of probe markers 212. Further, in the present embodiment, the X axis, the Y axis, and the Z axis which are perpendicular to each other are defined, and an absolute position within the imaging space V is represented by three-dimensional coordinates. The personal computer PC calculates coordinates of the center of each probe marker 212 on the basis of the light reception position P on the imaging element (the imaging element substrate 602) and the previously stored positional relationship between the plurality of probe markers 212.

The personal computer PC calculates coordinates of a contact position between the contactor 208a (FIG. 4) of the probe 200 and the workpiece WP on the basis of the calculated coordinates of the center of each probe marker 212.

For example, the positional relationship between the center of each probe marker 212 and the center of the contactor 208a (FIG. 4) is previously stored in the storage unit 2 of the personal computer PC. Coordinates of the center of the contactor 208a are identified on the basis of the calculated coordinates of the center of each probe marker 212 and the previously stored positional relationship between the center of each probe marker 212 and the center of the contactor 208a.

Further, the attitude of the probe 200 is identified on the basis of the coordinates of the center of each probe marker 212. Accordingly, the orientation of the stylus 208 is identified. Further, a movement direction of the contactor 208a is identified on the basis of a change in the coordinates of the center of each probe marker 212. Typically, the contactor 208a is perpendicularly brought close to the plane of the workpiece WP. Thus, the relative positional relationship between the center of the contactor 208a and the contact position is estimated on the basis of the identified orientation of the stylus 208 and the identified movement direction of the contactor 208a. Coordinates of the contact point between the contactor 208a and the workpiece WP are calculated from the coordinates of the center of the contactor 208a on the basis of the estimated positional relationship.

Note that the probe 200 may be provided with a sensor which detects a direction of a force that is applied from the workpiece WP to the contactor 208a. In this case, it is possible to calculate coordinates of the contact position between the contactor 208a and the workpiece WP on the basis of a result of detection by the sensor.

Figure 16:
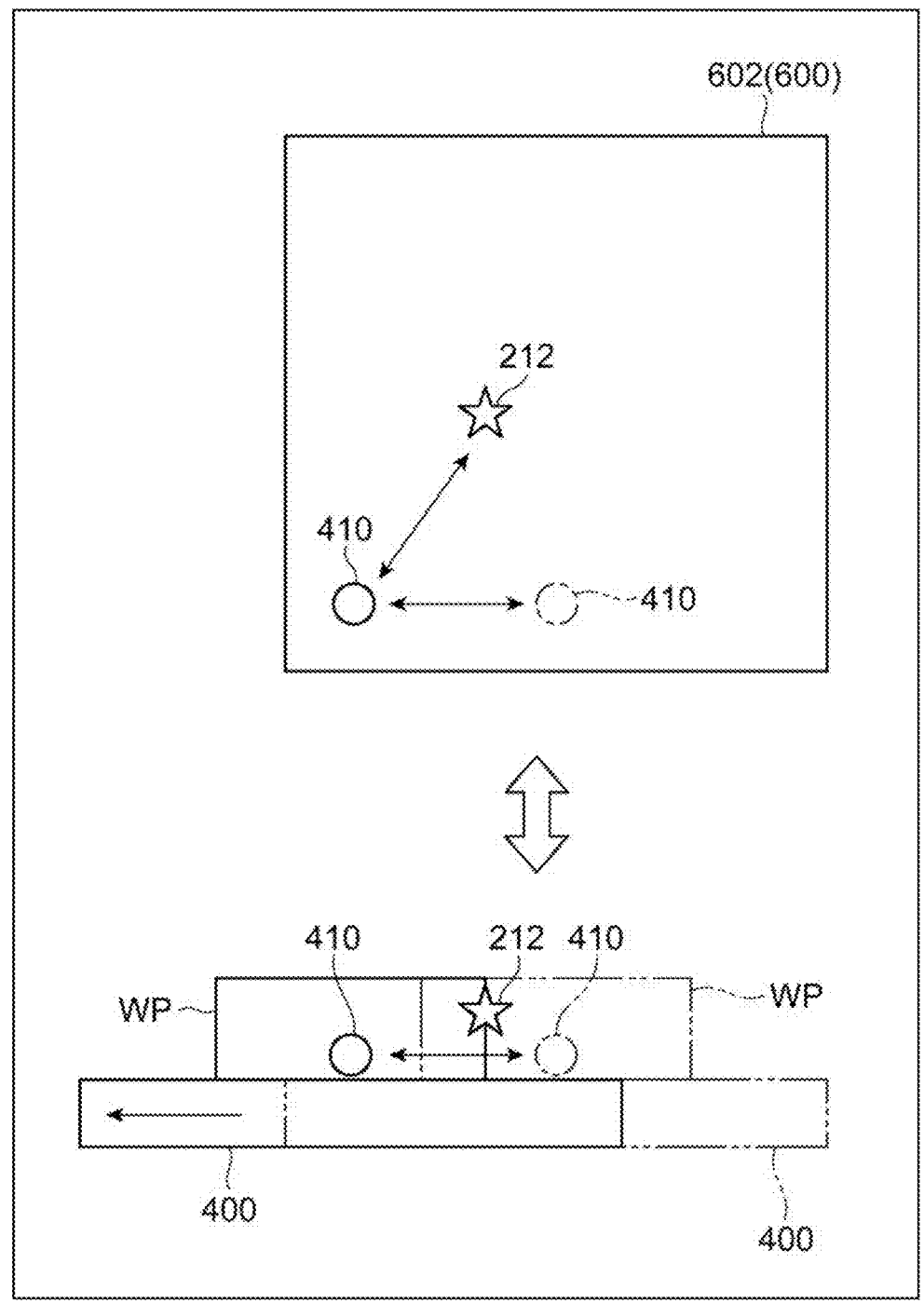
FIG. 16 is a diagram for schematically describing a state change which is caused when a measurement operation is performed with the table displaced from the original position.

FIG. 16 is a diagram for schematically describing a state change which is caused when a measurement operation is performed with the table 400 displaced from the original position. When the table 400 with the measurement object, that is, the workpiece WP fixed thereto is displaced, for example, in the X-axis direction (FIG. 9), that is, the right-left direction when viewed from an operator, the stage marker 410 is displaced together with the table 400. Thus, a light reception position of the stage marker 410, that is, a light reception position on the imaging element substrate 602 (FIG. 15) is displaced. Then, a light reception position of the probe marker 212 is identified from the relationship with the displaced light reception position.

Thus, a captured image of the main imaging unit 600 includes first information of the position and the attitude of the probe 200 and second information of the position and the attitude of the table 400. Then, positional information of the contactor 208a (FIG. 4) of the probe 200 can be obtained by processing the captured image (FIG. 16, FIG. 17).

The optical three-dimensional coordinate measuring device CMI includes a plurality of three-dimensional coordinate systems and performs measurement or display by appropriately using these plurality of three-dimensional coordinate systems. The plurality of three-dimensional coordinate systems include at least a fixed coordinate system. This fixed coordinate system is referred to as an "absolute coordinate system" or an "absolute position coordinate". The "absolute coordinate system" or the "absolute position coordinate" is a coordinate system corresponding to when the workpiece WP is viewed from an operator. Even when the table 400 is displaced, this coordinate system is a fixed coordinate system which does not change. In other words, this coordinate system is a coordinate system corresponding to when the workpiece WP is viewed from the fixed main imaging unit 600.

The plurality of three-dimensional coordinate systems also include a coordinate system that moves together with the displacement of the table 400. This coordinate system is referred to as a "relative coordinate system" or a "relative position coordinate". The "relative coordinate system" or the "relative position coordinate" is displaced together with the displacement of the workpiece WP in relation to the displacement of the table 400, that is, the displacement of the workpiece WP, but is fixed and not displaced when viewed from the workpiece WP.

Figure 17:
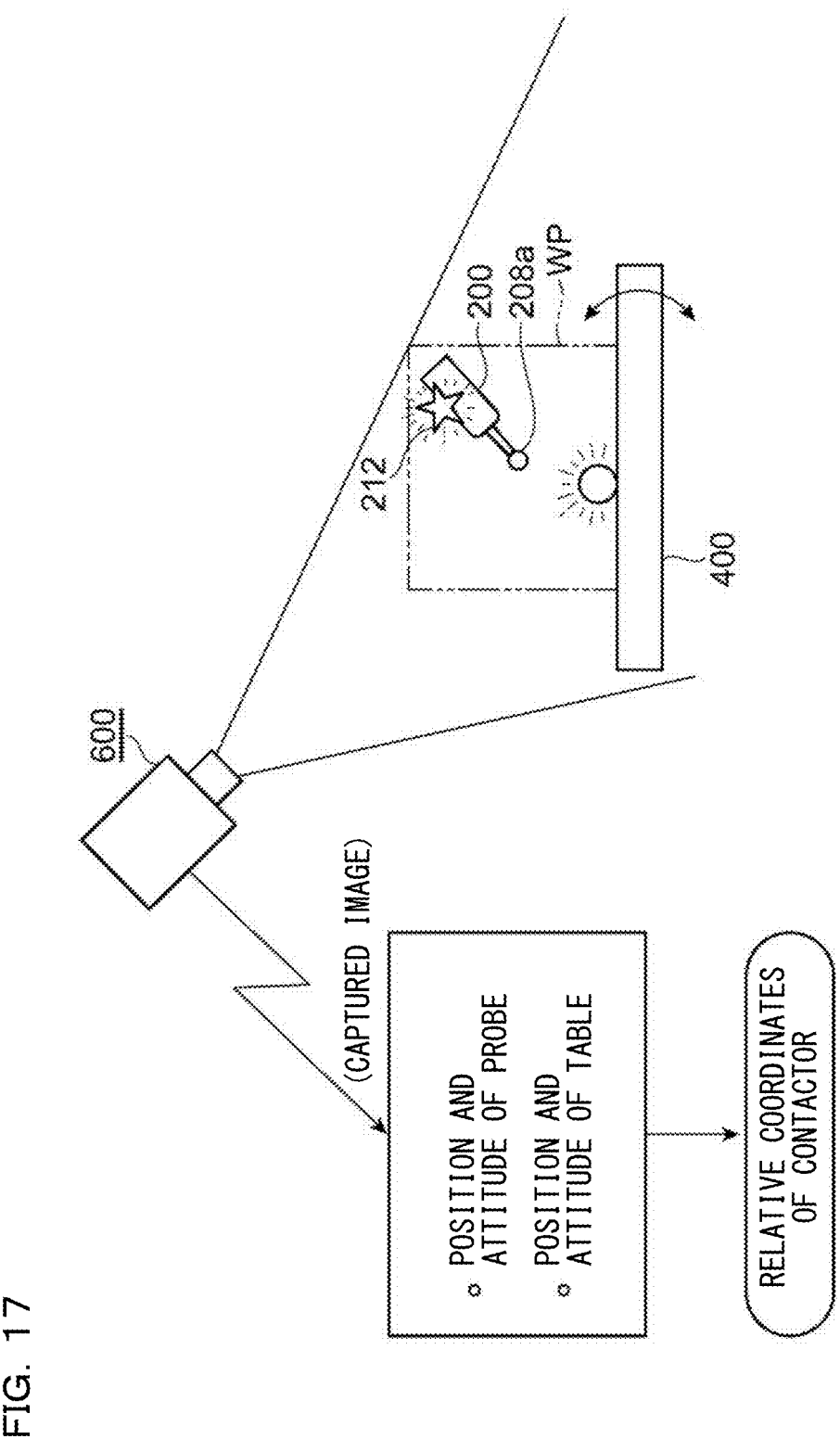
FIG. 17 is a diagram for describing a mechanism of optically identifying the position and the of the probe and the position and the attitude of the table using a captured image.

Referring to FIG. 17, the imaging space of the fixed main imaging unit 600 corresponds to the absolute coordinate system. The main imaging unit 600 incorporates a plurality of pixels therein. When description is made using a term "camera coordinate system" which is generally called, in the embodiment, the plane of the imaging element substrate 602 (FIG. 15) constitutes XY coordinates of the camera coordinate system, that is, the absolute coordinate system.

On the other hand, in the relative coordinate system, XY coordinate axes are set, for example, on the surface of the table 400, that is, a workpiece placing surface. This is referred to as a table coordinate system. The relative coordinate system is not limited to the table coordinate system. For example, in measurement of a part of the workpiece WP, when a plurality of measurement points are measured on a specific face having a certain height level, XY coordinate axes may be set on a plane to be a reference for this height level. Specifically, when the workpiece WP is provided with a cylindrical projection which is a geometrical element, and a plurality of measurement points are set on the circumference of the cylindrical part at a predetermined height level, it is preferred to set a plane on which the base end of the cylindrical projection is located as a reference plane and to set XY coordinate axes on the reference plane.

In the embodiment, the position and the attitude of the probe 200 and the position and the attitude of the table 400 are calculated in the absolute coordinate system on the basis of the image processing. That is, in the embodiment, parameters such as the displacement amount and the displacement direction of the table 400 from the original position can be substantially detected on the basis of an image that is optically captured by the main imaging unit 600.

The relative coordinate system is used in extraction of a geometrical element included in the measurement object, that is, the workpiece WP, that is, for example, a point, a line, a plane, a cylinder, or a sphere. When the length dimension of a long workpiece WP is measured by moving the table 400, the relative coordinate system may be transformed to the absolute coordinate system to obtain the length dimension of the workpiece WP. Of course, relative position coordinates of the relative coordinate system can be used in local measurement (e.g., measurement of the inner diameter of an opening or the diameter of a projection or recess included in the workpiece WP).

The relative coordinate system is used for determining, on the basis of a plurality of relative position coordinates of the workpiece WP and a previously set geometrical element (a point, a line, a plane, a cylinder, or a sphere), the relative position of the geometrical element.

In display of the display unit 500, an image is preferably created by transformation to the absolute coordinate system. For example, in measurement of the length dimension of a long workpiece WP, when a first plane which represents one end face of the workpiece WP and a second plane which represents the other end face of the workpiece WP are image-displayed, the first and second planes can be displayed on the display unit 500 in the same state as being viewed by an operator by displaying the first and second planes in the absolute coordinate system.

A workpiece WP (e.g., an oblong workpiece) that is larger than the imaging space V can be measured by a simple operation of displacing the table 400. Further, also in measurement of a workpiece WP that fits within the imaging space V, when the position of the probe 200 is difficult to grasp when viewed from the main imaging unit 600, a reduction in the measurement accuracy can be prevented by a simple operation of rotating the table 400. Further, the measurement accuracy can be increased by displacing the table 400 to bring a face of the workpiece WP to be measured close to the main imaging unit 600.

According to the optical three-dimensional coordinate measuring device CMI, even when the table 400 is displaced, it is only required that the relative positional relationship between the stage marker unit 412, the probe 200, and the main imaging unit 600 can be maintained only at the instant when the main imaging unit 600 captures an image. Thus, it is not necessary to continuously maintain the fixed relative positional relationship between the main imaging unit 600 and the stage marker unit 412. That is, the measurement accuracy of the optical three-dimensional coordinate measuring device CMI does not depend on the hardware configuration. For example, even when an attachment position of the stage marker unit 412 which is fixed to the table 400 is slightly deviated, the deviation does not affect the measurement accuracy of the optical three-dimensional coordinate measuring device CMI.

Figure 18:
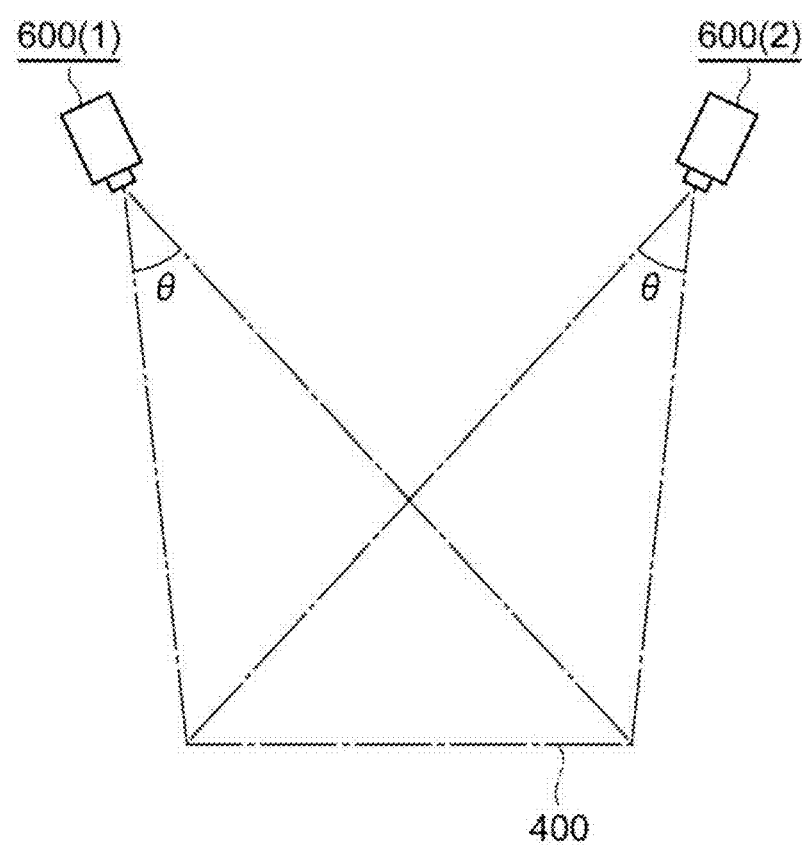
FIG. 18 is a diagram for describing an example in which a plurality of main imaging units stereoscopically view the same imaging space.

In the embodiment, the optical three-dimensional coordinate measuring device CMI is provided with a single main imaging unit 600. Alternatively, as illustrated in FIG. 18, the optical three-dimensional coordinate measuring device CMI may be provided with, for example, two main imaging units 600 (1), 600 (2). When the optical three-dimensional coordinate measuring device CMI is provided with a plurality of main imaging units 600, the plurality of main imaging units 600 preferably stereoscopically view the same imaging space V.

The optical three-dimensional coordinate measuring device CMI makes it possible to ensure a certain measurement accuracy and portability using an optical principle without a dependence of the measurement accuracy on the hardware configuration. Further, it is possible to provide a simple and easy operability even for a worker in a work site who is inexperienced in the operation of a computer not only by electronically internal-processing a captured image to obtain three-dimensional position coordinates, but also providing an appropriate GUI.

Even when the table 400 is displaced, measurement position coordinates can be obtained by performing calculation using a captured image by internal processing of the personal computer PC without placing a load on an operator. Further, it is possible to provide guidance information regarding a measurement operation and visually display a measurement result using the display unit 500 for a site worker who is inexperienced in the three-dimensional coordinate measuring device. Further, it is possible to establish traceability of which part of the workpiece WP is measured and how the measurement is performed by storing data relating to measurement including a captured image of the sub imaging unit 210 which is disposed on the tip part of the probe 200. Of course, it is possible to ensure management of an operation and improve the convenience of quality control in a factory (manufacturing site) by printing various pieces of information created by the optical three-dimensional coordinate measuring device CMI and the personal computer PC using a printer.

Figure 19:
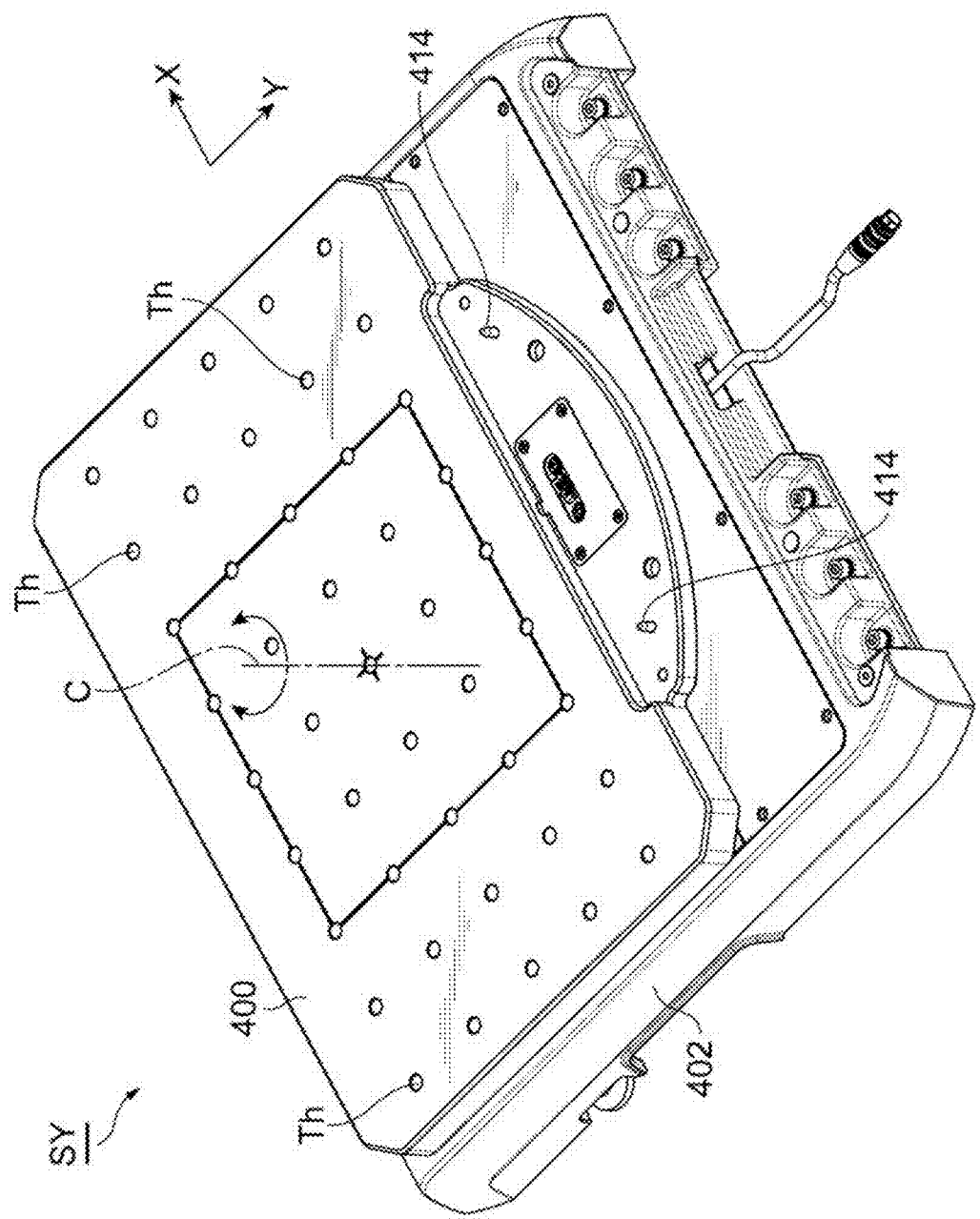
FIG. 19 is a perspective view of the stage unit similarly to FIG. 8 and illustrates a state in which the stage marker unit is detached.

Table Displacement Mechanism:

FIGS. 19 to 30 are diagrams for describing the stage unit. FIG. 19 illustrates the stage unit SY described above which includes the table 400 and the stage base 402. The stage unit SY is detachably attached to the main body 100. Referring to FIGS. 9 and 19, in the embodiment, the table 400 is movable in the X-axis direction (right-left direction) and also rotatable around a central axis C of the table 400. It is desired that the table 400 be undisplaceable unless a predetermined force or more is applied thereto in a movable direction. That is, it is not preferred in maintaining the measurement accuracy that the table 400 be displaced during the operation of the probe 200 by a worker. It is preferred that the table 400 be kept in a stationary state unless a worker applies an intentional force thereto. FIG. 19 illustrates a state in which the stage marker unit 412 (FIGS. 9 and 10) is detached.

Figure 20:
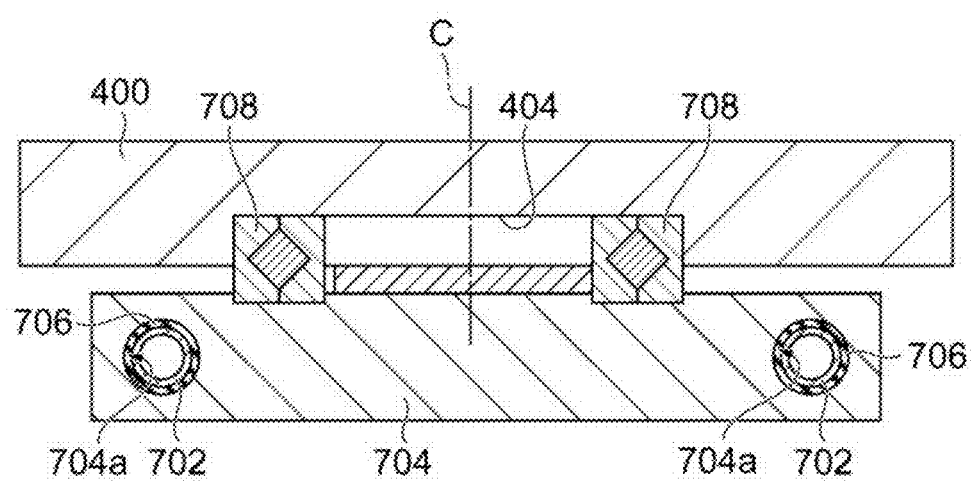
FIG. 20 is a diagram for describing a movement mechanism of the table in an X-axis direction.
Figure 21:
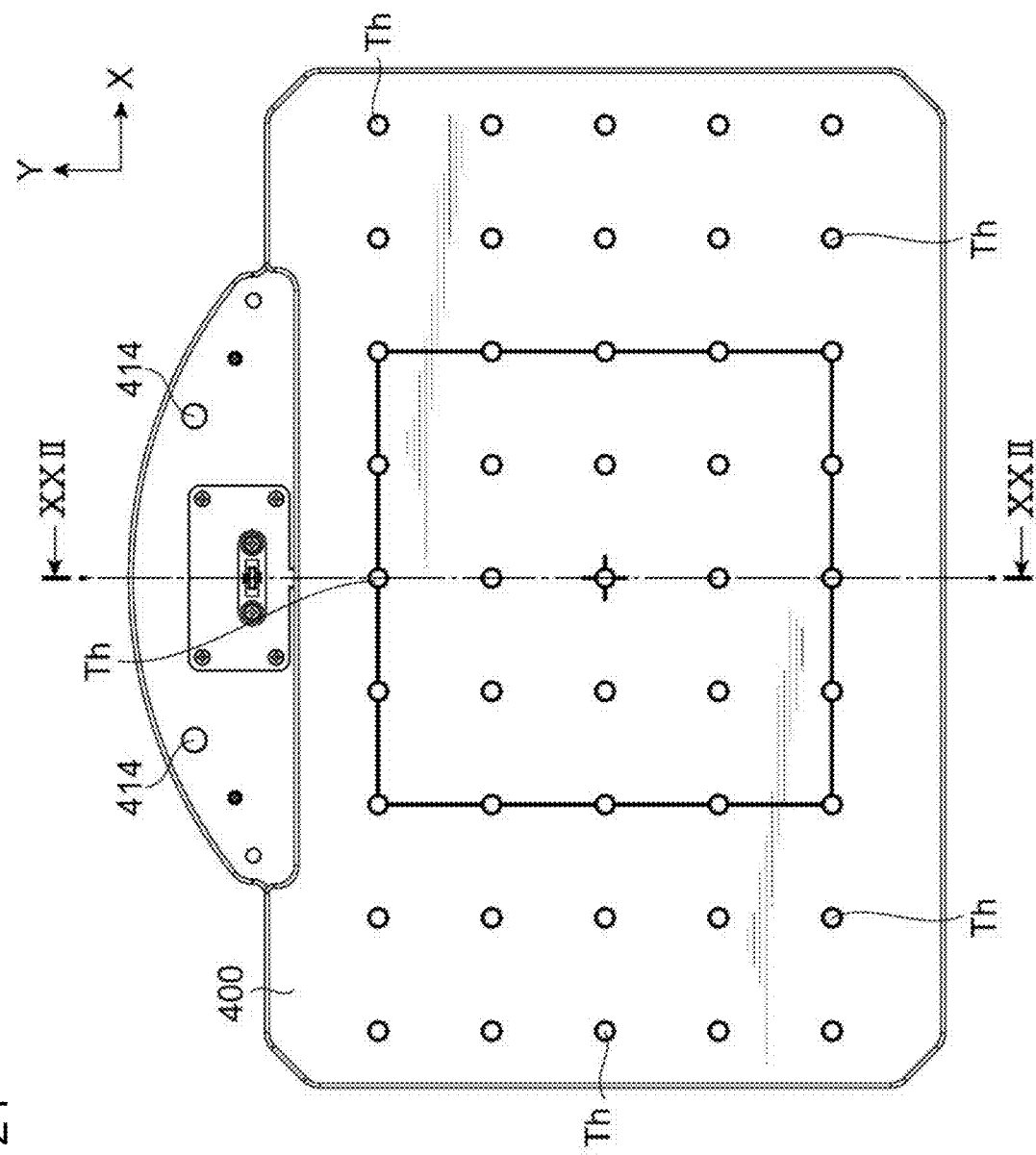
FIG. 21 is a plan view of the stage unit and illustrates a state in which the table is located at the original position.
Figure 22:
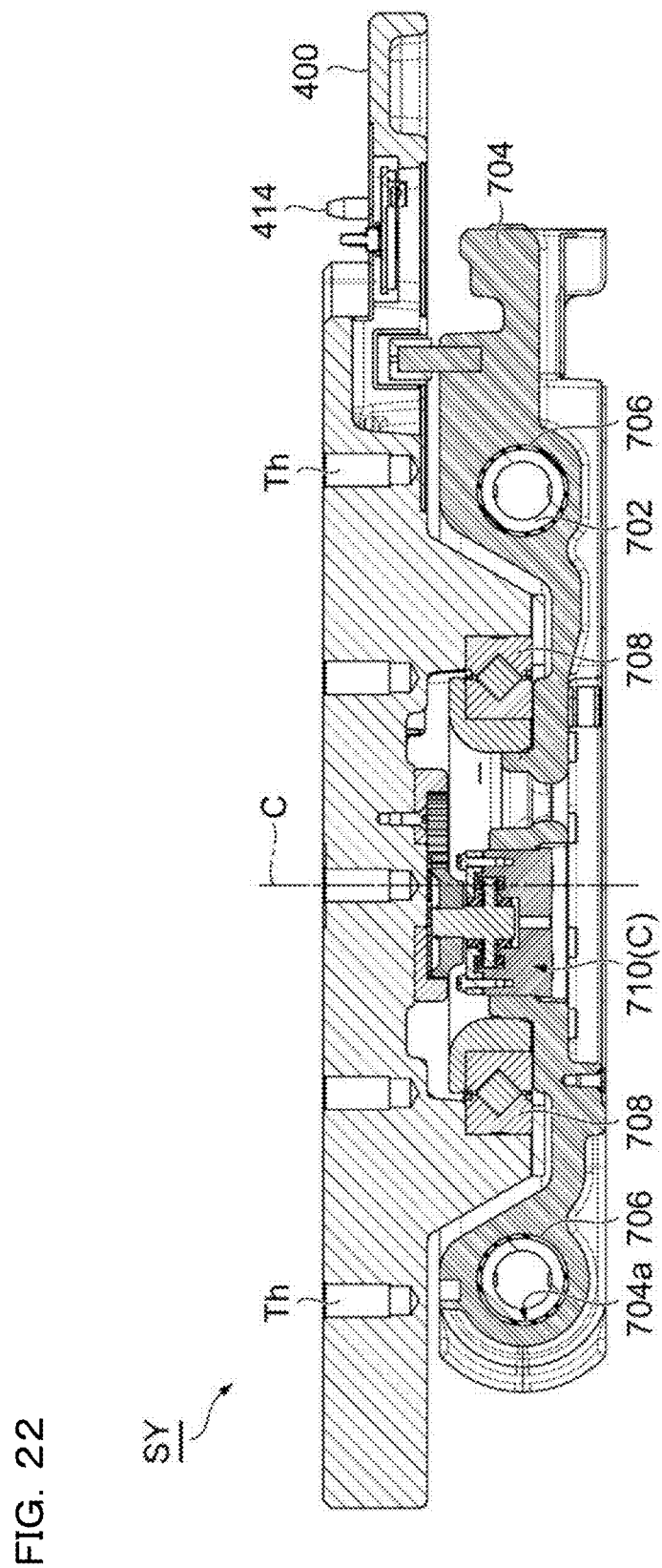
FIG. 22 is a sectional view taken along line XXII-XXII of FIG. 21.

FIG. 20 is a diagram for describing a movement mechanism of the table 400 in the X-axis direction. The stage base 402 includes a pair of linear shafts 702 which extend in the X-axis direction and are parallel to each other. The pair of linear shafts 702 is fixed to the stage base 402. The table 400 is assembled to an X base 704. The X base 704 includes a pair of long holes 704a which extend in the X-axis direction. The linear shafts 702 are inserted into the respective long holes 704a. Preferably, a rubber sleeve 706 as a friction sliding element is interposed between each of the long holes 704a of the X base 704 and the corresponding linear shaft 702. The pair of rubber sleeves 706 can constitute a first resistance mechanism which resists movement in the X-axis direction of the table 400. That is, the table 400 is not moved in the X-axis direction unless an operator applies a certain force or more to the table 400 in the X-axis direction.

The table 400 is placed on the X base 704 with a cross roller bearing 708 interposed therebetween. The table 400 includes a circular recess 404 on the bottom face thereof, and the cross roller bearing 708 is received in the circular recess 404. Accordingly, the table 400 becomes rotatable around the central axis C merely by placing the table 400 on the X base 704. A rotation mechanism of the table 400 can be simplified by a combination of the circular recess 404 and the cross roller bearing 708. Further, a structure in which the X base 704 and the table 400 are located close to each other in the up-down direction can be achieved. Thus, the height position of the table 400 can be lowered. Accordingly, it is possible to improve the operability when the workpiece WP which is typically a heavy object is placed on or removed from the table 400. Further, the center of gravity of the stage unit SY can be lowered.

Figure 23:
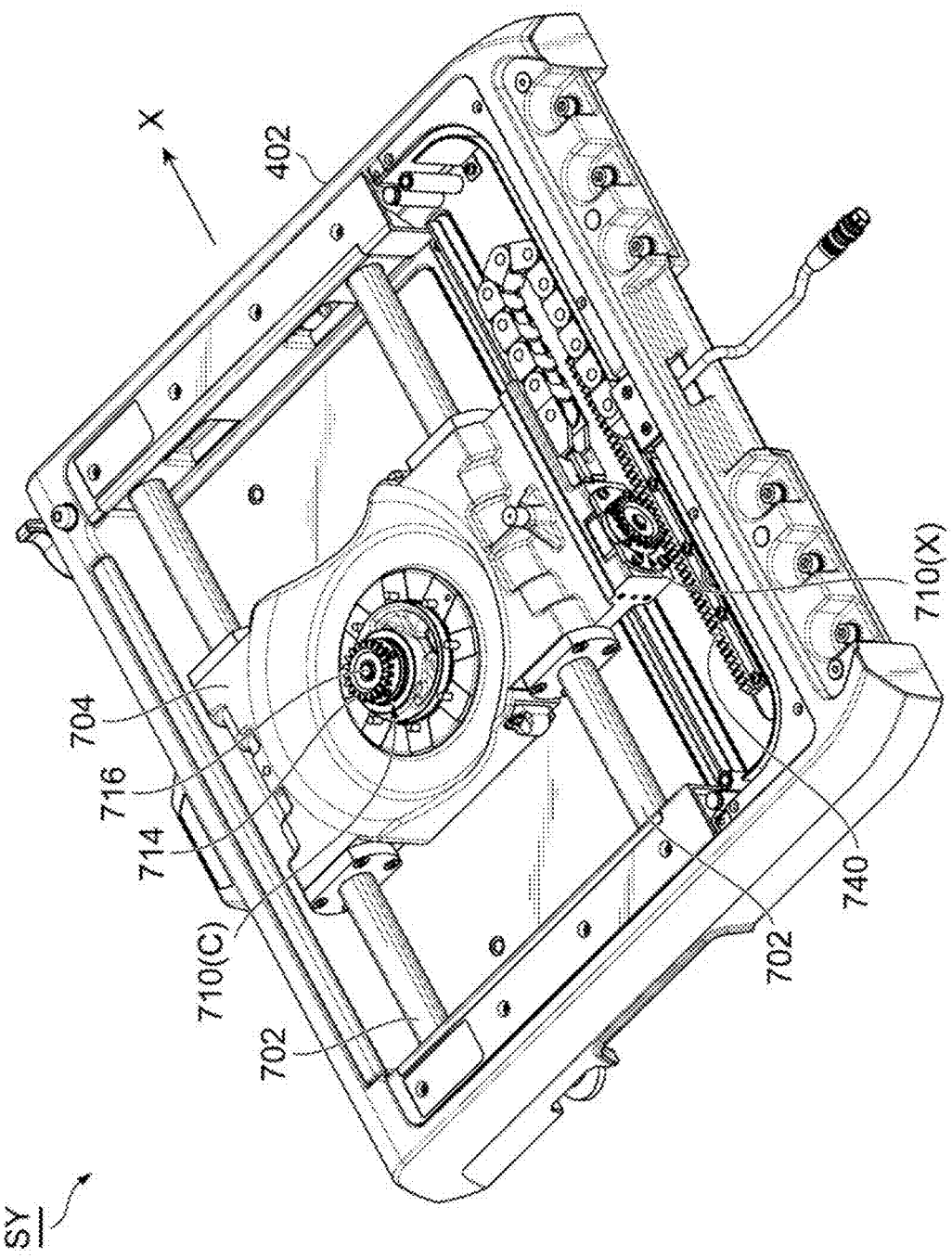
FIG. 23 is a perspective view of the stage unit and illustrates a state in which the table is detached from the stage unit.

Table Displacement Resistance Mechanism:

FIG. 23 illustrates the stage unit SY with the table 400 detached. The stage unit SY includes main resistance mechanism components 710 which relate to displacement of the table 400 in the X-axis direction and the rotation direction around the central axis C. In FIG. 23, in order to distinguish between the main resistance mechanism component relating to the X axis direction and the main resistance mechanism component relating to the rotation direction, a reference sign X is added to the X-axis direction main resistance mechanism component, and a reference sign C is added to the rotation direction main resistance mechanism component. In the embodiment, the X-axis direction main resistance mechanism component 710(X) and the rotation direction main resistance mechanism component 710(C) have the same configuration. Of course, the X-axis direction main resistance mechanism component 710(X) and the rotation direction main resistance mechanism component 710(C) may have different configurations, or at least either the X-axis direction main resistance mechanism component 710(X) or the rotation direction main resistance mechanism component 710(C) may be a resistance mechanism using an oil damper and an electromagnetic fluid.

Figure 24:
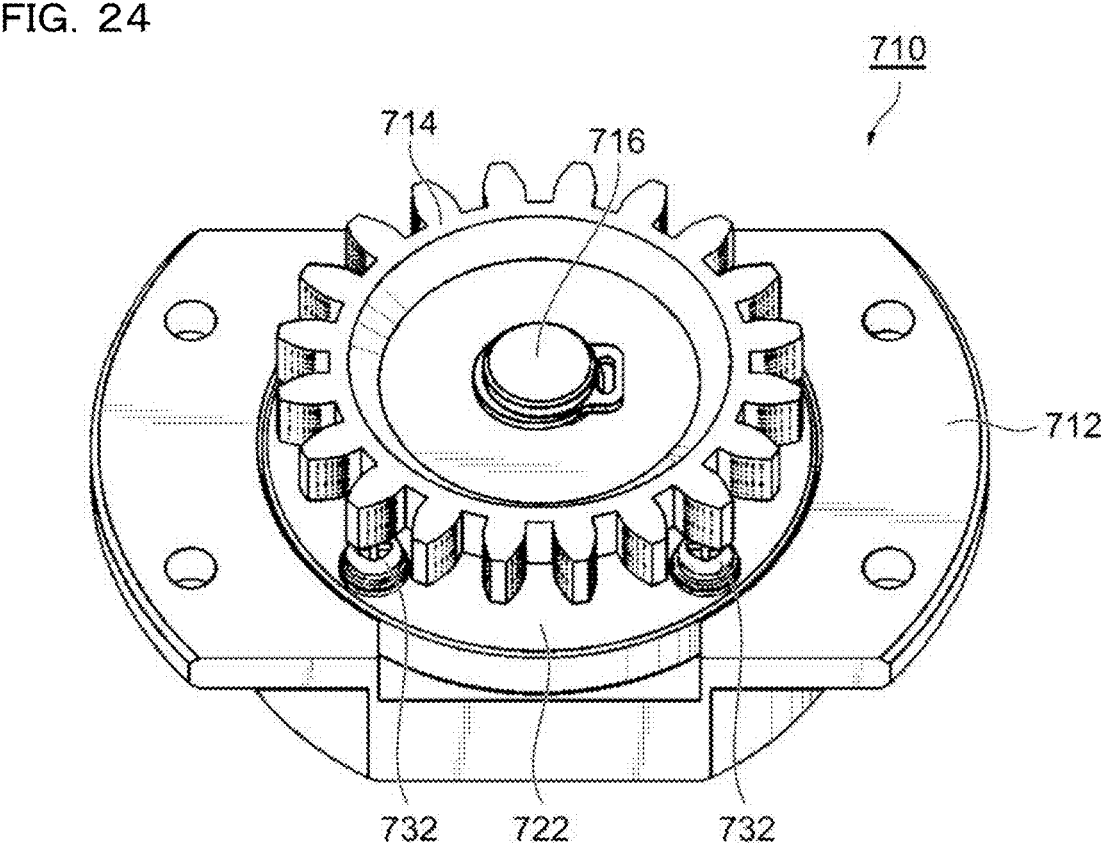
FIG. 24 is a perspective view of a main resistance mechanism component which is a resistance element against displacement of the table.
Figure 25:
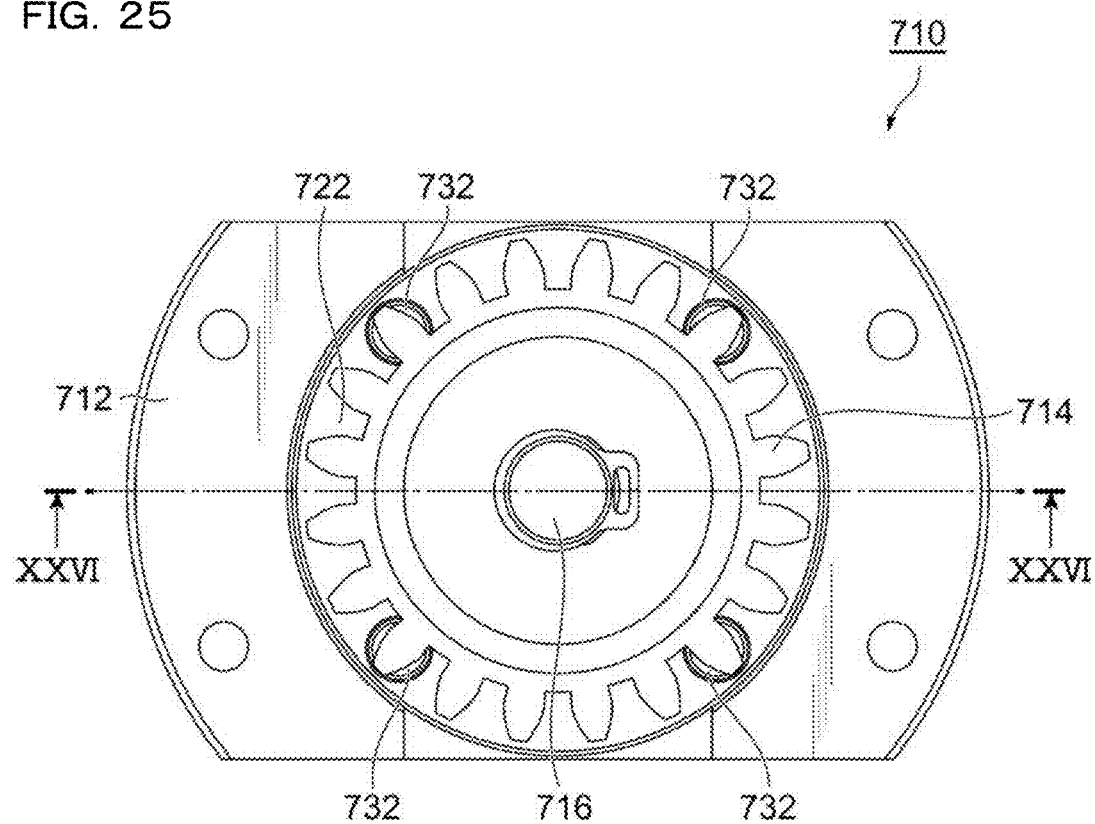
FIG. 25 is a plan view of the main resistance mechanism component.
Figure 26:
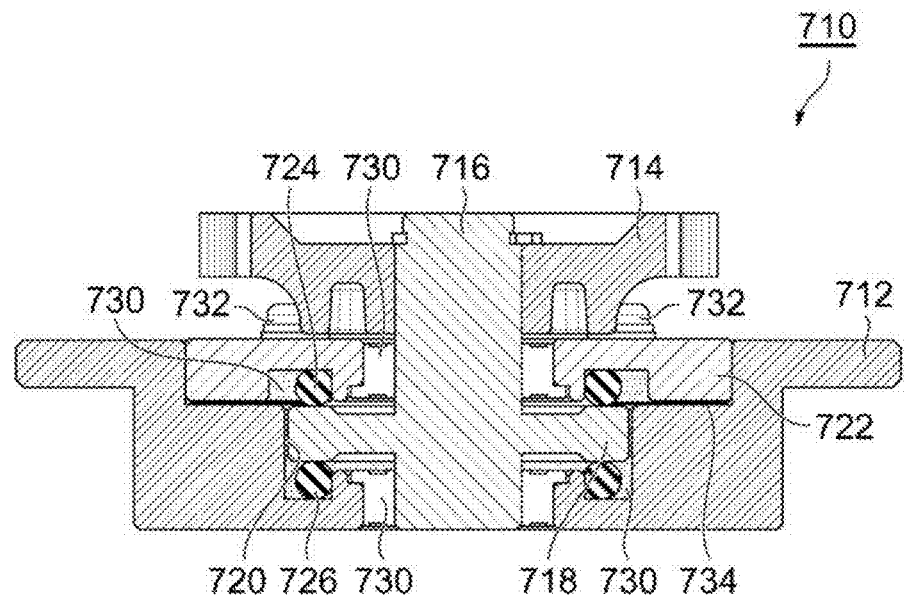
FIG. 26 is a sectional view taken along line XXVI-XXVI of FIG. 25.

The main resistance mechanism component 710 will be described with reference to FIGS. 24 to 26. The main resistance mechanism component 710 includes a case 712 and a gear 714 which is exposed to the outside. The gear 714 is fixed to one end of a shaft 716 which penetrates the case 712. The shaft 716 includes a circumferential flange 718 in an intermediate part in the longitudinal direction thereof (FIG. 26). The case 712 includes a circular recess 720 which houses the circumferential flange 718, and the recess 720 is sealed with a lid member 722.

First and second O-rings 724, 726 which are disposed with the circumferential flange 718 interposed therebetween and a grease 728 are housed in the circular recess 720. A bearing bush 730 is interposed between the case 712, the lid member 722, and the shaft 716.

The first and second O-rings 724, 726 are pressed against the circumferential flange 718 by fixing the lid member 722 to the case 712 using a plurality of bolts 732. Accordingly, it is possible to resist the rotation of the shaft 716, that is, the gear 714.

Referring to FIG. 26, adjustment of a crushing state of the first and second O-rings 724, 726, that is, a pressure contact force of the first and second O-rings 724, 726 against the circumferential flange 718 may be performed by the thickness or the number of spacer sheet(s) 734 which is interposed between the lid member 722 and the case 712. Accordingly, it is possible to adjust a minimum value of a force required for the rotation and the displacement in the X direction of the table 400.

Figure 27:
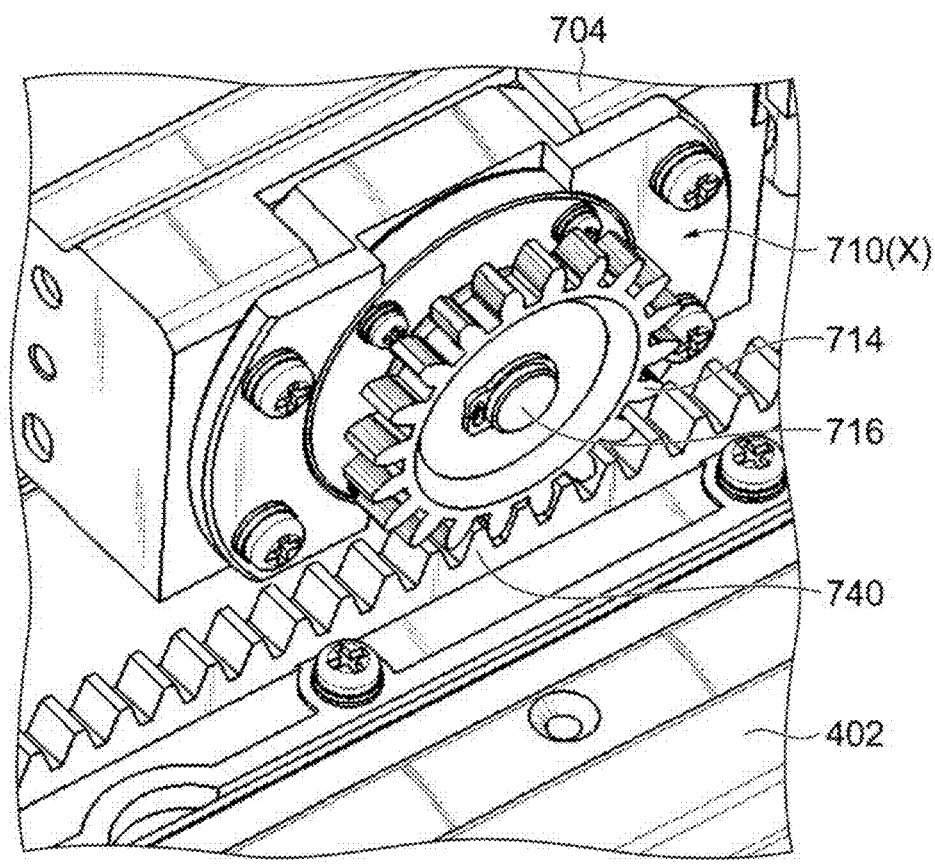
FIG. 27 is a diagram for describing that a gear which is incorporated in the main resistance mechanism component is meshed with a rack member and the main resistance mechanism component acts on the displacement in the X-axis direction of the table.

FIG. 23 illustrates a rack member 740. The rack member 740 is fixed to the stage base 402 and linearly extends in the X-axis direction. The gear 714 of the X-axis direction main resistance mechanism component 710(X) is meshed with the rack member 740 (FIG. 27). With this configuration, when an external force in the X-axis direction is applied to the table 400, a certain resistance force is generated by the X-axis direction main resistance mechanism component 710(X) or another resistance mechanism.

Figure 28:
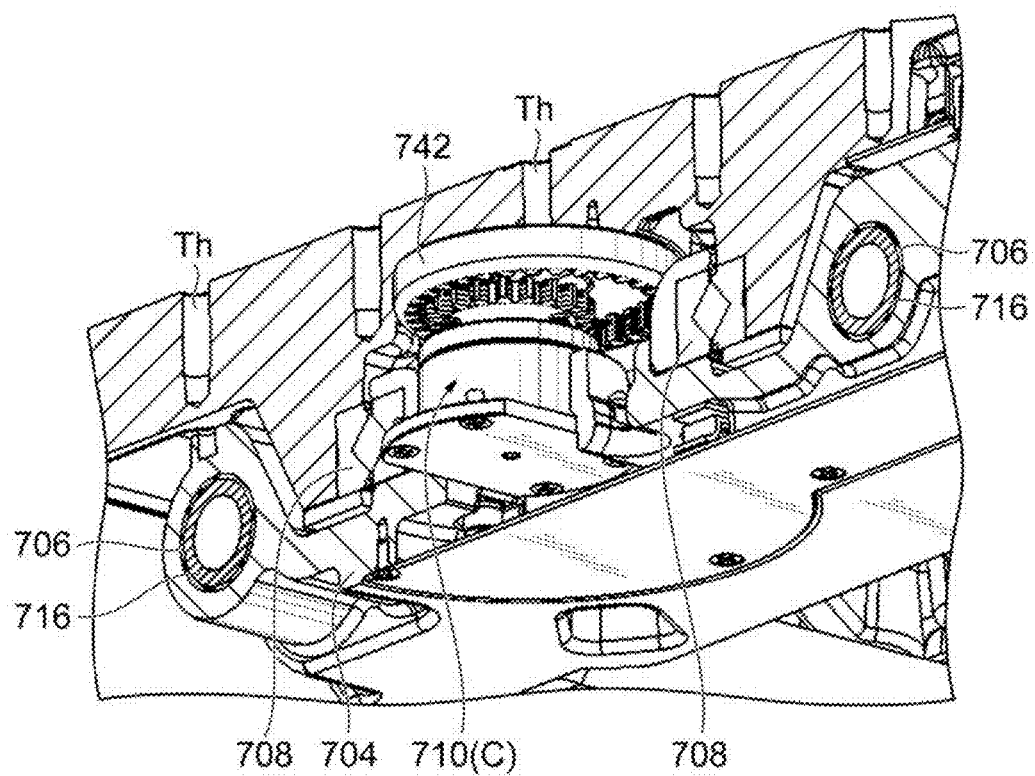
FIG. 28 is a diagram for describing the relationship between the main resistance mechanism component which acts on the rotation of the table and the table.
Figure 29:
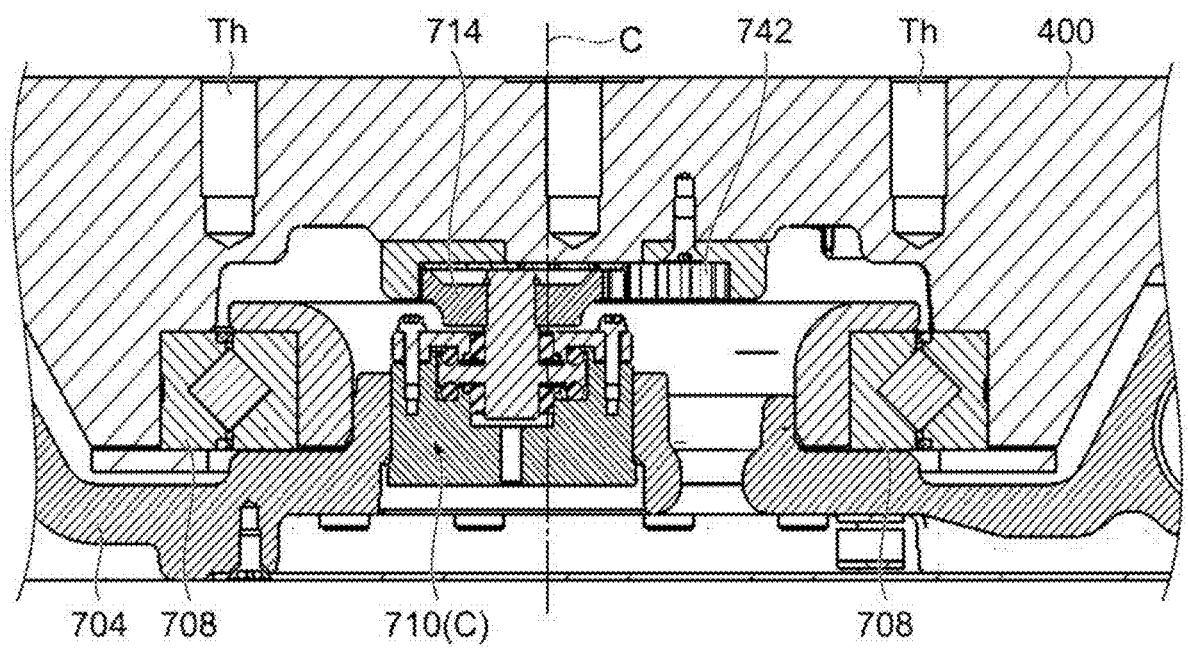
FIG. 29 is a sectional view for describing the relationship between the main resistance mechanism component which acts on the rotation of the table and the table.

FIGS. 28 and 29 illustrate a part that relates to the rotation direction main resistance mechanism component 710(C) relating to the rotation of the table 400. The gear 714 of the rotation direction main resistance mechanism component 710(C) is meshed with a part of an internal gear 742 having a large diameter. When an external force is applied to the table 400 in a direction of rotating the table 400 around the central axis C, a certain resistance force is generated by the rotation direction main resistance mechanism component 710(C) or another resistance mechanism.

With the above configuration, when an external force is applied to the table 400 with the workpiece WP bolted or to the workpiece WP, displacement of the table 400 can be prevented unless the external force is a certain force or more. That is, when an external force is applied to the table 400 in the rotation direction, the table 400 has a certain resistance force.

The resistance force of the table 400 against the external force will be considered. When the contactor 208a of the probe 200 is brought into contact with the workpiece WP, a load when an operator strongly brings the contactor 208a into contact with the workpiece WP is approximately 100 gf. An appropriate load for bringing the contactor 208a into contact with the workpiece WP is approximately 50 gf. It is not desired that the table 400 be displaced while an operator performs an operation of bringing the contactor 208a into contact with the workpiece WP. It is preferred that the table 400 be displaced only when an operator applies an intended force to the table 400 or the workpiece WP and stopped simultaneously with loosening of the force. However, the operability is deteriorated when a large force is required to displace the table 400. The resistance force of the main resistance mechanism component 710 is preferably set or adjusted bearing this in mind. The resistance force of the main resistance mechanism component 710 is preferably set bearing in mind an external force of 500 to 800 gf with which the main resistance mechanism component 710 starts operating. Of course, any mechanism that can achieve this may be employed.

When an operator applies a force to the table 400 in order to displace the table 400 and an X-axis direction component or a component in a rotatable direction of the table 400 of the operation force by the operator exceeds the above predetermined value, the table 400 is translated in the X-axis direction and/or rotated. Then, the table 400 is stopped at the instant when the component force falls below the predetermined value.

Figure 30:
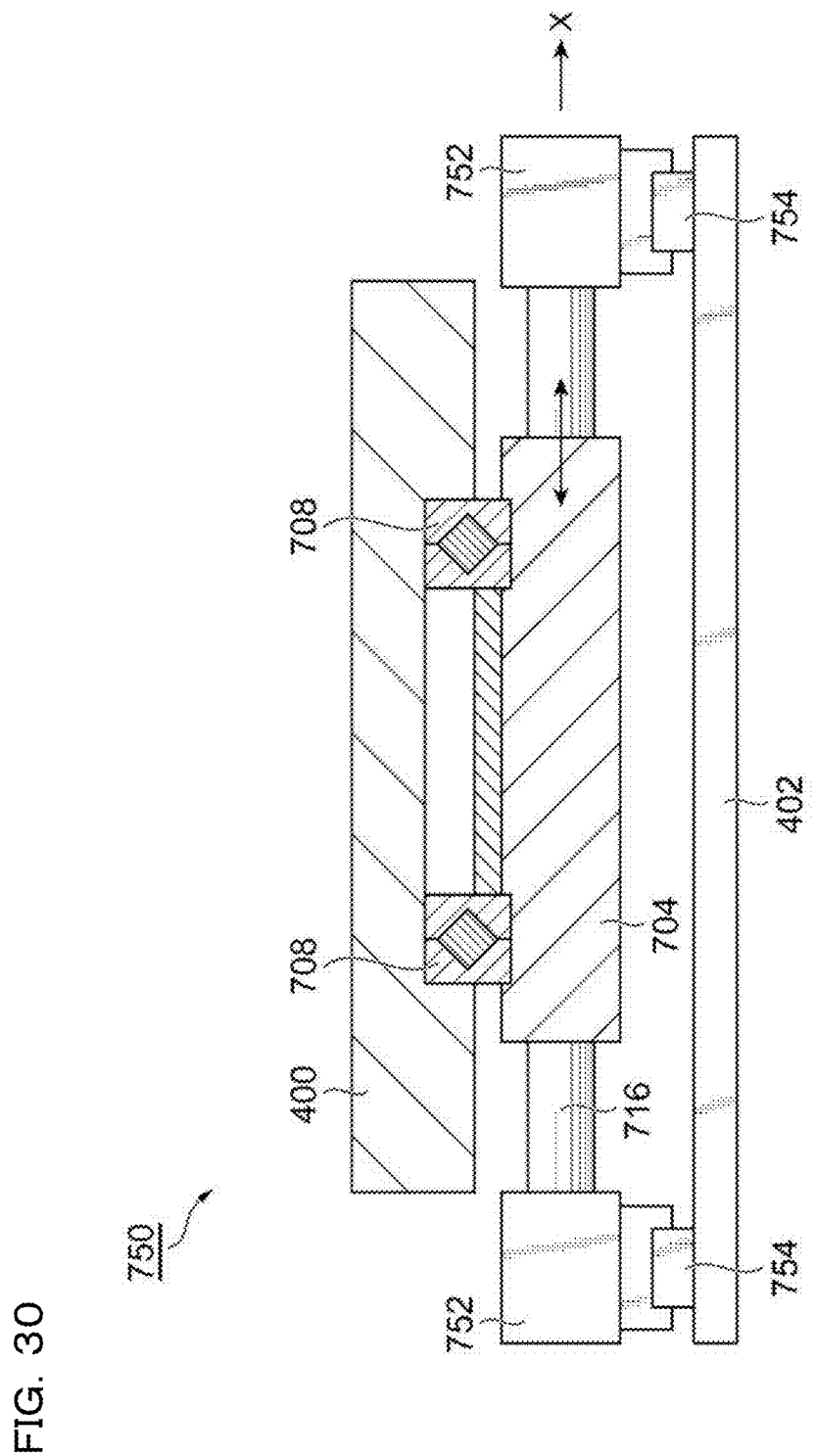
FIG. 30 is a diagram for describing a configuration in which the table is displaceable in the X-axis direction, a rotation direction, and a Y-axis direction as a modification.

Hereinabove, there has been described an example in which the table 400 is displaced in the X-axis direction and in the rotation direction around the central axis C. As a modification, the table 400 may be movable in the Y-axis direction (the front-rear direction: FIG. 9) in addition to the X-axis direction and the rotation direction. FIG. 30 is a diagram for describing a configuration in which the table 400 is displaceable in the X-axis direction, the rotation direction, and the Y-axis direction. Referring to FIG. 30, a stage unit 750 in the modification further includes a pair of Y bases 752 which supports the pair of linear shafts 702 described above and guide rails 754 which guide the respective Y bases 752. The pair of guide rails 754 is fixed to the stage base 402 and extends in the Y-axis direction (the front-rear direction: FIG. 9). Accordingly, the X base 704, that is, the table 400 is movable in the Y-axis direction by being guided by the guide rails 754. Although not illustrated, the main resistance mechanism component 710 described above is preferably interposed between the Y base 750 and the guide rails 754.

Figure 31:
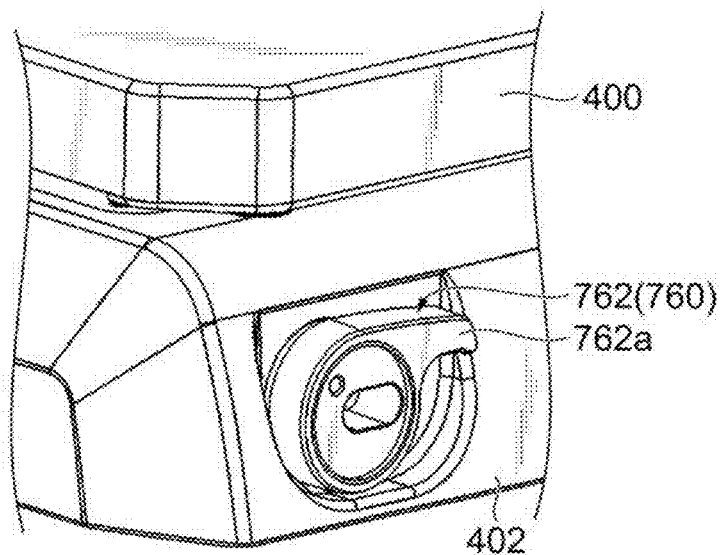
FIG. 31 is a partial perspective view of the stage unit illustrating that an operation lever of a table lock mechanism is disposed at a corner part of the stage unit in which the operation lever is in an unlocking state.
Figure 32:
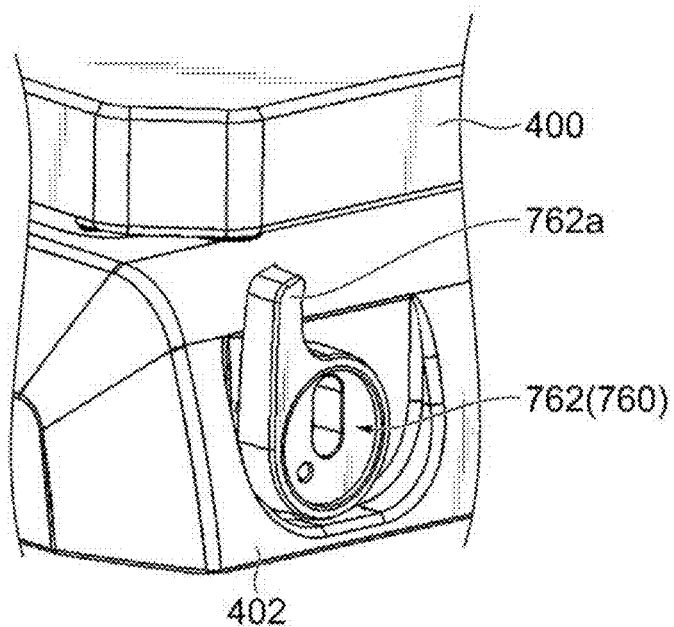
FIG. 32 is a partial perspective view of the stage unit illustrating the operation lever of the table lock mechanism similarly to FIG. 31 in which the operation lever is in a locking state.

Table Lock:

FIGS. 31 to 40 are diagrams relating to a lock mechanism of the table 400. The table 400 is displaceable from the original position as described above. The table 400 is preferably fixable at the original position (FIGS. 1 and 9). The accuracy is higher when the main imaging unit 600 captures an image with the table 400 locked than when the main imaging unit 600 captures an image with the table 400 unfixed. The stage unit SY includes a table lock mechanism 760 for fixing the table 400 at the original position. Referring to FIGS. 31 and 32, the stage base 402 includes an operation lever 762 on one side thereof. The table 400 located at the original position can be locked or unlocked by operating a projection piece 762a of the operation lever 762 by an operator.

Figure 33:
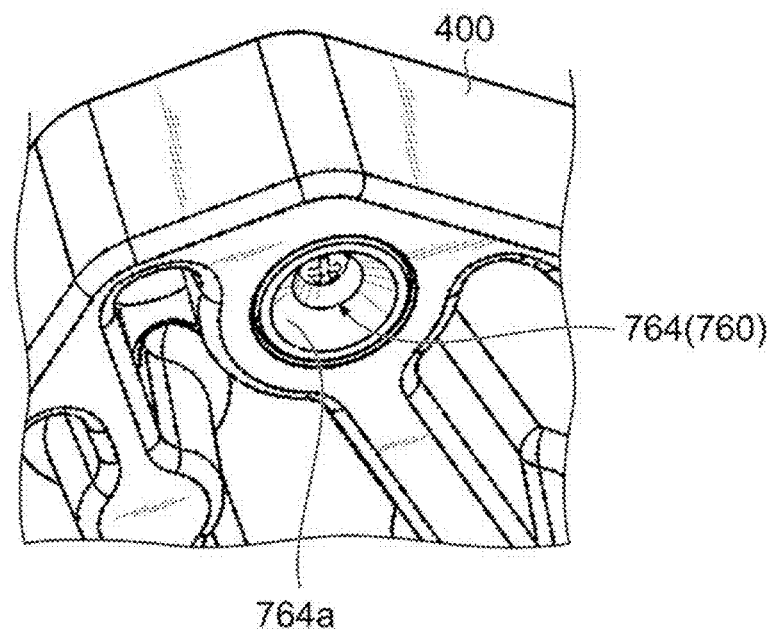
FIG. 33 is a diagram for describing a lock hole which constitutes a part of the table lock mechanism and illustrates the lower face of a corner part of the table.
Figure 34:
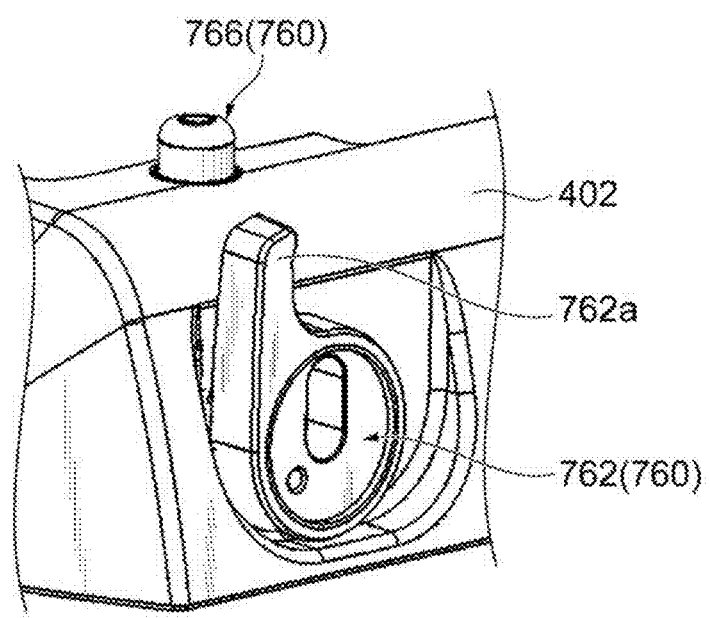
FIG. 34 is a partial perspective view illustrating a corner part of a stage base in which the operation lever is in a locking state and a lock pin projects upward accordingly.

FIG. 31 illustrates an unlocking state in which the projection piece 762a of the operation lever 762 is located at a horizontal position. FIG. 32 illustrates a locking state in which the projection piece 762a of the operation lever 762 is located at a standing position. FIG. 33 is a diagram of a corner part of the lower face of the table 400 viewed from the lower side. The table 400 includes a lock hole 764 which is open downward. The lock hole 764 includes a tapered surface 764a on the opening end, that is, the lower end part thereof. The stage base 402 includes a lock pin 766 which is projectable toward the lock hole 764 (FIG. 34). The lock pin 766 is disposed at a position corresponding to the lock hole 764 of the table 400 at the original position.

Figure 35:
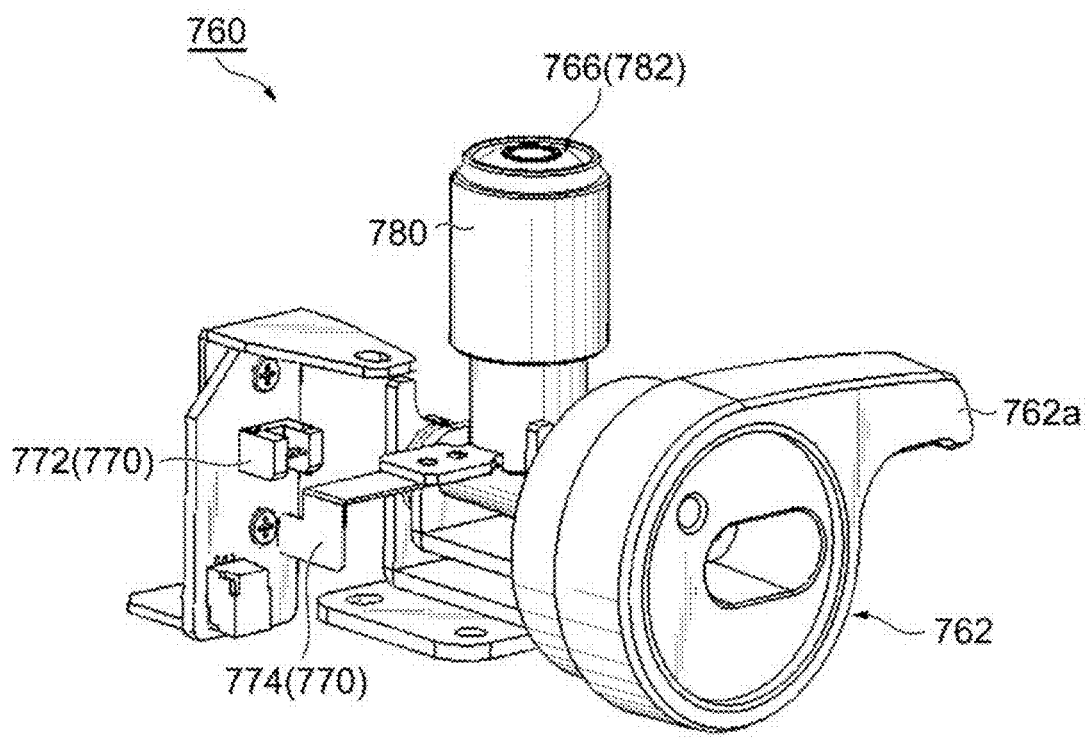
FIG. 35 is an entire configuration diagram of the table lock mechanism and illustrates an unlocking state.
Figure 36:
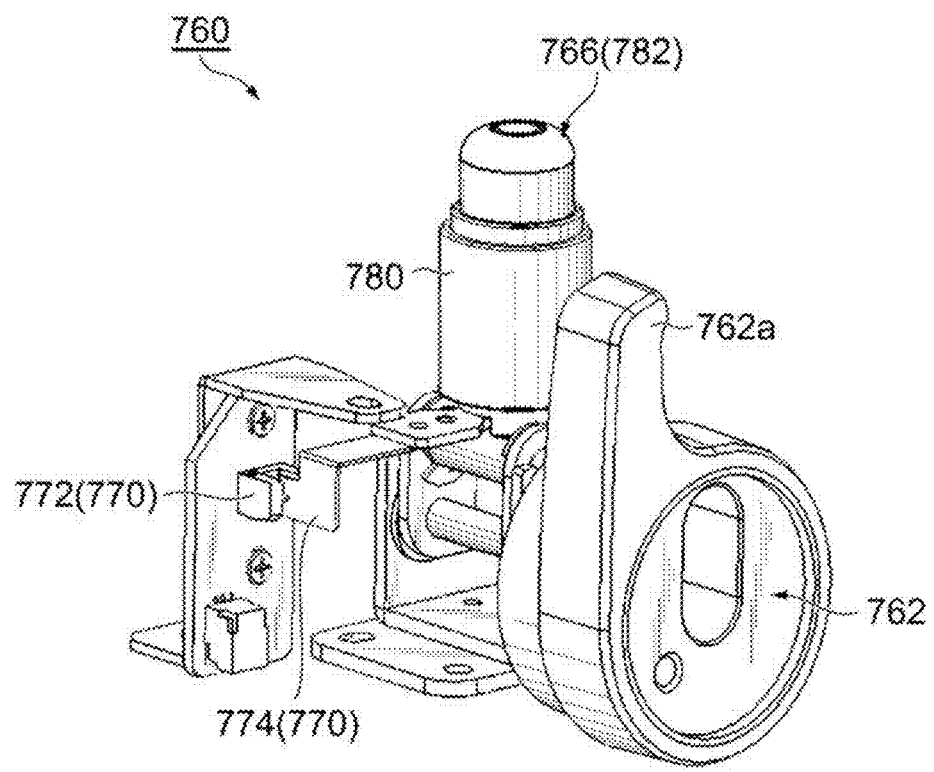
FIG. 36 is an entire configuration diagram of the table lock mechanism and illustrates a locking state.

FIGS. 35 and 36 are diagrams illustrating the operation lever 762 and the lock pin 766 in an extracted manner. FIG. 35 illustrates a state in which the operation lever 762 is positioned at an unlocking position. FIG. 36 illustrates a state in which the operation lever 762 is positioned at a locking position. Referring to FIGS. 35 and 36, a lock detection mechanism 770 which detects a state of the operation lever 762, that is, a locked state of the table 400 is incorporated in the stage base 402. The lock detection mechanism 770 includes a light emitting/receiving element 772 and a plate 774 which blocks light of the light emitting/receiving element 772. The light blocking plate 774 is mechanically connected to the operation lever 762. When the operation lever 774 is located at the unlocking position, the light blocking plate 774 is located away from the light emitting/receiving element 772 (FIG. 35). When the operation lever 774 is located at the locking position, the light blocking plate 774 is inserted into the light emitting/receiving element 772 and blocks light (FIG. 36). A locked and/or unlocked state detected by the lock detection mechanism 770 can be recognized by an operator, in particular, a site worker by, for example, turning on/off an indicator (not illustrated).

Figure 37A:
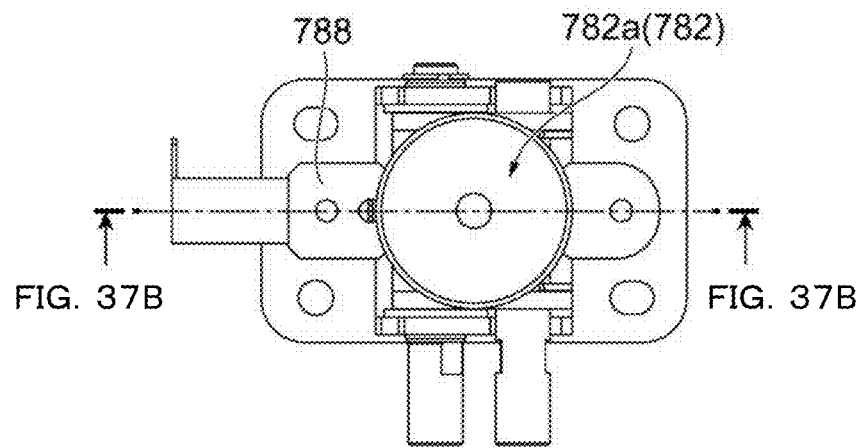
Figure 37B:
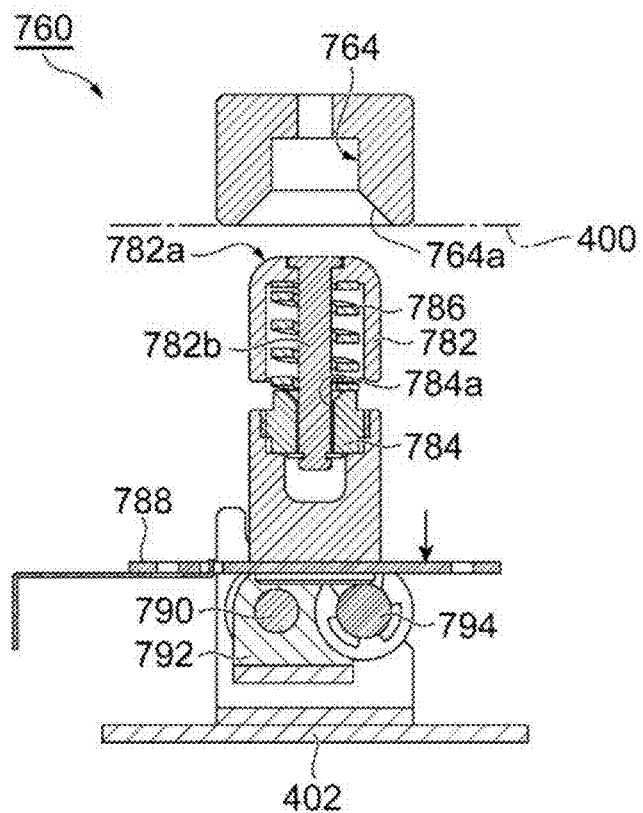
Figure 38A:
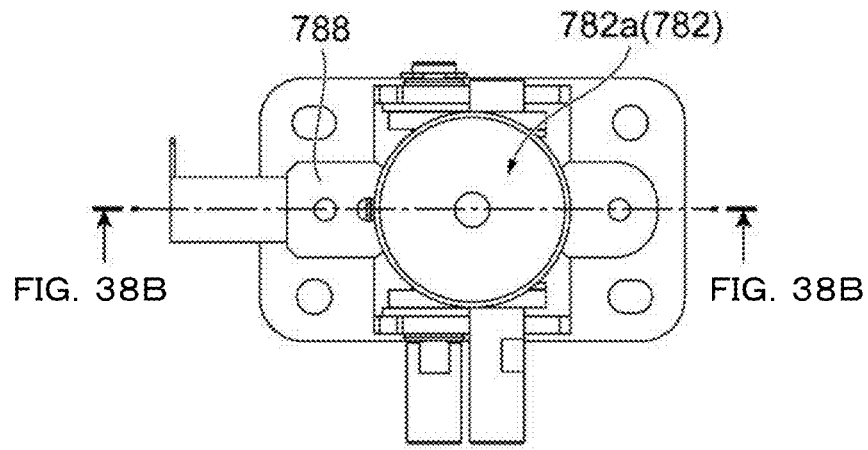
Figure 38B:
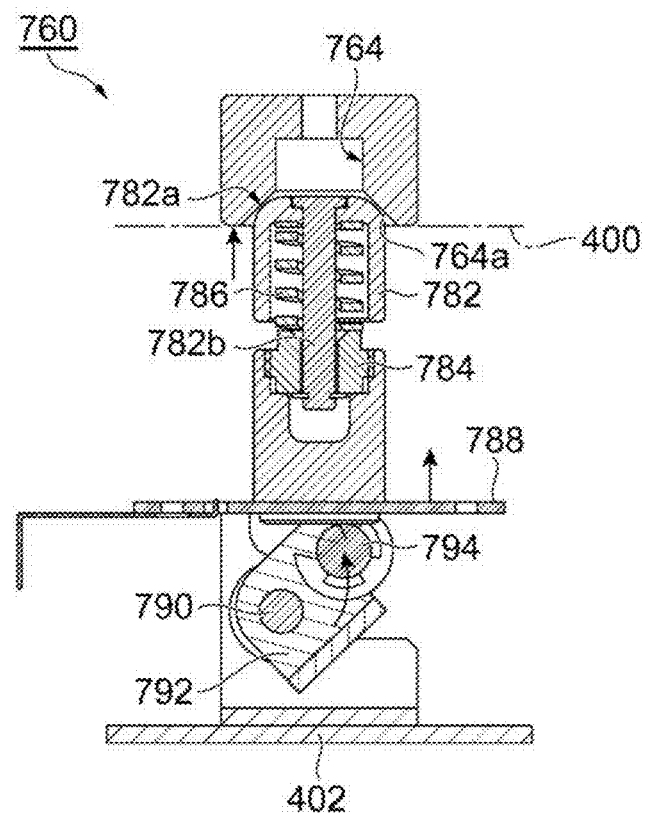
Figure 39A:
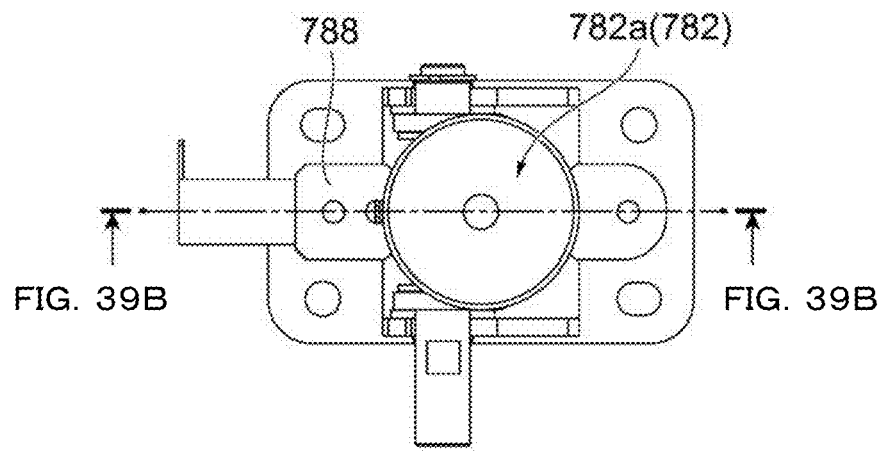
Figure 39B:
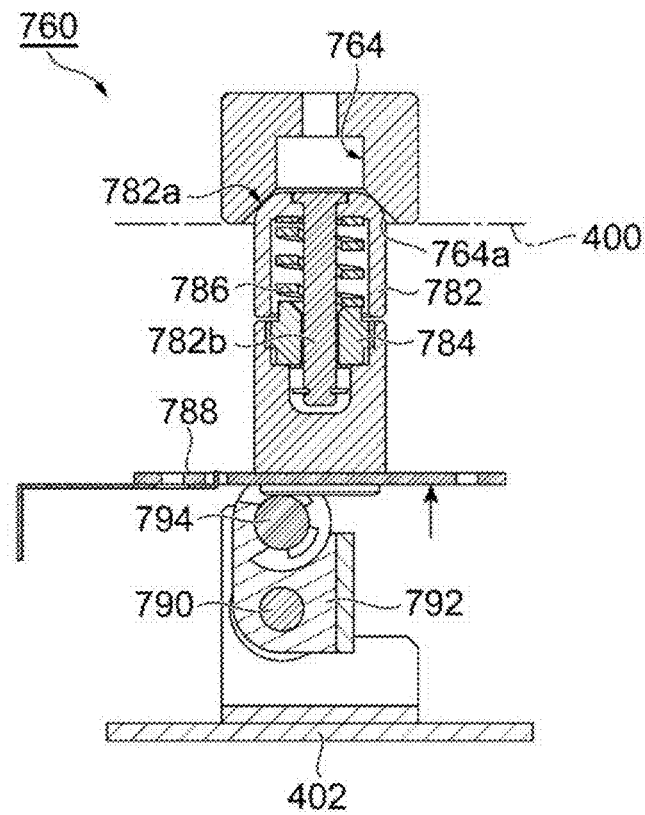

FIGS. 37(A) and 37(B) are diagrams for describing a state of the lock pin 766 when the operation lever 762 is located at the unlocking position (FIG. 31). FIGS. 38(A) and 38(B) are diagrams for describing a state of the lock pin 766 immediately after the operation lever 762 is positioned at the locking position (FIG. 32). FIGS. 39(A) and 39(B) are diagrams for describing a state in which the operation lever 762 is positioned at the locking position (FIG. 32) and the table 400 remains fixed by the lock pin 766.

FIGS. 37(A) to 39(A) are plan views of the lock pin 766 viewed from the upper side and FIGS. 37(B) to 39(B) are sectional views of the lock pin 766. The lock pin 766 includes a pin head 782 which is surrounded by a sleeve 780 (FIGS. 35 and 36). In FIGS. 37 to 39, the sleeve 780 is not illustrated. The pin head 782 has a shape having a chamfered tip edge part 782a. The pin head 782 includes a shaft part 782b which extends downward. The shaft part 782b is received by a guide hole 784a of a base member 784 and movable up and down along the axis of the shaft part 782b.

The pin head 782 is biased upward by a spring 786. The base member 784 is fixed to a base plate 788, and the base plate 788 is mechanically coupled to the operation lever 762. When the operation lever 762 is located at the unlocking position, the base plate 788 is positioned at a lower position (FIGS. 37 (A) and 37(B)). When the operation lever 762 is operated to the locking position, the base plate 788 is displaced upward and positioned at an upper position (FIGS. 38(A) and 38(B), FIGS. 39(A) and 39(B)).

FIG. 37(B) illustrates a first shaft 790 which is fixed on the stage base 402. One end of a swing link 792 is pivotably supported on the first shaft 790. The other end of the swing link 792 is pivotably supported on a second shaft 794. The second shaft 794 is mechanically connected to the operation lever 762. Referring to FIGS. 37(A) and 37(B), when the operation lever 762 is located at the unlocking position (FIG. 35) as described above, the second shaft 794 is positioned at a lower position, and the base plate 788 is positioned at the lower position accordingly. Accordingly, the base member 784 and the pin head 782 are positioned at lower positions. That is, the pin head 782 is positioned at an unlocking position which is away from the lower face of the table 400. Thus, the table 400 is released from the pin head 782 and thus displaceable in, for example, the X-axis direction.

Referring to FIGS. 38(A) and 38(B), when the operation lever 762 is operated in a locking direction, the second shaft 794 is lifted and the base plate 788 moves upward. Accordingly, the base member 784 and the pin head 782 move upward, and the pin head 782 enters the inside of the lock hole 764 of the table 400. The tip edge part 782a of the pin head 782 has a chamfered shape, and the lock hole 764 has the tapered surface 764a. Thus, the pin head 782 is guided by the tapered surface 764a so as to enter the lock hole 764.

Referring to FIGS. 39(A) and 39(B), when the operation lever 762 is located at the locking position (FIG. 36) as described above, the base plate 788 is positioned at the upper position by the second shaft 794. Accordingly, the base member 784 and the pin head 782 are positioned at upper positions. The pin head 782 is pushed up, enters the inside of the lock hole 764 of the table 400, and is then positioned. The tip edge part 782a of the pin head 782 has a chamfered shape, and the lock hole 764 has the tapered surface 764a. Thus, the pin head 782 is positioned by the tapered surface 764a of the lock hole 764. In this state, the spring 786 is in a compressed state. Accordingly, the table 400 remains fixed at the original position by the pin head 782.

Figure 40:
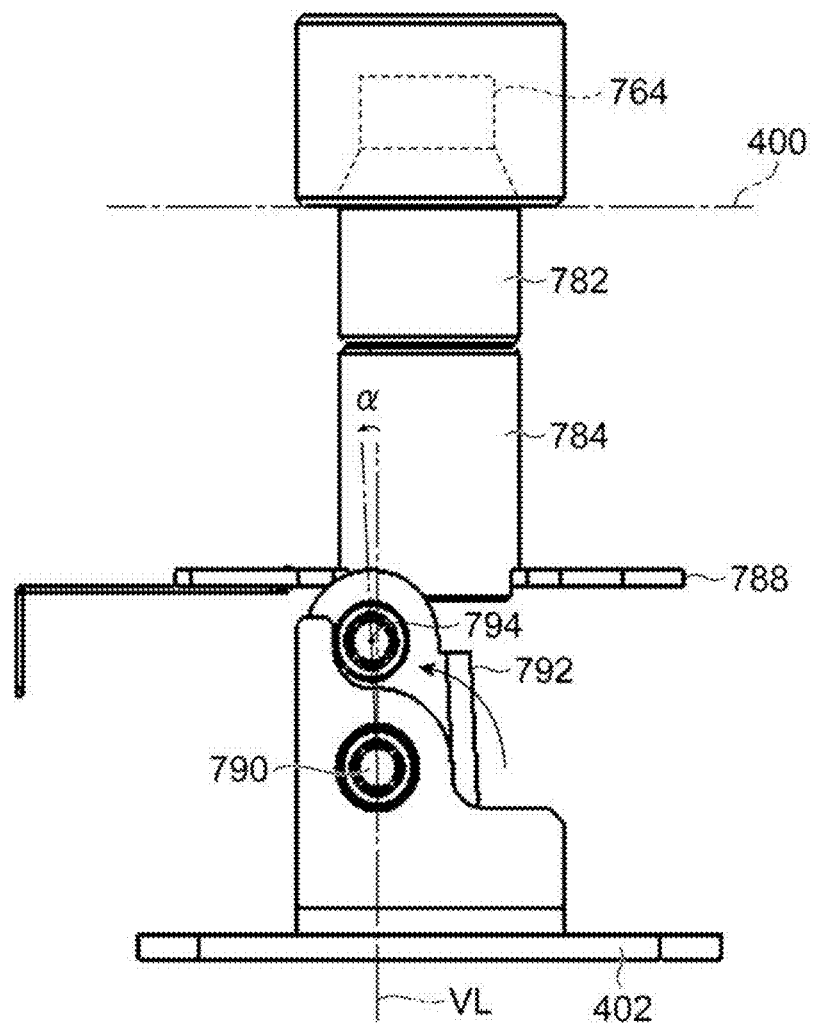
FIG. 40 is a diagram illustrating an example in which a dead band is provided in the sensitivity of the operation lever at the locking position.

FIG. 40 is a diagram for describing a preferred relationship between the first shaft 790 and the second shaft 794. Specifically, FIG. 40 is a diagram for describing an example in which a dead band is provided in the sensitivity of the operation lever at the locking position. The second shaft 794 which is mechanically coupled to the operation lever 762 swings around the first shaft 790 which is fixed on the stage base 402 along with the operation of the operation lever 762. Design is preferably made in such a manner that the second shaft 794 is located at a position beyond a vertical line VL passing through the center of the first shaft 790 when the operation lever 762 is located at the locking position (FIG. 36). FIG. 40 illustrates an angle α which is formed between a virtual line passing through the second shaft 794 and the first shaft 790 and the vertical line VL when the operation lever 762 is positioned at the locking position. The angle α is referred to as a repose angle or a dead angle. The pin head 782 is stabilized at the locking position by setting the repose angle or dead angle α. Further, even when an unexpected external force is applied to the operation lever 762, it is possible to prevent the table 400 from being carelessly unlocked without sensitively reacting to the applied force.

Hereinabove, fixing the table 400 at the original position by inserting the pin head 782 into the lock hole 764 of the table 400 has been described. As a modification, a plurality of lock holes 764 may be arranged at intervals so that, when the table 400 is displaced from the original position, the table 400 can be fixed at a predetermined position and attitude after the displacement. For example, a plurality of lock holes 764 may be arranged in series in the X-axis direction on the lower face of the table 400. Accordingly, when the table 400 is displaced from the original position in the X-axis direction, the moved table 400 can be fixed by the pin head 782 and the corresponding lock hole 764.

Figure 41:
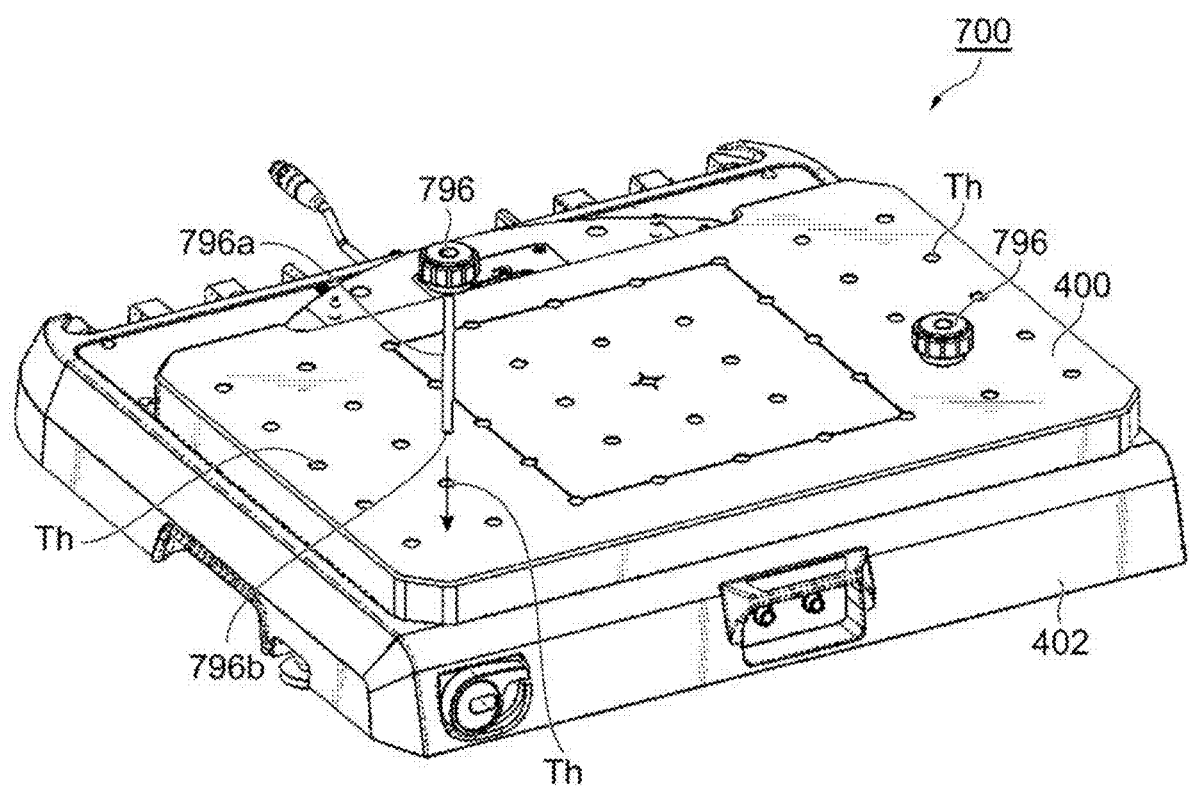
FIG. 41 is a perspective view of the stage unit for describing a table fixing mechanism which is usable in conveyance of the stage unit.
Figure 42:
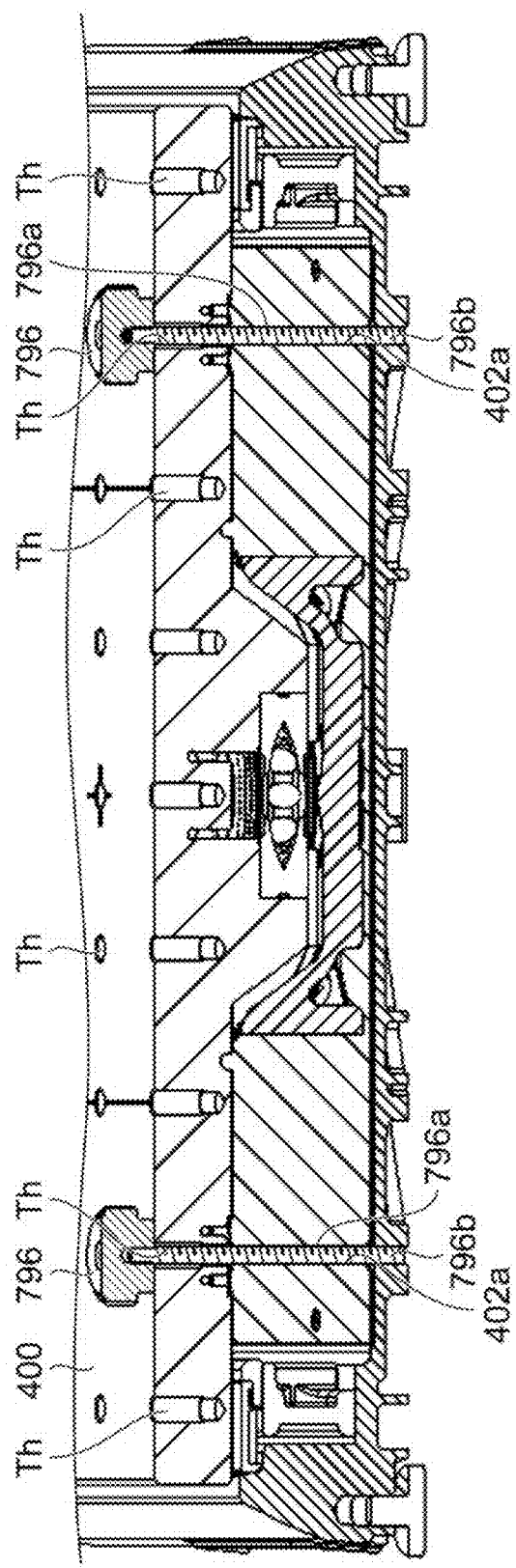
FIG. 42 is a sectional view of the stage unit for describing the table fixing mechanism which is usable in conveyance of the stage unit.

Table Fixing Mechanism: FIGS. 41 and 42 are diagrams for describing a table fixing mechanism in conveyance of the stage unit SY. The above operation lever 762 is used for locking the table 400 as needed during measurement. In addition, when the stage unit SY is conveyed, a member for fixing the table 400 is preferably prepared. Referring to FIG. 41, the table 400 is fixed onto the stage base 402 using a conveyance fixing bolt 796. As described above, the plurality of threaded holes Th are formed on the table 400. The workpiece WP is bolted using the threaded holes Th.

The conveyance fixing bolt 796 includes a shaft part 796a which has a diameter smaller than the diameter of the threaded hole Th and is thus insertable into the threaded hole Th. Further, the conveyance fixing bolt 796 has an axial length that penetrates the table 400. The stage base 402 includes a positioning hole 402a into which the conveyance fixing bolt 796 is insertable, and the conveyance fixing bolt 796 is screwed with a threaded part 402b of the positioning hole 402a. The table 400 can be fixed at the original position by screwing the conveyance fixing bolt 796 to the stage base 402.

Figure 43:
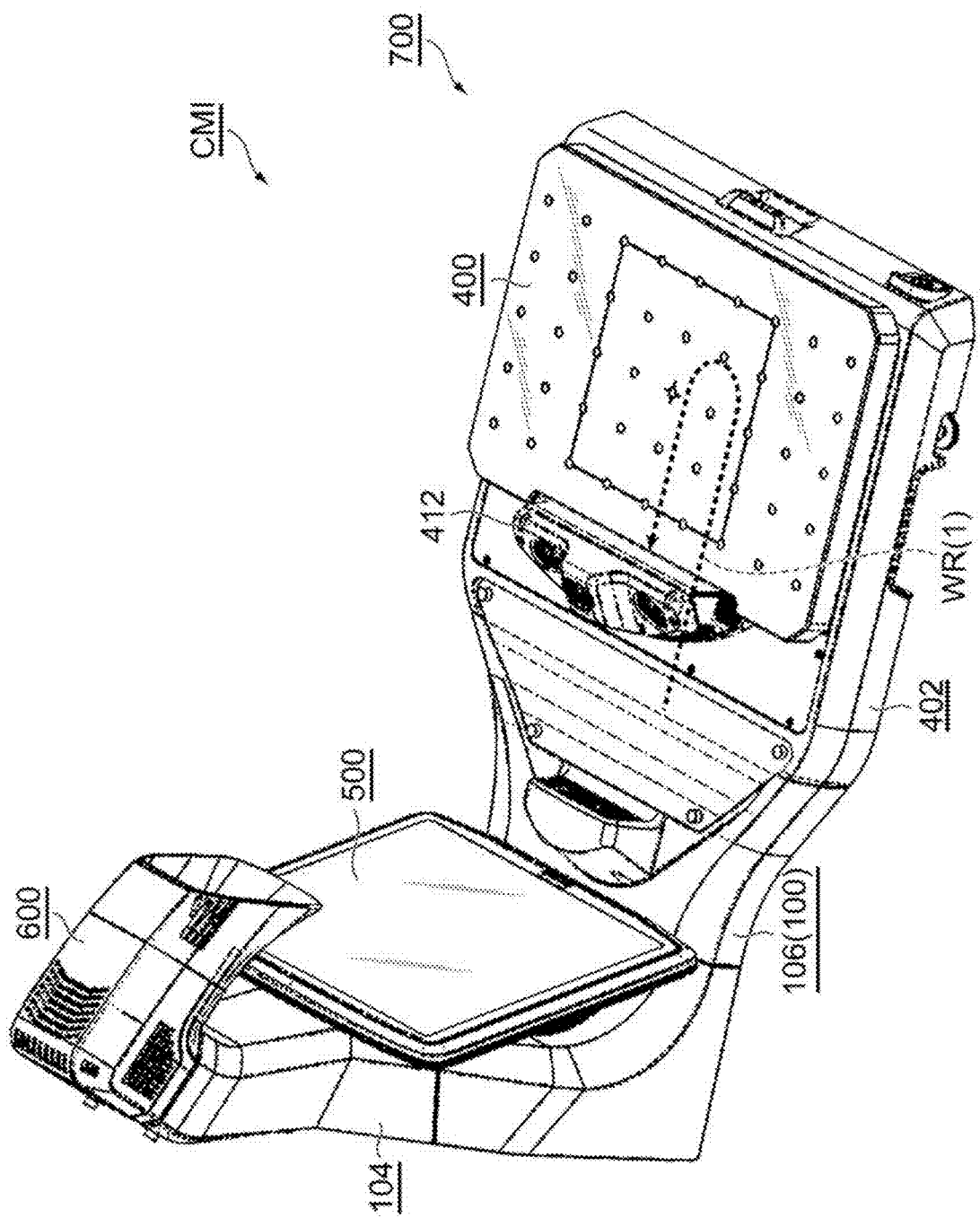
FIG. 43 is a perspective view of the optical three-dimensional coordinate measuring device for describing internal wiring of the stage unit which is provided with the movable table.
Figure 44:
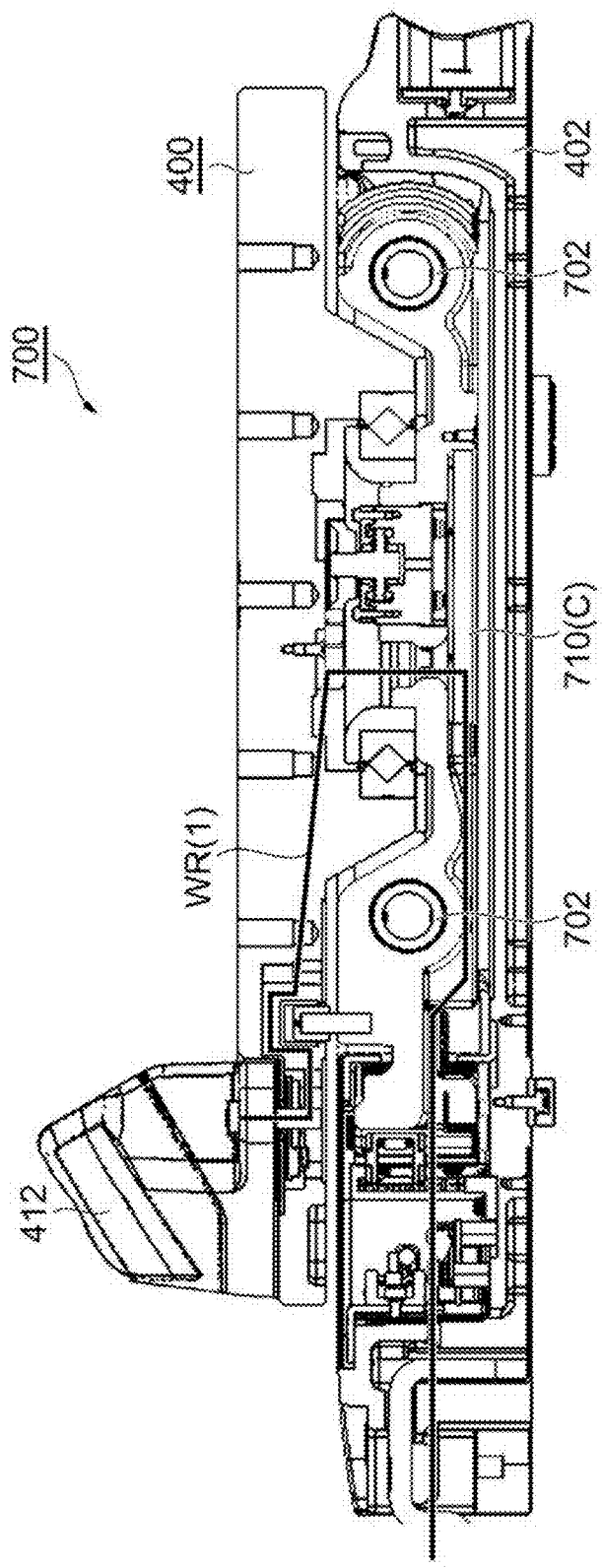
FIG. 44 is a sectional view of the stage unit for describing the internal wiring of the stage unit which is provided with the movable table.

Internal Wiring of Stage Unit:

The stage marker unit 412 which is mounted on the table 400 includes self-luminous stage markers 410 (FIGS. 10 and 11). The stage marker unit 412 may include a built-in battery as a power source for the self-luminous markers 410. On the other hand, in order to receive power supply from the outside, wiring is required. As described above, the table 400 is displaceable, in particular, rotatable. A power supply wiring line to the stage marker unit 412 mounted on the table 400 is required to be connected to the stage marker unit 412 through the inside of the stage base 402 and the table 400. FIGS. 43 and 44 illustrate a wiring line WR (1). As can be immediately understood from FIGS. 43 and 44, the wiring line WR (1) preferably pass through the central part of the table 400, that is, near a rotation axis of the table 400. This enables displacement of the wiring line WR to be minimized even when the table 400 rotates.

Figure 45:
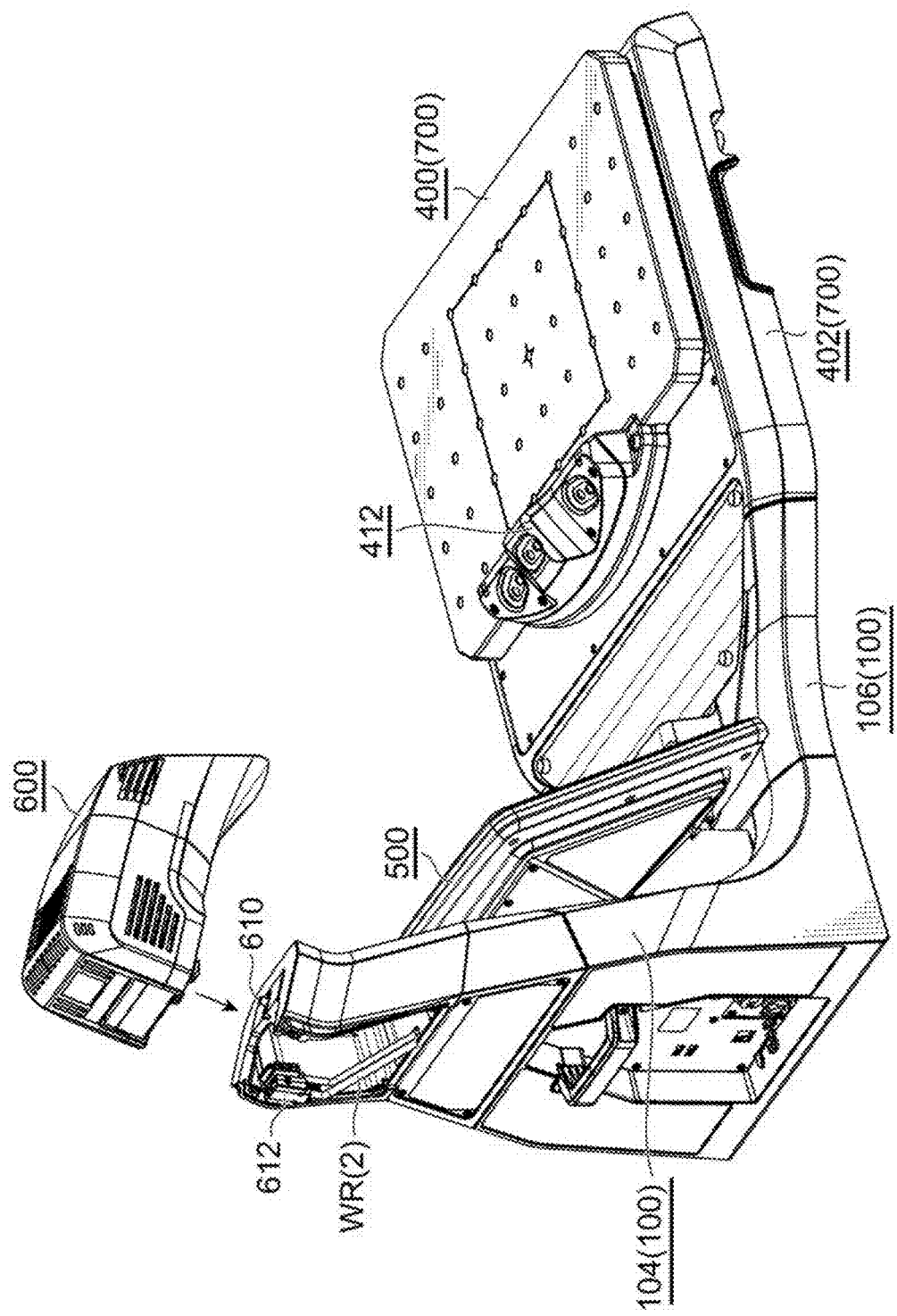
FIG. 45 is a diagram for describing that the main imaging unit which is included in the optical three-dimensional coordinate measuring device of the embodiment is detachable.
Figure 46:
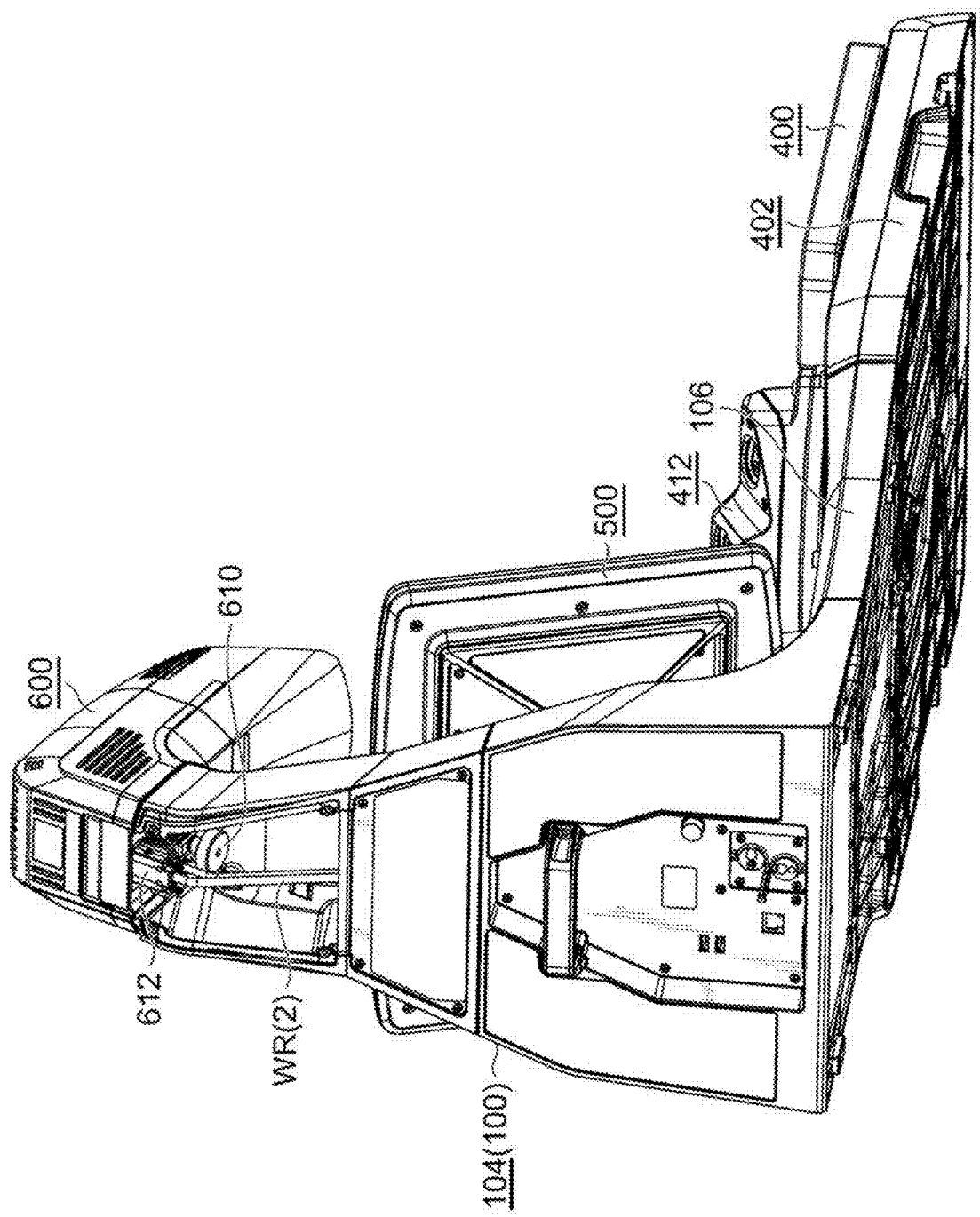
FIG. 46 is a diagram for describing that the main imaging unit which is included in the optical three-dimensional coordinate measuring device of the embodiment is detachable and also describing an electrical connection structure of the main imaging unit.

Connection of Main Imaging Unit: As described above, the main imaging unit 600 is detachably attached to the upper end of the standing part 104 of the main body 100. A connection structure is required between the main imaging unit 600 and the standing part 104 for power supply to the main imaging unit 600 and transmission/reception of a signal. FIGS. 45 and 46 are diagrams for describing detachment/attachment of the main imaging unit 600 and connection between the main imaging unit 600 and the standing part 104. Referring to FIG. 46, a fixing screw 610 is attached to the upper end of the standing part 104 of the main body 100. The main imaging unit 600 is fixed using the fixing screw 610. Further, a wiring line WR (2) which is provided with a connector 612 is housed in the standing part 104. Connection between the main body 100 and the main imaging unit 600 is completed by connecting the connector 612 to a connecting pin group of the main imaging unit 600 which is seated on the upper end of the standing part 104.

Referring to FIGS. 47A and 47B and FIGS. 48A and 48B, the illustrated workpiece WP has a rectangular parallelepiped shape. An operation of the optical three-dimensional coordinate measuring device CMI will be described with an example of measuring the distance between one end face Sa of the workpiece WP and the other end face Sb which is opposite to the one end face Sa using the measurement device CMI.

Figure 47A:
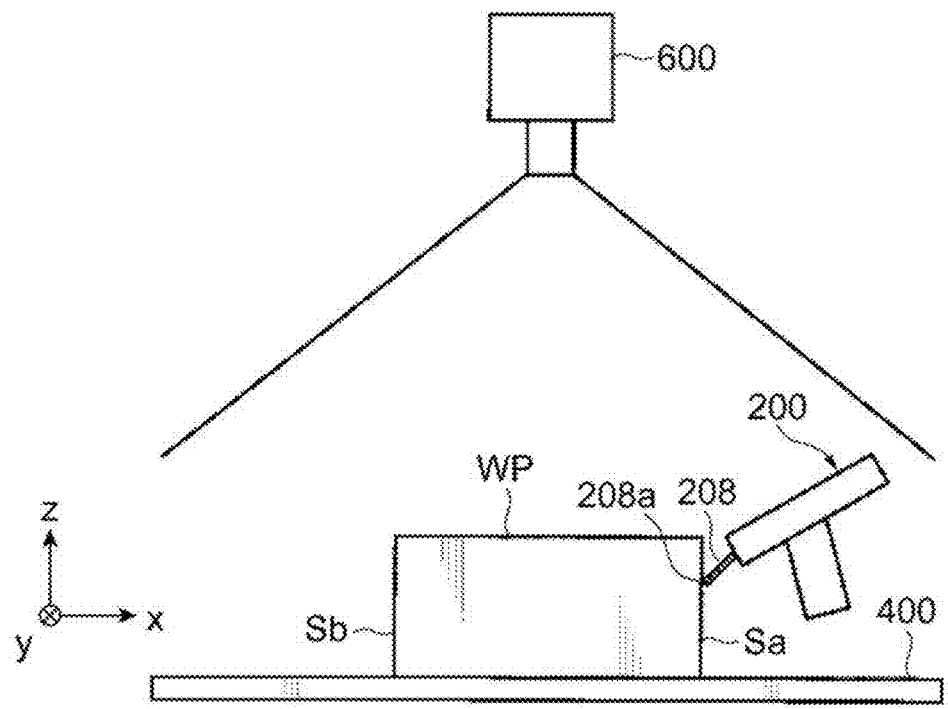
Figure 47B:
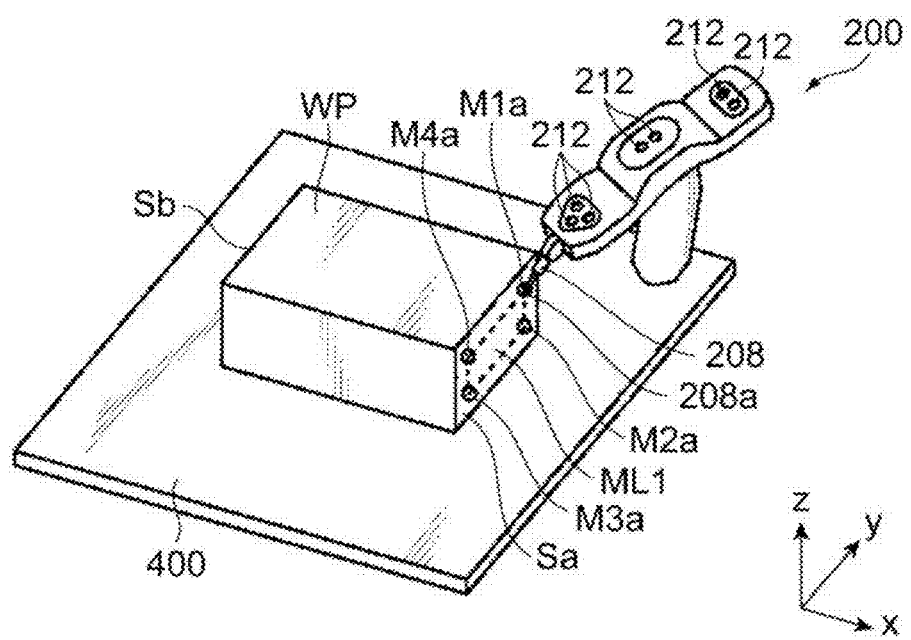

(1) Referring to FIGS. 47A and 47B, an operator grips the probe 200, brings the contactor 208a into contact with the one end face Sa of the workpiece WP, and operates the main body operation unit 300 (FIG. 1) to capture an image of the probe markers 212 by the main imaging unit 600, so that coordinates of a contact point of the contactor 208a are calculated on the basis of the image. A first contact point on the one end face Sa is denoted by M1a (FIG. 47B).

(2) Coordinates of at least two contact points, for example, three contact points including a second contact point M2a, a third contact point M3a, and a fourth contact point M4a are calculated by sequentially changing the contact point of the contactor 208a of the probe 200 and performing the same operation as the operation to the first contact point M1a for each contact point on the one end face Sa of the workpiece WP.

(3) A first measurement plane ML1 corresponding to the one end face Sa of the workpiece WP is set on the basis of the above four contact points M1a to M4a (FIG. 40B) and a plane of a geometrical element.

Figure 48A:
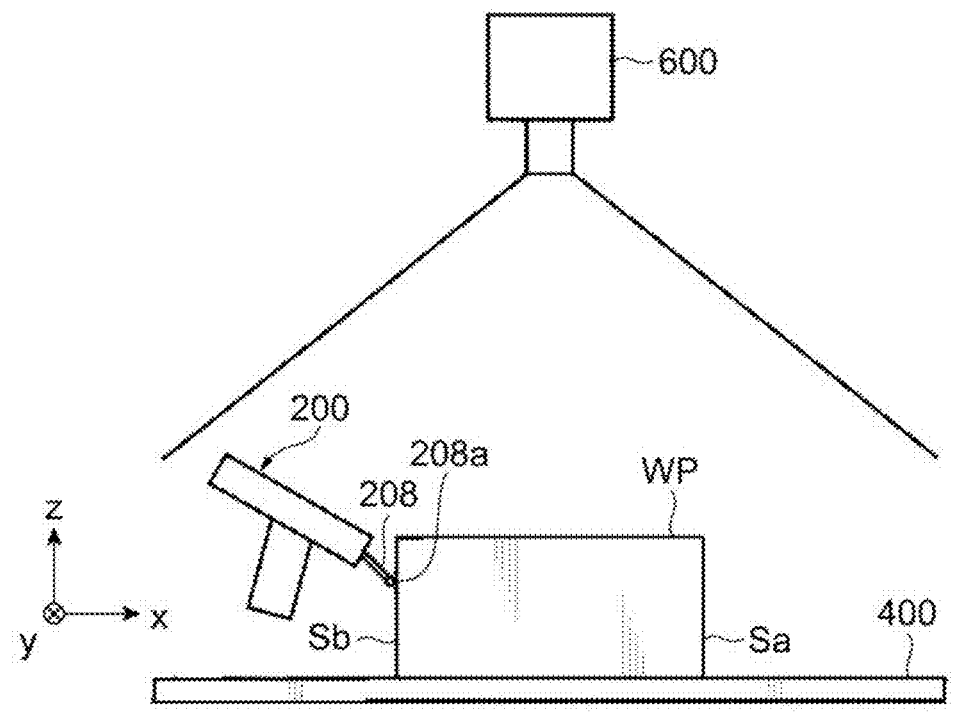
Figure 48B:
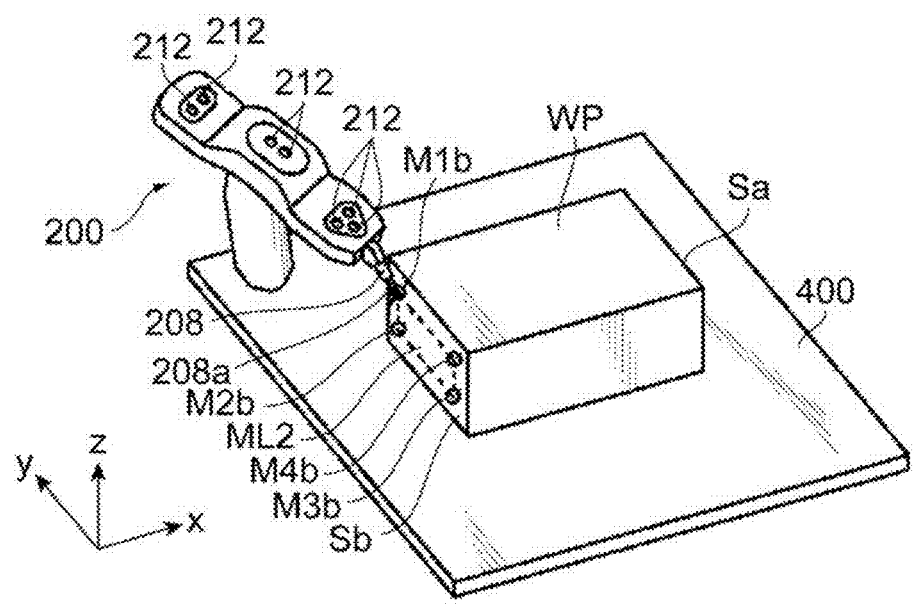

(4) Referring to FIGS. 48A and 48B, the operator then brings the contactor 208a into contact with the other end face Sb of the workpiece WP and operates the main body operation unit 300 (FIG. 1) to capture an image of the probe markers 212 by the main imaging unit 600, so that coordinates of a contact point of the contactor 208a are calculated on the basis of the captured image. A first contact point on the other end face Sb is denoted by M1b.

(5) Coordinates of at least two contact points, for example, three contact points including a second contact point M2b, a third contact point M3b, and a fourth contact point M4b are calculated by sequentially changing the contact point of the contactor 208a of the probe 200 and performing the same operation as the operation to the first contact point M1b for each contact point on the other end face Sb of the workpiece WP (FIG. 48B).

(6) A second measurement plane ML2 corresponding to the other end face Sb of the workpiece WP is set on the basis of the above four contact points M1b to M4b and a plane of a geometrical element (FIG. 41B).

Then, the operator operates the main body operation unit 300 (FIG. 1) or the operation unit 6 (FIG. 2) of the personal computer PC to thereby measure the distance between the first measurement plane ML1 and the second measurement plane ML2. That is, the distance between the first measurement plane ML1 and the second measurement plane ML2 is measured on the basis of the relative positions of the first and second geometrical elements.

As described above, the table 400 is displaceable. When the table 400 is, for example, translated between a first step of obtaining the first measurement plane ML1 and a second step of obtaining the second measurement plane ML2, the distance between the first measurement plane ML1, the second measurement plane ML2, and the second measurement plane ML2 on the basis of the first relative position coordinates, the second relative position coordinates, and the previously set planes, that is, the first measurement plane ML1 and the second measurement plane ML2.

In the process of the above measurement operation, an operator can use the sub imaging unit 210 (FIG. 4) which is disposed on the tip part of the probe 200 as needed. The sub imaging unit 210 is installed on the front end face of the marker installation part 204 which extends in the front-rear direction of the probe 200 and thus capable of capturing an image of the front region of the probe 200. Accordingly, it is possible to acquire the whole view of the one end face Sa and the other end face Sb of the workpiece WP.

Further, the table 400 can be displaced according to the process of the above measurement operation. For example, when the workpiece WP is a long object, the probe markers 212 can be brought into a visual field of the main imaging unit 600 by moving the table 400 in the X-axis direction. That is, a large workpiece WP can be measured by the relatively compact optical three-dimensional coordinate measuring device CMI. Further, when a local part such as a recess of the workpiece WP is measured, the table 400 can be displaced so as to acquire an excellent image by the main imaging unit 600. Accordingly, a captured image that is easily processed can be acquired. This makes it possible to contribute to an improvement of the measurement accuracy.

For the displacement of the table 400 from the original position, as described above, an image of the stage markers 410 of the stage marker unit 412 which is mounted on the table 400 is captured by the main imaging unit 600, and the displacement direction and the displacement amount of the table 400 can be substantially detected on the basis of the captured image. As a modification, the sensor 800 (FIG. 2) such as an encoder may be used to detect the displacement amount or the attitude of the table 400. A person skilled in the art can easily understand that the above idea regarding displacing the table 400 from the original position is applicable to a conventional arm type three-dimensional coordinate measuring device which is provided with a probe on the tip of a multi-articulated arm.

According to the optical three-dimensional coordinate measuring device CMI of the embodiment, the table 400 is movable and includes the stage markers 410. Further, referring to FIG. 2, the optical three-dimensional coordinate measuring device CMI includes the main imaging unit 600 which captures an image of the probe markers 212 and further includes the sub imaging unit 210 on the tip part of the probe 200. It is possible to provide various pieces of information to a worker using an image acquired by the sub imaging unit 210. Further, it is possible to provide information that proves that a measurement operation has been appropriately performed by storing or outputting the image.

GUI:

The optical three-dimensional coordinate measuring device CMI further includes the display unit 500 (FIG. 1). It is possible to provide various piece of information to a worker using the display unit 500. The optical three-dimensional coordinate measuring device CMI is intended to be installed in a site of a production line to be used.

The optical three-dimensional coordinate measuring device CMI is designed so as to be operable even by a worker in a manufacturing site. Thus, an operator who makes access to the optical three-dimensional coordinate measuring device CMI is not limited to a person who has full knowledge of how to use the optical three-dimensional coordinate measuring device CMI. It is desired to perform GUI display using the display unit 500 (FIG. 1) so that even a worker in the manufacturing site can use the optical three-dimensional coordinate measuring device CMI.

In the optical three-dimensional coordinate measuring device CMI, the GUI using the display unit 500 includes a first display mode ("administrator mode") for a person who has full knowledge of how to use the optical three-dimensional coordinate measuring device CMI, that is, an administrator and a second display mode ("measurement display mode") which includes a guidance screen which guides the operation of a measurement operation for a site worker and is used when performing measurement. For example, the administrator mode and the measurement display mode can be switched using a button (not illustrated) which is displayed on the display unit 500.

It is possible to perform various settings (guidance settings) for guiding a measurement operation so that a site worker can easily execute an operation of the measurement operation by using the administrator mode. For example, a captured image ("guidance image") which is captured by the sub imaging unit 210 is displayed on the display unit 500, and a point that should be measured by a worker and a point that should be brought into contact with the contactor 208a are displayed on the guidance image in a superimposed manner. The worker can know a point that should be brought into contact with the contactor 208a next by viewing the display unit 500. Further, it is possible to provide information indicating an appropriate direction and an appropriate degree of displacement of the table 400 to the worker by imparting a function of moving the display of a captured image captured by the sub imaging unit 210 in accordance with the operation by the worker.

Figure 49:
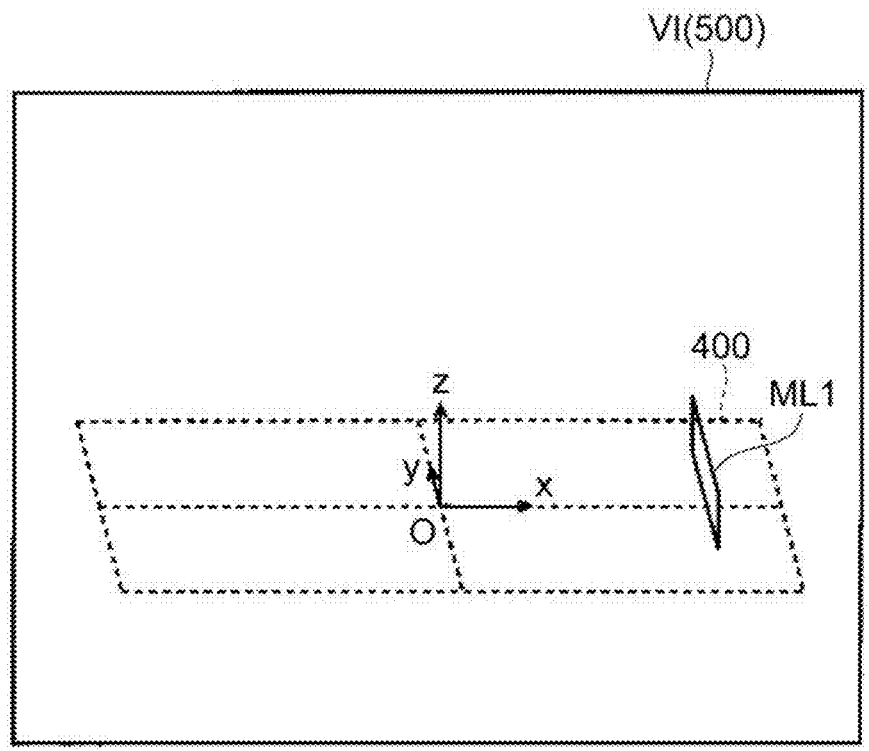
FIG. 49 is a diagram for describing an example in which the first measurement plane described with reference to FIGS. 47A and 47B is displayed on a display unit which is included in the optical three-dimensional coordinate measuring device of the embodiment.

An example of display during a measurement operation will be described with reference to FIG. 49. FIG. 49 is an image which is displayed when the first measurement plane ML1 corresponding to the one end face Sa of the workpiece WP is obtained. FIG. 49 illustrates a measurement region virtual image VI which is displayed on the display unit 500. The measurement region virtual image VI virtually represents a visual field region of the main imaging unit 600. In the measurement region virtual image VI, the origin, the X axis, the Y axis, and the Z axis of the absolute coordinate system are defined. That is, the X axis and the Y axis are set so as to be parallel to the upper face of the table 400 at the original position and perpendicular to each other, and the Z axis is set so as to be perpendicular to the upper face of the table 400. Further, the center of the table 400 at the original position is set at the origin O. Then, the first measurement plane ML1 corresponding to the one end face Sa of the workpiece WP is displayed on the measurement region virtual image VI in a superimposed manner.

Figure 50:
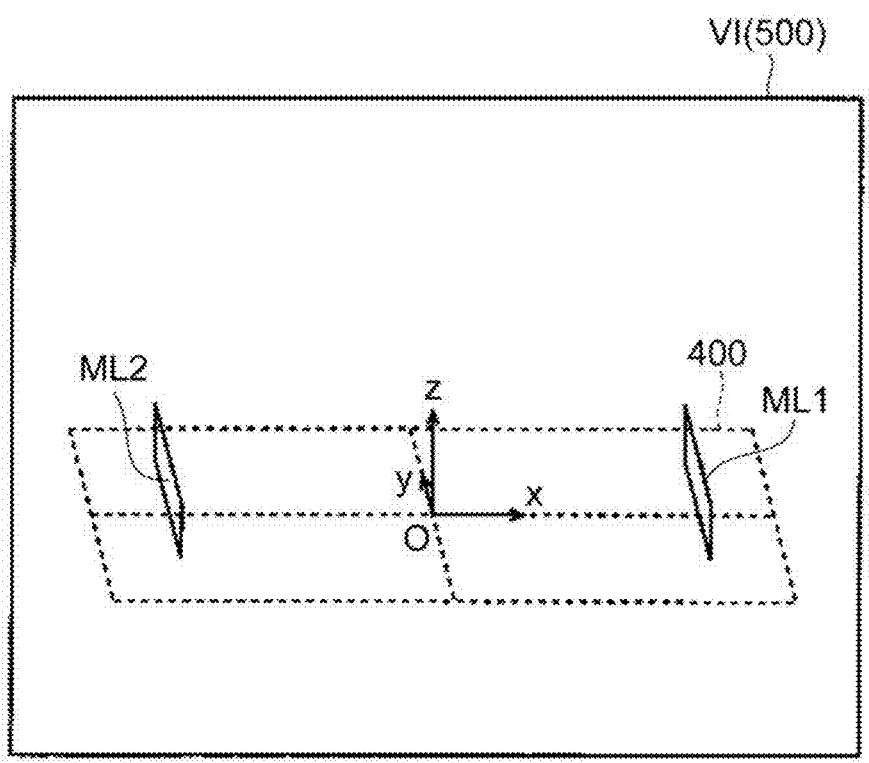
FIG. 50 is a diagram for describing an example in which the second measurement plane described with reference to FIGS. 48A and 48B is displayed on the display unit which is included in the optical three-dimensional coordinate measuring device of the embodiment.

FIG. 50 is an image which is displayed when the second measurement plane ML2 corresponding to the other end face Sb of the workpiece WP is obtained. Referring to FIG. 50, the second measurement plane ML2 corresponding to the other end face Sb is created on the basis of the absolute coordinate system and displayed on the measurement region virtual image VI on the display unit 500 in a superimposed manner together with the first measurement plane ML1 corresponding to the one end face Sa of the workpiece WP.

Figure 51:
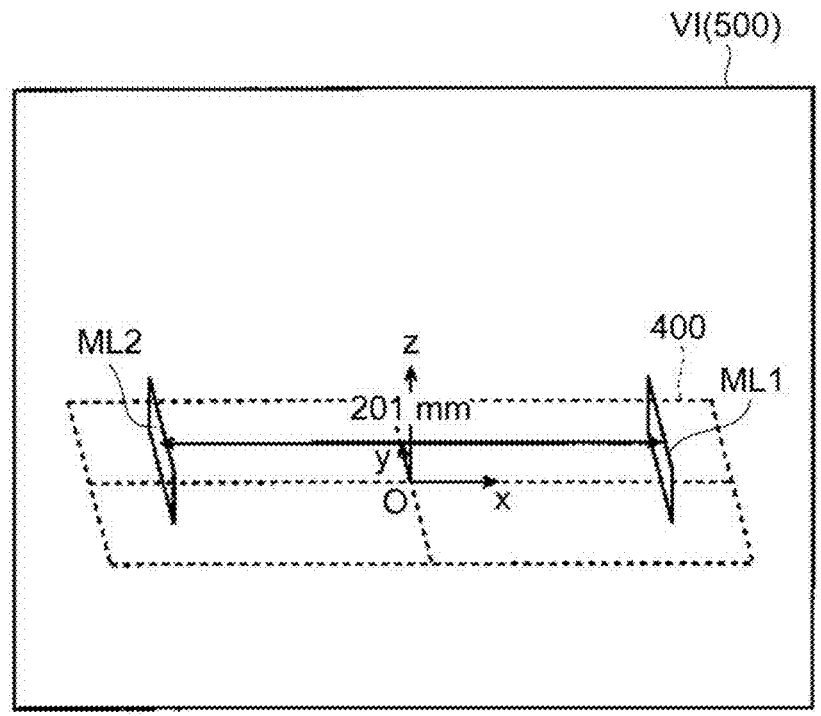
FIG. 51 is a diagram for describing an example in which the first and second measurement planes and an actually-measured distance between the first and second measurement planes are displayed on the display unit which is included in the optical three-dimensional coordinate measuring device of the embodiment.

FIG. 51 illustrates an image which is displayed after the distance between the first measurement plane ML1 and the second measurement plane ML2 is obtained. As can be understood from FIG. 51, together with the display of the first measurement plane ML1 and the second measurement plane ML2, a numerical value "201 mm" which indicates the distance between the first measurement plane ML1 and the second measurement plane ML2 is displayed in a superimposed manner together with an arrow. It is needless to say that whether the distance "201 mm" is appropriate is determined on the basis of a design drawing of the workpiece WP.

Figure 52:
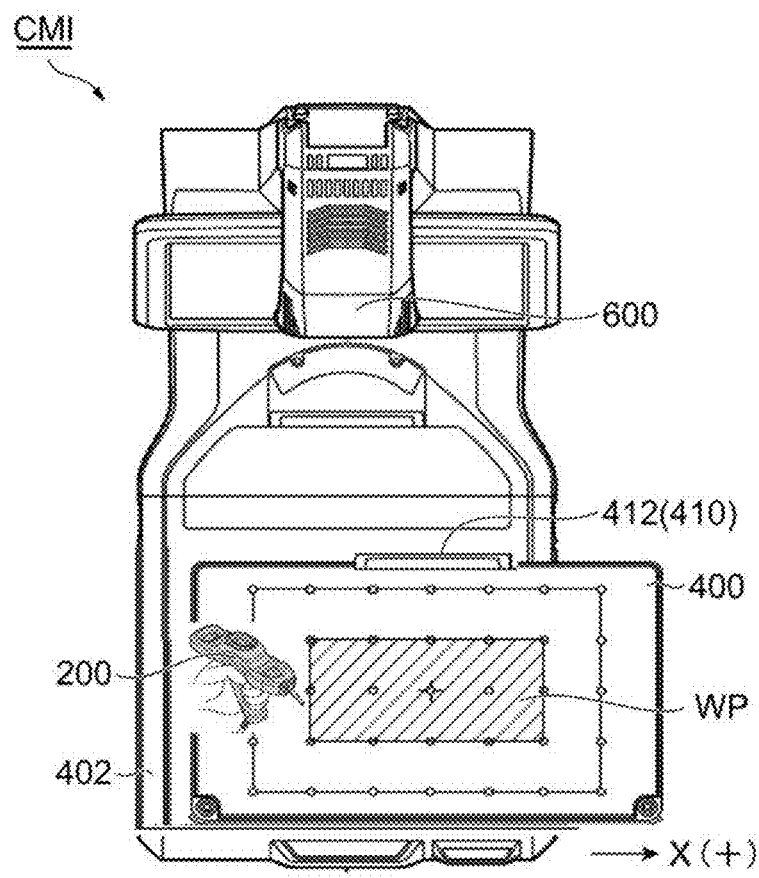
FIG. 52 is a diagram for describing an example in which the table is moved to the plus side of an X axis.
Figure 53:
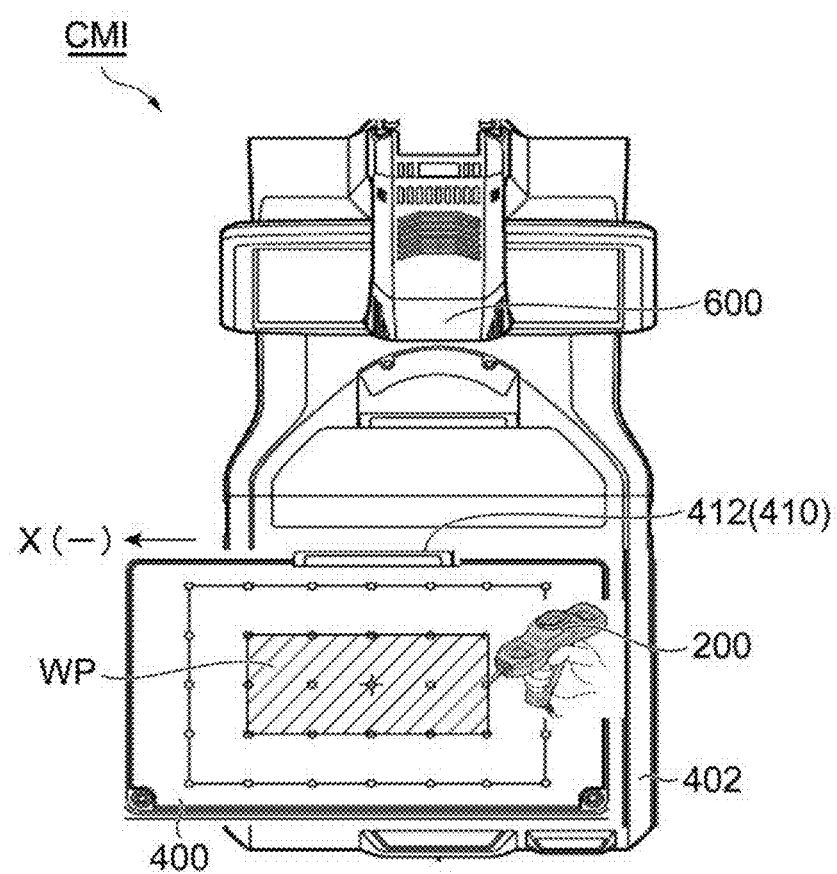
FIG. 53 is a diagram for describing an example in which the table is moved to the minus side of the X axis.
Figure 54:
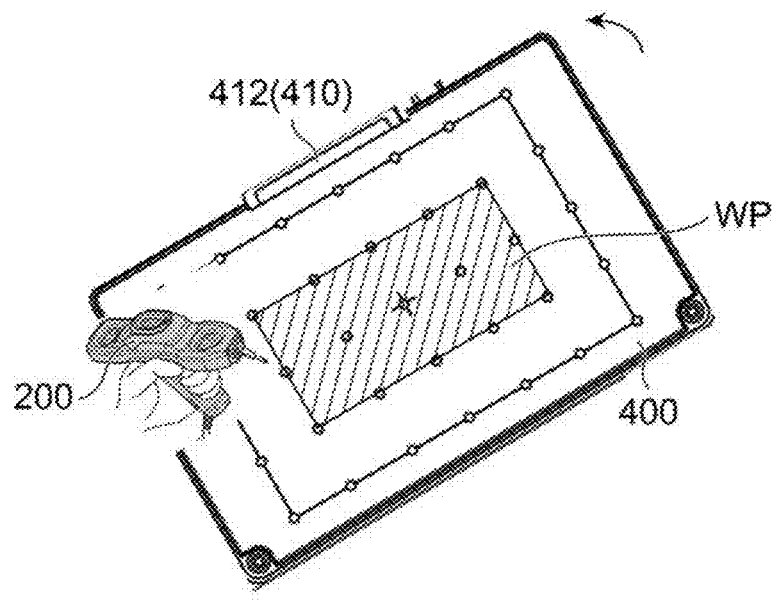
FIG. 54 is a diagram for describing an example in which the table is rotated in the counterclockwise direction.
Figure 55:
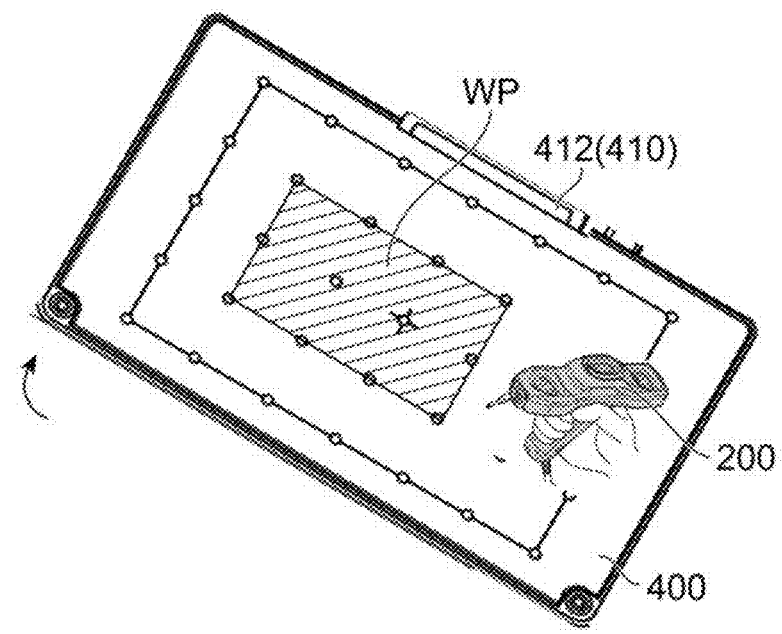
FIG. 55 is a diagram for describing an example in which the table is rotated in the clockwise direction.

As described above, the optical three-dimensional coordinate measuring device CMI of the embodiment is provided with the table 400 which is displaceable from the original position (FIG. 9). The table 400 is translatable in the X-axis direction as illustrated in FIGS. 52 and 53 and also rotatable as illustrated in FIGS. 54 and 55. FIG. 52 illustrates an example in which the table 400 is moved in the right direction (the plus side in the X-axis direction). When an operator applies a force to the table 400 in order to displace the table 400 and an X-axis direction component of the operation force by the operator exceeds the above predetermined value, the table 400 is moved in the X-axis direction. That is, the table 400 can be moved in the X-axis direction by intentionally applying a force (whose X-axis direction component is larger than the predetermined value) to the table 400 by an operator. Then, the table 400 is stopped at the instant when the operation force is weakened. The same applies to the rotation of the table 400. FIG. 53 illustrates an example in which the table 400 is moved in the left direction (the minus side in the X-axis direction). FIG. 54 illustrates an example in which the table 400 is rotated in the counterclockwise direction. FIG. 55 illustrates an example in which the table 400 is rotated in the clockwise direction.

Referring to FIGS. 52 and 53, intentional application of a force to the table 400 by an operator enables the table 400 to move right and left by a component of the operation force. Thus, for example, when the distance between one end face and the other end face of a long workpiece WP is measured, the markers 212 of the probe 200 which measures the one end face or the other end face of the workpiece WP can be brought into the visual field of the main imaging unit 600 by moving the table 400 in the X-axis direction. That is, the relatively compact optical three-dimensional coordinate measuring device CMI is capable of measuring a relatively large workpiece WP by moving the displaceable table 400.

Referring to FIGS. 54 and 55, intentional application of a force to the table 400 by an operator enables the table 400 to rotate in the clockwise direction and the counterclockwise direction by a component of the operation force. Thus, the probe markers 212 can be made to face the fixed main imaging unit 600 by rotating the table 400 corresponding to a measurement position of the workpiece WP. Thus, it is possible to maintain a constant measurement accuracy by allowing the probe markers 212 at the time of measurement to be present within a visual field range that can be appropriately imaged by the main imaging unit 600.

Of course, a single operation by an operator can make both an X-axis direction component and a rotation direction component of the operation force higher than the predetermined value. That is, it is also possible to rotate the table 400 while moving the table 400 in the X-axis direction.

Figure 56:
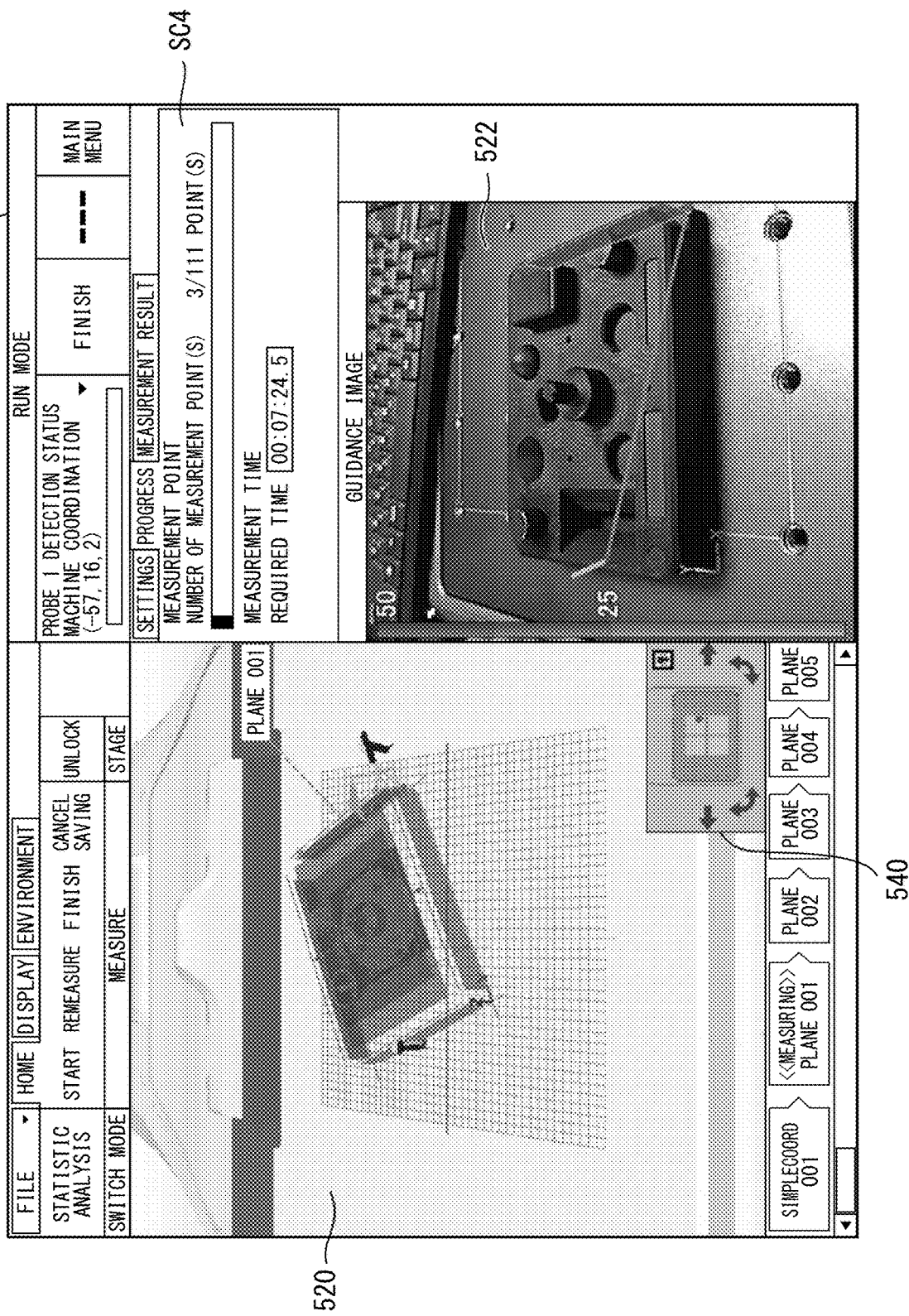
FIG. 56 is a diagram for describing a display example of information relating to table displacement (table guidance) which is one of guidance information items which can be displayed on the display unit.

FIG. 56 illustrates an example of a screen which can be displayed on the display unit 500. Specifically, FIG. 56 illustrates an actual measurement screen SC4 which is displayed on the display unit 500 when a worker executes a measurement operation. The actual measurement screen SC4 preferably includes a table guidance information display field 540. The table guidance information display field 540 displays information such as the current position and attitude of the table 400 and a set position and attitude in real time. A measurement object can be positioned at an appropriate position and attitude (the set position and attitude) by moving the table 400 by a worker while being guided by the display in accordance with an instruction in the table guidance information display field 540.

Figure 57:
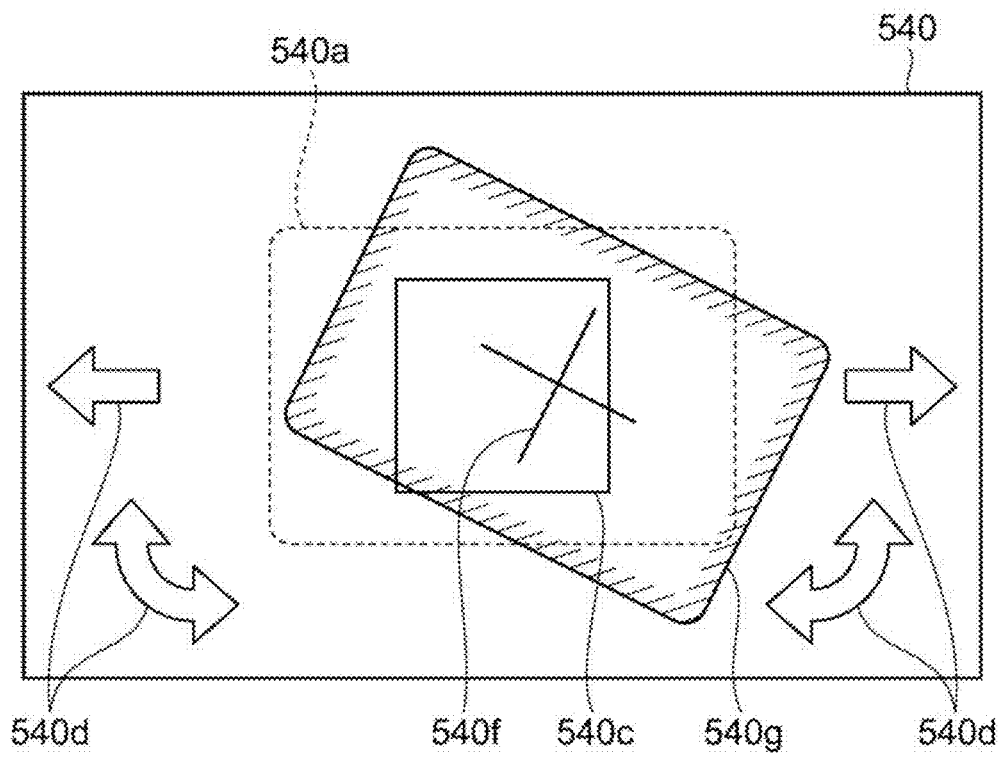
FIG. 57 is a diagram for describing a modification of table guidance display.

As illustrated in FIG. 57 in an enlarged manner, the table guidance information display field 540 displays an original position 540a of the table 400, a measurement point 540b which should be measured next, a recommended fixed position 540c of the workpiece WP (the set position and attitude of the table 400), and an arrow icon 540d which indicates a direction of moving the table 400. Preferably, in addition, a cross display 540f which indicates the current position and attitude of the table 400 is added. The center of the cross display represents the current center of the table 400 and the current attitude of the table 400. Further, display that displays the outer contour of the table 400 in rectangle to indicate a current position 540g of the table 400 is preferably added to the table guidance information display field 540 (FIG. 58).

Figure 58:
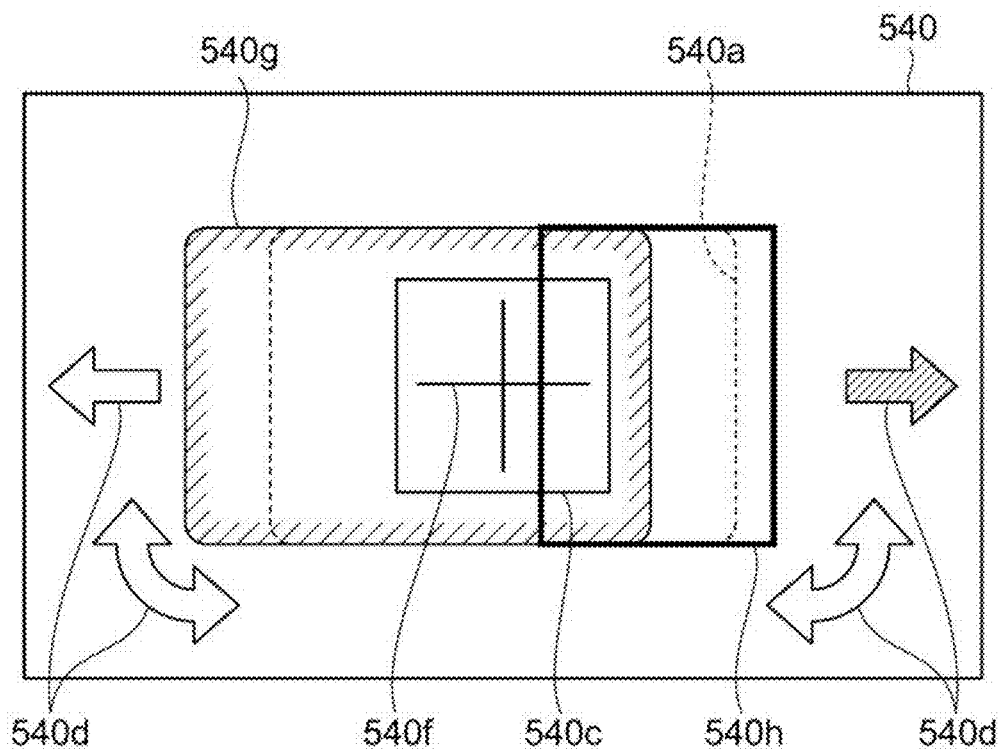
FIG. 58 is a diagram for describing another modification of the table guidance display.

In the table guidance information display field 540, a range within which the table 400 can be moved is preferably indicated by, for example, a rectangular border which is indicated by a solid line 540h in FIG. 58. Specifically, a measurable movement range of the table 400 is preferably displayed in display that can be easily visually recognized, for example, by the rectangular border 540h.

For example, the arrow icon 540d indicating the direction is preferably in a highlighted display mode such as flashing and/or displaying in a different color the arrow icon 540d which indicates the right when guiding the movement of the table 400 rightward as can be understood from FIG. 58.

A worker can operate the table 400 while viewing guidance information displayed in the table guidance information display field 540. The guidance information is displayed in real time. Thus, it is possible to position the table 400 at a position and an attitude intended by an administrator, that is, the set position and attitude.

Although the preferred embodiment of the present invention has been described above on the basis of the optical three-dimensional coordinate measuring device CMI, the present invention is not limited to the optical three-dimensional coordinate measuring device CMI of the embodiment. The present invention includes the following technical matters. (1) Although, in the embodiment, the displacement amount of the table 400 is optically obtained on the basis of an image of the second marker, that is, the stage marker 410 disposed on the table 400, the image being captured by the main imaging unit 600, the displacement amount (translation and/or rotation) of the table 400 may be detected by a sensor such as an encoder.

(2) The present invention is also applicable to mechanical three-dimensional coordinate measuring devices such as a portal type three-dimensional coordinate measuring device and an arm type three-dimensional coordinate measuring device. The mechanical three-dimensional coordinate measuring device is provided with various sensors for identifying the position and the attitude of the probe. Thus, a probe position and attitude identifying unit in the present invention is not limited to the optical mechanism which includes the first marker 212 disposed on the probe 200, and may include the above various sensors and a calculation unit which receives a signal from the sensors and calculates the position and the attitude of the probe.

What is claimed is:

1. A three-dimensional coordinate measuring device comprising:
    a stage base;
    a movable coupler coupled to the stage base, the movable coupler including at least one of a slider for a translation and a rotatable coupler for a rotation around a predefined axis;
    a displacement resistance mechanism coupled to the movable coupler, configured to generate a certain resistance force against a movement of the movable coupler;
    a table having a surface for placing a measurement object thereon, movably supported on the stage base via the movable coupler, and configured to directly receive an external force of a manual operation, and to move with the measurement object against the stage base via the at least one of the slider and the rotatable coupler of the movable coupler in response to directly receiving the external force of the manual operation, the external force excess of the certain resistance force generated by the displacement resistance mechanism;

a table displacement identifying unit configured to identify a displacement amount of the table from an original position;

a probe configured to designate a measurement position of the measurement object on the table;

a probe position and attitude identifying unit configured to identify a position and an attitude of the probe; and a relative position coordinate calculation unit configured to obtain a relative position coordinate of the measurement position designated by the probe on the basis of both (a) the position and the attitude of the probe detected by the probe position and attitude identifying unit, the probe designating the measurement position of the measurement object on the table supported at a first condition via the movable coupler on the stage base, and (b) the displacement amount of the table detected by the table displacement identifying unit, the table being supported at the first condition via the movable coupler on the stage base.

2. The three-dimensional coordinate measuring device according to claim 1, wherein the probe includes a contactor contacting at the measurement position of a measurement object.

3. The three-dimensional coordinate measuring device according to claim 1, wherein the movable coupler includes the slider and the rotatable coupler, and the displacement resistance mechanism includes a first resistance mechanism against the translation and a second resistance mechanism against the rotation.

4. The three-dimensional coordinate measuring device according to claim 1, wherein the probe position and attitude identifying unit includes a first marker disposed on the probe and a main imaging unit that is fixed facing obliquely downward for capturing an image of the first marker, and the position and the attitude of the probe are identified on the basis of the first marker included in an image captured by the main imaging unit.

5. The three-dimensional coordinate measuring device according to claim 4, wherein the table is translatable in a direction crossing an imaging space of the main imaging unit.

6. The three-dimensional coordinate measuring device according to claim 1, wherein the movable coupler includes the rotatable coupler, and the table is axially rotatable around a center of the table.

7. The three-dimensional coordinate measuring device according to claim 4, wherein the table displacement identifying unit includes a second marker disposed on the table and a main imaging unit that captures an image of the second marker, and a translation amount and/or a rotation amount of the table is identified on the basis of the second marker included in an image captured by the main imaging unit.

8. The three-dimensional coordinate measuring device according to claim 4, further comprising a workpiece fixing unit for fixing a measurement object to the table.

* * * * *